(12) United States Patent
Kwak et al.

(10) Patent No.: US 11,470,607 B2
(45) Date of Patent: Oct. 11, 2022

(54) RESOURCE ALLOCATION METHOD IN WIRELESS COMMUNICATION SYSTEM, DATA RECEPTION METHOD ON BASIS OF SAME AND DEVICE FOR SAME

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Jeongho Yeo, Gyeonggi-do (KR); Jinyoung Oh, Seoul (KR); Younsun Kim, Gyeonggi-do (KR); Heedon Gha, Gyeonggi-do (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 60 days.

(21) Appl. No.: 16/090,023

(22) PCT Filed: Mar. 31, 2017

(86) PCT No.: PCT/KR2017/003602
§ 371 (c)(1),
(2) Date: Sep. 28, 2018

(87) PCT Pub. No.: WO2017/171507
PCT Pub. Date: Oct. 5, 2017

(65) Prior Publication Data
US 2019/0116594 A1 Apr. 18, 2019

(30) Foreign Application Priority Data

Mar. 31, 2016 (KR) .................. 10-2016-0039212
Jun. 1, 2016 (KR) .................. 10-2016-0068133
(Continued)

(51) Int. Cl.
H04W 72/04 (2009.01)
H04L 5/00 (2006.01)
(Continued)

(52) U.S. Cl.
CPC ....... *H04W 72/0453* (2013.01); *H04L 5/0044* (2013.01); *H04L 5/0096* (2013.01);
(Continued)

(58) Field of Classification Search
CPC ............ H04W 72/0453; H04W 72/042; H04L 5/0044; H04L 5/0096; H04L 5/0048;
(Continued)

(56) References Cited

U.S. PATENT DOCUMENTS 10,015,797 B2   7/2018  Moses et al.
2010/0220647 A1  9/2010  Baker et al.
(Continued)

FOREIGN PATENT DOCUMENTS

CN    101238750    8/2008
CN    104684051    6/2015
(Continued)

OTHER PUBLICATIONS

You et al., "Reception of Legacy PDCCH and Shortened PDCCH", U.S. Appl. No. 62/288,444, filed Jan. 29, 2016 (Year: 2016).*
(Continued)

*Primary Examiner* — Thinh D Tran
(74) *Attorney, Agent, or Firm* — The Farrell Law Firm, P.C.

(57) ABSTRACT

The present invention relates to a communication technique, which is a convergence of IoT technology and 5G communication system for supporting higher data transmission rate beyond 4G system, and a system for same. The present invention can be applied to smart services (e.g., smart homes, smart buildings, smart cities, smart cars or connected
(Continued)

cars, health care, digital education, retail businesses, security- and safety-related services and the like) on the basis of 5G communication technology and IoT-related technology. The present invention provides a resource allocation method by a base station comprising the steps of: comparing a transmission time interval (TTI), which is for transmitting data to a terminal, with a preconfigured transmission time interval reference value; if the transmission time interval for the data transmission is shorter than the transmission time interval reference value, determining a resource allocation type for showing frequency resources allocated for the data transmission, and generating control information on the basis of the determined resource allocation type.

15 Claims, 37 Drawing Sheets

(30) Foreign Application Priority Data

| Aug. 12, 2016 | (KR) | .......................... 10-2016-0102763 |
| Jan. 17, 2017 | (KR) | .......................... 10-2017-0008317 |

(51) Int. Cl.
| H04B 7/04 | (2017.01) |
| H04B 7/0456 | (2017.01) |
| H04B 7/06 | (2006.01) |

(52) U.S. Cl.
CPC .............. *H04B 7/04* (2013.01); *H04B 7/0478* (2013.01); *H04B 7/0639* (2013.01); *H04W 72/042* (2013.01)

(58) Field of Classification Search
CPC ...... H04B 7/04; H04B 7/0639; H04B 7/0421; H04B 7/0478; H04B 7/0626; H04B 7/0658
See application file for complete search history.

(56) References Cited

U.S. PATENT DOCUMENTS

| 2014/0233470 | A1 | 8/2014 | Kim et al. | |
| 2018/0176912 | A1* | 6/2018 | Li | ..................... H04W 72/0446 |
| 2018/0227861 | A1* | 8/2018 | Byun | ................ H04W 72/0473 |
| 2018/0234998 | A1* | 8/2018 | You | ..................... H04W 72/042 |
| 2018/0310280 | A1* | 10/2018 | Byun | .................. H04W 72/042 |

FOREIGN PATENT DOCUMENTS

| WO | WO 2010/124721 | 11/2010 |
| WO | WO 2012/173385 | 12/2012 |
| WO | WO 2015/012900 | 1/2015 |
| WO | WO 2016/029455 | 3/2016 |

OTHER PUBLICATIONS

You et al., "Reception of Legacy PDCCH and Shortened PDCCH", U.S. Appl. No. 62/290,981, filed Feb. 4, 2016 (Year: 2016).*
You et al., "Reception of Legacy PDCCH and Shortened PDCCH", U.S. Appl. No. 62/256,032, filed Nov. 16, 2015 (Year: 2015).*
You et al., "Reception of Legacy PDCCH and Shortened PDCCH", U.S. Appl. No. 62/196,303, filed Jul. 24, 2015 (Year: 2015).*
Byun et al., "Uplink Power Control Methods for Preemptive Transmission of TDD Low Latency Communication System," U.S. Appl. No. 62/204,457, filed Aug. 13, 2015 (Year: 2015).*
3GPP, LTE; Evolved Universal Terrestrial Radio Access (E-UTRA); Physical Layer Procedures, (3GPP TS 36.213 Version 12.5.0 Release 12).
ETSI TS 136 213 V12.5.0, Apr. 2015, 242 pages.
ZTE, "L1 Considerations on Latency Reduction", R1-157151, 3GPP TSG RAN WG1 Meeting #83, Nov. 15-22, 2015, 6 pages.
Ericsson, "DCI for sTTI Scheduling", R1-165294, 3GPP TSG-RAN WG1 #85, May 23-27, 2016, 5 pages.
European Search Report dated Jan. 24, 2019 issued in counterpart application No. 17775931.3-1220, 11 pages.
PCT/ISA/210 Search Report issued on PCT/KR2017/003602 (pp. 8).
PCT/ISA/237 Written Opinion issued on PCT/KR2017/003602 (pp. 5).
Samsung 3GPP TSG RAN WG1 Meeing #83, Anaheim, USA, Nov. 15-22, 2015, R1-156819, Study on specification impact for downlink due to TTI shortening, pp. 7.
Etri, "Overview on Frame Structure and Downlink Design for TTI Shortening", R1-161011, 3GPP TSG RAN WG1 Meeting #84, Feb. 15-19, 2016, 7 pages.
Korean Office Action dated Dec. 1, 2020 issued in counterpart application No. 10-2017-0042270, 10 pages.
Samsung, "Specification Impact for DL Due to TTI Shortening", R1-160585, 3GPP TSG RAN WG1 Meeting #84, Feb. 15-19, 2016, 4 pages.
Chinese Office Action dated Jun. 3, 2021 issued in counterpart application No. 201780016837.7, 16 pages.
Korean Office Action dated Jun. 30, 2021 issued in counterpart application No. 10-2017-0042270, 6 pages.

* cited by examiner

RESOURCE ALLOCATION METHOD IN WIRELESS COMMUNICATION SYSTEM, DATA RECEPTION METHOD ON BASIS OF SAME AND DEVICE FOR SAME

PRIORITY

This application is a National Phase Entry of PCT International Application No. PCT/KR2017/003602 which was filed on Mar. 31, 2017, and claims priority to Korean Patent Application Nos. 10-2016-0039212, 10-2016-0068133, 10-2016-0102763, and 10-2017-0008317, which were filed on Mar. 31, 2016, Jun. 1, 2016, Aug. 12, 2016, and Jan. 17, 2017, respectively, the content of each of which is incorporated herein by reference.

TECHNICAL FIELD

The present disclosure relates to a technology related FD-MIMO and eFD-MIMO supporting 16 to 32 non-precoded (class A) CSI-RSs.

Further, the present disclosure relates to a wireless mobile communication system, and particularly, to a method by a terminal for measuring a radio channel state based on an aperiodic reference signal, generating and reporting channel state information (CSI) to a base station based on the measured radio channel state in a wireless mobile communication system applying a multiple access scheme using multi-carriers, such as orthogonal frequency division multiple access (OFDMA).

Further, the present disclosure relates to a wireless communication system, and more particularly, to a method and an apparatus for transmitting and receiving data using a transmission time interval that is smaller than 1 ms.

BACKGROUND ART

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system. In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G communication system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and machine type communication (MTC) have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

Recently, in FD-MIMO, with the increase of a codebook size, PMI overhead that should be reported by a terminal has been increased. Accordingly, terminal computation overhead and feedback overhead are increased as compared with those in the related art, and this may cause burden of the terminal to be increased. Accordingly, there is a need for a method and an apparatus for reducing the terminal burden and solving the problem that may occur due to a method for reducing the burden.

DISCLOSURE OF INVENTION

Technical Problem

In Rel-13 FD-MIMO, with the increase of a codebook size, PMI overhead that should be reported by a terminal has been increased. Particularly, in case of a periodic channel state report, the size of a PUCCH payload is limited, and thus there has been a need for a method for matching the payload through reduction of the PMI overhead. In case of the existing periodic channel state report, codebook subsampling has been used, through which duplicate beam group is removed to reduce the codebook size, or the number of co-phasing for compensating for a phase difference between antennas having different selectable beams and polarizations is reduced. In case of the existing aperiodic channel state report, as compared with the periodic channel state report, PMI can be reported for all cases without limiting the codebook size. However, if the codebook size is increased for FD-MIMO support, terminal computation overhead and feedback overhead may be increased as compared with those in the related art, and this may cause burden of the terminal also to be increased. Accordingly, in the existing wideband CQI report mode, such increase of the PMI overhead can be solved through introduction of a report time for the first PMI in the same manner as that as used in the existing subband CQI report mode. If periodicityFactor for subband CQI configuration is used for the first PMI report time configuration, it becomes impossible to configure a periodic channel state report mode indirectly configured using fields of PMI/RI reporting, widebandCQI, and subbandCQI.

On the other hand, the present disclosure includes providing of a method and an apparatus by a terminal for measurement of a reference signal, generation of channel state information, and transmission of channel state information based on an aperiodic CSI-RS in an FD-MIMO system. Specifically, the present disclosure may include that a base station notifies a terminal of additional aperiodic CSI-RS configuration information for efficient aperiodic CSI-RS transmission and accurate channel state information acquisition. Further, the present disclosure may include providing of a method and an apparatus in which a base station transmits a reference signal to a terminal in accordance with configuration information, the terminal generates and reports channel information based on this, and the base station receives the channel information.

Further, in an LIE or LIE-A system supporting a short transmission time interval (TTI), it is necessary to perform resource allocation for downlink and uplink data transmission at respective TTIs, and it is necessary to reduce the number of bits of control information transferring resource allocation information to lower control information overhead of the short TTI.

Solution to Problem

In one aspect of the present disclosure, a resource allocation method by a base station in a wireless communication system includes comparing a transmission time interval (TTI) for transmitting data to a terminal with a predetermined TTI reference value; determining a resource allocation type for notifying of a frequency resource allocated to transmit the data if the TTI for transmitting the data is smaller than the TTI reference value; and generating control information based on the determined resource allocation type.

In another aspect of the present disclosure, a data reception method by a terminal in a wireless communication system includes receiving control information from a base station; comparing a transmission time interval (TTI) of the control information transmitted from the base station with a predetermined TTI reference value; identifying a resource allocation type of the control information if the TTI of the control information is smaller than the TTI reference value; and receiving data based on the result of the identification.

In still another aspect of the present disclosure, a base station includes a transceiver configured to transmit/receive data to/from a terminal; and a controller configured to compare a transmission time interval (TTI) for transmitting data to a terminal with a predetermined TTI reference value, determine a resource allocation type for notifying of a frequency resource allocated to transmit the data if the TTI for transmitting the data is smaller than the TTI reference value, and generate control information based on the determined resource allocation type.

In still another aspect of the present disclosure, a terminal includes a transceiver configured to receive control information or data from a base station; and a controller configured to compare a transmission time interval (TTI) of the control information transmitted from the base station with a predetermined TTI reference value, identify a resource allocation type of the control information if the TTI of the control information is smaller than the TTI reference value, and receive data based on the result of the identification.

In still another aspect of the present disclosure, a channel state information report method by a terminal includes receiving CSI-RS configuration information from a base station; receiving feedback configuration information from the base station; receiving the CSI-RS from the base station and estimating a channel state; determining feedback information based on the feedback configuration information; and transmitting the determined feedback information in feedback timing determined based on the feedback configuration.

In still another aspect of the present disclosure, an aperiodic CSI-RS transmission method by a base station includes a first operation of configuring at least one aperiodic CSI-RS; a second operation of configuring a resource to be activated or deactivated in the configured CSI-Rs; a third operation of triggering the aperiodic CSI-RS; and transmitting the aperiodic CSI-RS to an aperiodic CSI-RS resource determined based on the first, second, or third operation.

Advantageous Effects of Invention

According to an embodiment of the present disclosure, a method for configuring a first PMI report time for configuring a periodic channel state report mode and a corresponding method for configuring the periodic channel state report mode are proposed, and thus the configuration of the periodic channel state report mode can be smoothly performed.

Further, according to another embodiment of the present disclosure, transmission efficiency of a reference signal is improved in a base station including a plurality of antennas and a terminal, and thus it can be expected to increase system throughput. For this, the base station can allocate at least one aperiodic reference signal resource to the terminal, and the terminal can generate and report channel state information that coincides with an intention of the base station based on this.

Further, according to still another embodiment of the present disclosure, by providing a transmission/reception method by a shortened-TTI terminal, the existing terminal and the shortened-TTI terminal can efficiently coexist in a system.

MODE FOR THE INVENTION

First Embodiment

Figure 1:
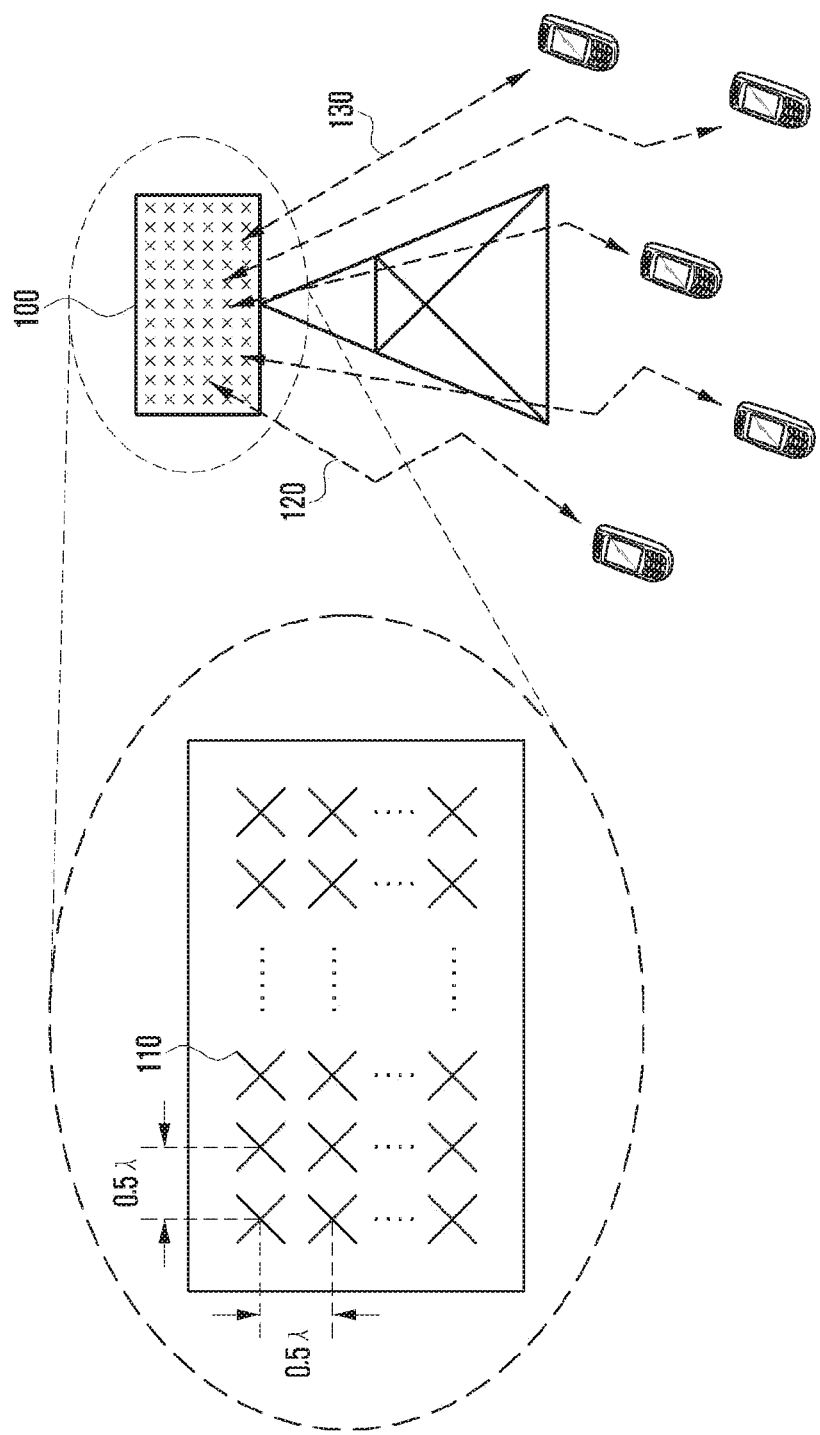
FIG. 1 is a diagram illustrating an FD-MIMO system transmitting data using not less than several tens of transmission antennas.

The present disclosure relates to a general wireless mobile communication system, and in particular, to a method for transmitting and receiving PMI and channel state information, in which a terminal measures and reports to a base station a channel quality (radio channel state) in order to operate as a hybrid MIMO system in a wireless mobile communication system applying a multiple access scheme using multi-carriers, such as orthogonal frequency division multiple access (OFDMA).

The current mobile communication system has escaped from an initial voice-oriented service providing system, and has been developed as a high-speed and high-quality wireless packet data communication system in order to provide data services and multimedia services. For this, several standardization groups, such as 3GPP, 3GPP2, and IEEE, are proceeding with 3rd-generation evolved mobile communication system standards adopting a multiple access scheme using multi-carriers. Recently, various mobile communication standards, such as 3GPP long term evolution (LTE), 3GPP2 ultra mobile broadband (UMB), and IEEE 802.16m, have been developed to support high-speed and high-quality wireless packet data transmission services based on a multiple access scheme using multi-carriers.

The existing 3rd-generation evolved mobile communication systems, such as LTE, UMB, and 802.16m, are based on the multi-carrier multiple access scheme, and use various technologies, such as multiple input multiple output (MIMO, multi-antenna), beam-forming, adaptive modulation and coding (AMC) method, and channel sensitive scheduling method, in order to improve transmission efficiency. The various technologies as described above improve the system capacity performance by improving the transmission efficiency through methods for concentrating transmission powers transmitted from several antennas in accordance with channel quality or the like, adjusting the amount of data being transmitted, and selectively transmitting data to users having good channel quality. Since such techniques mostly operate based on channel state information between a base station (BS) (or evolved Node B (eNB)) and a terminal (or user equipment (UE) or mobile station (MS)), it is necessary for the eNB or UE to measure a channel state between the base station and the terminal, and in this case, a channel state information reference signal (CSI-RS) is used. The above-described eNB means a downlink transmission and uplink reception device located in a predetermined place, and one eNB performs transmission/reception for a plurality of cells. In one mobile communication system, a plurality of eNBs are geometrically distributed, and each of the plurality of eNBs performs transmission/reception for the plurality of cells.

The existing 3rd-generation and 4th-generation mobile communication systems, such as LTE/LTE-A, use MIMO technology to transmit data using a plurality of transmission/reception antennas for extension of a data transfer rate and system capacity. The MIMO technology spatially separate and transmit a plurality of information streams using a plurality of transmission/reception antennas. Such spatial separation and transmission of the plurality of information streams is called spatial multiplexing. In general, how many information streams spatial multiplexing can be applied to may differ depending on the number of antennas of a transmitter and a receiver. In general, how many information streams spatial multiplexing can be applied to is called a rank of the corresponding transmission. In case of the MIMO technology that is supported in the standards up to LTE/LTE-A Release 12, spatial multiplexing is supported with respect to cases where eight transmission/reception antennas are respectively provided, and the rank is supported maximally up to eight. In contrast, an FD-MIMO system, to which the technology proposed in the present disclosure is applied, has evolved from the existing LTE/LTE-A MIMO technology using eight transmission antennas, and corresponds to a case where 32 or more transmission antennas are used. The FD-MIMO system is called a wireless communication system that transmits data using not less than several tens of transmission antennas.

FIG. 1 is a diagram illustrating an FD-MIMO system.

In FIG. 1, base station transmission equipment 100 transmits radio signals through not less than several tens of transmission antennas. As denoted as 110, the plurality of transmission antennas are deployed to maintain the minimum distance between them. The minimum distance may correspond to, for example, a half of a wavelength of the radio signal being transmitted. In general, if the distance corresponding to a half of the wavelength of the radio signal is maintained between the transmission antennas, signals transmitted from the respective transmission antennas are affected by radio channels having low correlation between them. If the band of the radio signal being transmitted is 2 GHz, the distance becomes 7.5 cm, and if the band becomes higher than 2 GHz, the distance becomes shorter.

In FIG. 1, not less than several tens of transmission antennas deployed in 100 are used to transmit signals 120 to one or a plurality of terminals. Proper precoding may be applied to the plurality of transmission antennas to simultaneously transmit signals to the plurality of terminals. In this case, one terminal may receive one or more information streams. In general, the number of information streams that one terminal can receive is determined in accordance with the number of reception antennas that the terminal possesses and the channel state.

In order to effectively implement the FD-MIMO system, it is necessary for the terminal to accurately measure the channel state and the size of interference and to transmit to the base station effective channel state information using the measured data. The base station having received the channel state information determines what terminals it performs transmission to in relation to transmission of a downlink, at what data transmission speed it performs transmission, and what precoding it applies using the received channel state information. The FD-MIMO system has a large number of transmission antennas, and if a method for transmitting and receiving channel state information of the LTE/LTE-A system in the related art is applied, it is necessary to transmit a large amount of control information to an uplink to cause an uplink overhead problem.

In a mobile communication system, time, frequency, and power resources are limited. Accordingly, if a larger amount of resources is allocated to reference signals, resources to be allocated to traffic channel (data traffic channel) transmission are reduced to cause an absolute amount of data to be transmitted also to be reduced. In this case, the channel measurement and estimation performance may be improved, but an absolute amount of data to be transmitted is reduced, and thus the whole system capacity performance may be rather deteriorated. Accordingly, in order to derive the optimum performance from the viewpoint of the whole system capacity, proper distribution is necessary between resources for reference signals and resources for signals for traffic channel transmission.

Figure 2A:
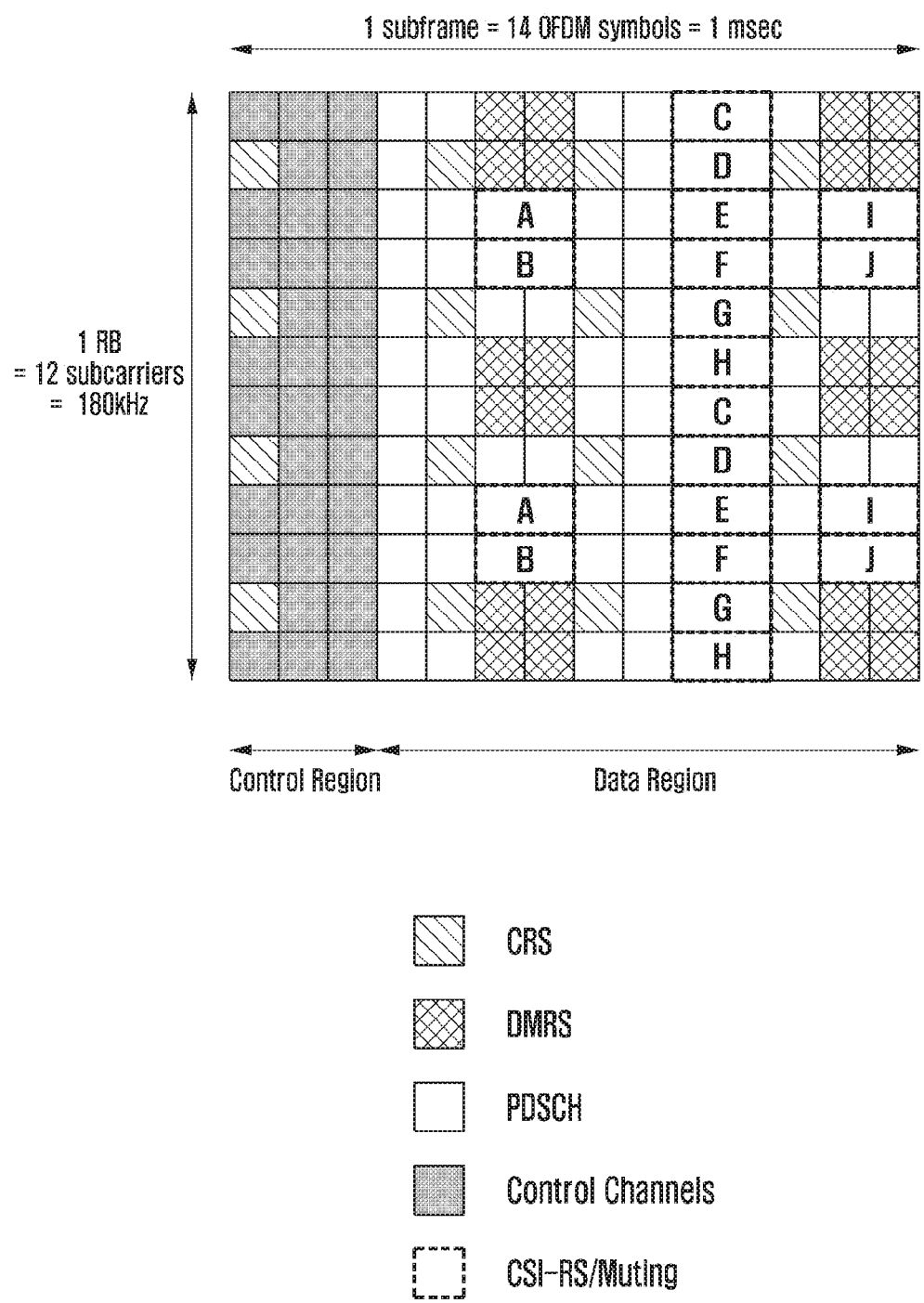
FIG. 2A is a diagram illustrating time and frequency resources in an LTE system.

FIG. 2A is a diagram illustrating a radio resource composed of one subframe and one RB, which is the minimum unit capable of performing downlink scheduling in an LTE/LTE-A system.

A radio resource as illustrated in FIG. 2A is composed of one subframe on a time axis and one RB on a frequency axis. The radio resource is composed of 12 subcarriers in a frequency domain and 14 OFDM symbols in a time domain to have 168 inherent frequencies and time locations in total. In LTE/LTE-A, each of the inherent frequencies and time locations in FIG. 2A is called a resource element (RE).

From the radio resources as illustrated in FIG. 2A, different kinds of plural signals may be transmitted as follows.

Cell specific RS (CRS): A reference signal periodically transmitted for all terminals belonging to one cell. A plurality of terminals may commonly use the CRS.

Demodulation reference signal (DMRS): A reference signal transmitted for a specific terminal. The DMRS is transmitted only in case where data is transmitted to the corresponding terminal. The DMRS may be composed of eight DMRS ports in total. In LTE/LTE-A, ports 7 to 14 correspond to DMRS ports, and the respective ports maintain orthogonality so that no interference occurs between them using CDM or FDM.

Physical downlink shared channel (PDSCH): A data channel transmitted to a downlink. The PDSCH is used by the base station to transmit traffic to the terminal, and it is transmitted using the RE to which a reference signal is not transmitted from a data region of FIG. 2B.

Channel status information reference signal (CSI-RS): A reference signal transmitted for terminals belonging to one cell. The CSI-RS is used to measure the channel state. A plurality of CSI-RSs may be transmitted to one cell.

Other control channels (PHICH, PCFICH, and PDCCH): These control channels are used to provide control information that is necessary for the terminal to receive the PDSCH or to transmit ACK/NACK for operating HARQ for uplink data transmission.

In addition to the above-described signals, in the LTE-A system, muting may be configured so that CSI-RSs transmitted by other base stations can be received in terminals of the corresponding cell without interference. The muting may be applied in a location in which the CSI-RSs can be transmitted, and in general, the terminal receives a traffic signal through jumping over the corresponding radio resource. In the LTE-A system, the muting may be called zero-power CSI-RS as another term. This is because due to the characteristic of the muting, the muting is applied to the location of the CSI-RS and in this case, no transmission power is transmitted.

Referring to FIG. 2A, the CSI-RSs may be transmitted using parts of locations indicated as A, B, C, D, E, E, F, G, H, I, and J in accordance with the number of antennas that transmit the CSI-RSs. Further, the muting may be applied to the parts of the locations indicated as A, B, C, D, E, E, F, G, H, I, and J. In particular, the CSI-RSs may be transmitted to 2, 4, and 8 REs in accordance with the number of transmission antenna ports. In FIG. 2A, if the number of antenna ports is 2, the CSI-RSs are transmitted to a half of a specific pattern, whereas if the number of antenna ports is 4, the CSI-RSs are transmitted to the whole of the specific pattern. If the number of antenna ports is 8, the CSI-RSs are transmitted using two patterns. In contrast, the muting is always performed in the unit of one pattern. That is, the muting may be applied to a plurality of patterns, but if the location of the muting does not overlap the location of the CSI-RS, it cannot be applied to only a part of one pattern. However, only in case where the location of the CSI-RS overlaps the location of the muting, the muting can be applied to only a part of one pattern.

In case where the CSI-RSs for two antenna ports are transmitted, two REs connected together on a time axis transmit signals of respective antenna ports, and the signals of the respective antenna ports are discriminated from one another by orthogonal codes. Further, if the CSI-RSs for four antenna ports are transmitted, signals for the two antenna ports are additionally transmitted in the same method using two REs added to the CSI-RSs for the two antenna ports. Transmission of the CSI-RSs for eight antenna ports is performed in the same manner.

In a cellular system, a reference signal should be transmitted to measure a downlink channel state. In case of the 3GPP long term evolution advanced (LTE-A) system, the terminal measures the channel state between the base station and the terminal itself using CRS or channel status information reference signal (CSI-RS) transmitted from the base station. The channel state basically has several requisites that should be considered, and the amount of interference in a downlink is included therein. The amount of interference in the downlink includes an interference signal and thermal noise generated by antennas that belong to an adjacent base station, and is important for the terminal to determine the channel state of the downlink. As an example, if the base station having one transmission antenna transmits a signal to the terminal having one reception antenna, the terminal should determine Es/Io by determining energy per symbol that can be received through the downlink from the reference signal received from the base station and the amount of interference to be simultaneously received in a section in which the corresponding symbol is received. The determined Es/Io is converted into a data transmission speed or a value corresponding to the data transmission speed, and is reported to the base station in the form of a CQI to enable the base station to determine at what data transmission speed the base station is to perform data transmission to the terminal in the downlink.

In the LTE-A system, the terminal feeds information on the channel state of the downlink back to the base station so that the feedback information can be used for downlink scheduling of the base station. That is, the terminal measures the reference signal that the base station transmits to the downlink, and feeds information extracted from the measured reference signal back to the base station in the form defined in the LTE/LTE-A standards. In LTE/LTE-A, information that the terminal feeds back to the base station is briefly classified into three kinds as follows.

Rank indicator (RI): The number spatial layers that the terminal can receive in the current channel state.

Precoder matrix indicator (PMI): an indicator of a precoding matrix to which the terminal prefers in the current channel state.

Channel quality indicator (CQI): The maximum data rate at which the terminal can receive data in the current channel state. The CQI may be replaced by SINR that can be used similarly to the maximum data rate, maximum error correction code rate and modulation method, and data efficiency per frequency.

RI, PMI, and CQI have meanings in association with one another. As an example, the precoding matrix supported in LTE/LTE-A is differently defined by ranks. Accordingly, the PMI value X when RI has a value of "1" and the PMI value X when RI has a value of "2" are differently analyzed. Further, it is assumed that the PMI value X that the terminal reported to the base station has been applied to the base station even in case where the terminal determines the CQI. That is, a case where the terminal reports RI_X, PMI_Y, and CQI_Z to the base station corresponds to a case where the terminal reports that it can receive the data rate corresponding to the CQI_Z in a state where the rank is RI_X and the precoding is PMI_Y. As described above, the terminal assumes what transmission scheme the terminal performs with respect to the base station when calculating the CQI, and thus it can obtain the optimized performance when performing actual transmission in the corresponding transmission scheme.

In LTE/LTE-A, periodic feedback of the terminal is configured in one of four feedback modes (or reporting modes) as follows, depending on what information is included therein:

Reporting mode 1-0 (wideband CQI with no PMI): RI, wideband CQI (wCQI)

Reporting mode 1-1 (wideband CQI with single PMI): RI, wCQI, PMI

Reporting mode 2-0 (subband CQI with no PMI): RI, wCQI, subband CQI (sCQI)

Reporting mode 2-1 (subband CQI with single PMI): RI, wCQI, sCQI, PMI

The feedback timing of respective information for the four feedback modes is determined by values of $N_{pd}$, $N_{OFFSET,CQI}$, $M_{RI}$, and $N_{OFFSET,RI}$ transferred to a higher layer signal. In feedback mode 1-0, the transmission period of wCQI is $N_{pd}$, and the feedback timing is determined with the subframe offset value of $N_{OFFSET,CQI}$. Further, the transmission period of RI is $N_{pd} \cdot M_{RI}$, and the offset is $N_{OFFSET,CQI} + N_{OFFSET,RI}$.

Figure 2B:
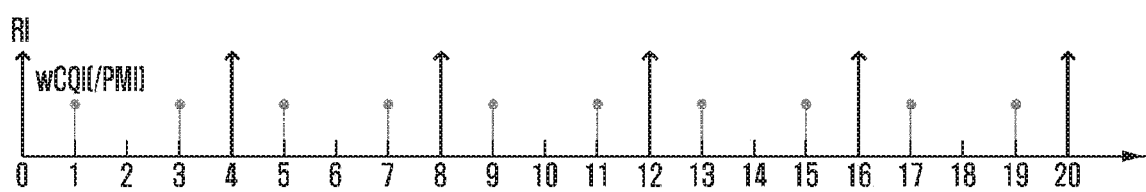
FIG. 2B is a diagram illustrating feedback timing of RI and wCQI in an LTE system.

FIG. 2B is a diagram illustrating feedback timing of RI and wCQI in case where $N_{pd}=2$, $M_{RI}=2$, $N_{OFFSET,CQI}=1$, and $N_{OFFSET,RI}=-1$. In FIG. 2B, each timing indicates a subframe index.

Feedback mode 1-1 has the same feedback timing as that of feedback mode 1-0, but is different from the feedback mode 1-0 on the point that wCQI and PMI are transmitted together in the wCQI transmission timing.

In feedback mode 2-0, the feedback period for sCQI is $N_{pd}$, and the offset value is $N_{OFFSET,CQI}$. Further, the feedback period for wCQI is $H \cdot N_{pd}$, and the offset value is $N_{OFFSET,CQI}$ that is the same offset value as the offset value of sCQI. Here, K that is defined as $H=J \cdot K+1$ is transferred as a higher layer signal, and J is a value determined in accordance with the system bandwidth.

For example, the J value for the 10 MHz system is defined as 3. As a result, the wCQI is once transmitted every H times sCQI transmission in replacement thereof. Further, the period of RI is $M_{RI} \cdot H \cdot N_{pd}$, and the offset is $N_{OFFSET,CQI} + N_{OFFSET,RI}$.

Figure 2C:
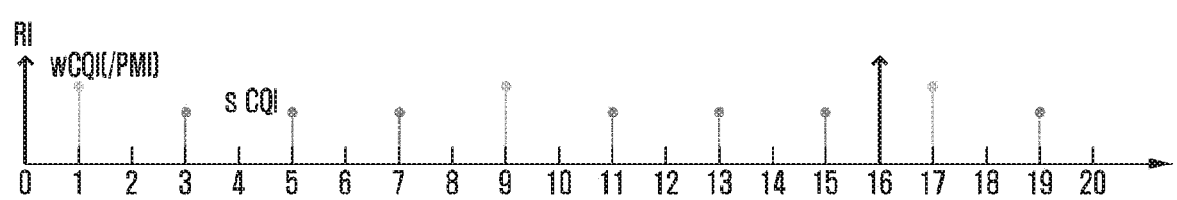
FIG. 2C is a diagram illustrating feedback timing of RI, sCQI, and wCQI in an LTE system.

FIG. 2C is a diagram illustrating feedback timing of RI, sCQI, and wCQI for a case of $N_{pd}=2$, $M_{RI}=2$, J=3 (10 MHz), K=1, $N_{OFFSET,CQI}=1$, and $N_{OFFSET,RI}=-1$.

Feedback mode 2-1 has the same feedback timing as that of feedback mode 2-0, but is different from the feedback mode 2-0 on the point that PMI is transmitted together in the wCQI transmission timing.

The above-described feedback timing corresponds to a case where the number of CSI-RS antenna ports is four or less, and in case of the terminal allocated with CSI-RSs for eight antenna ports, unlike the above-described feedback timing, two kinds of PMI information should be fed back. With respect to 8 CSI-RS antenna ports, feedback mode 1-1 is divided into two submodes again. In the first submode, RI is transmitted together with the first PMI information, and the second PMI information is transmitted together with wCQI. Here, the feedback period and the offset for wCQI and the second PMI are defined as $N_{pd}$ and $N_{OFFSET,CQI}$, and the feedback period and the offset value for RI and the first PMI information are defined as $M_{RI} \cdot N_{pd}$ and $N_{OFFSET,CQI} + N_{OFFSET,RI}$, respectively. Here, if it is assumed that a precoding matrix corresponding to the first PMI is W1, and a precoding matrix corresponding to the second PMI is W2, the terminal and the base station share information that the precoding matrix preferred by the terminal has been determined as W1W2.

In feedback mode 2-1 for 8 CSI-RS antenna ports, feedback of precoding type indicator (PTI) information is added. PTI is fed back together with RI, and its period and offset are defined as $M_{RI} \cdot H \cdot N_{pd}$ and $N_{OFFSET,CQI} + N_{OFFSET,RI}$, respectively. If PTI is 0, all the first PMI, the second PMI, and wCQI are fed back, and wCQI and the second PMI are transmitted together in the same timing. The period is $N_{pd}$, and the offset is given as $N_{OFFSET,CQI}$. Further, the period of the first PMI is $H' \cdot N_{pd}$, and the offset is $N_{OFFSET,CQI}$. Here, H' is transferred as a higher layer signal. In contrast, if PTI is 1, the PTI is transmitted together with RI, wCQI and the second PMI are transmitted together, and sCQI is additionally fed back in a separate timing. In this case, the first PMI is not transmitted. The period and the offset of PTI and RI are the same as those in case where PTI is 0, and sCQI is defined to have the period of $N_{pd}$ and the offset of $N_{OFFSET,CQI}$. Further, wCQI and the second PMI are fed back with the period of $H \cdot N_{pd}$ and the offset of $N_{OFFSET,CQI}$, and H is defined as a case where the number of CSI-RS antenna ports is 4.

Figure 2D:
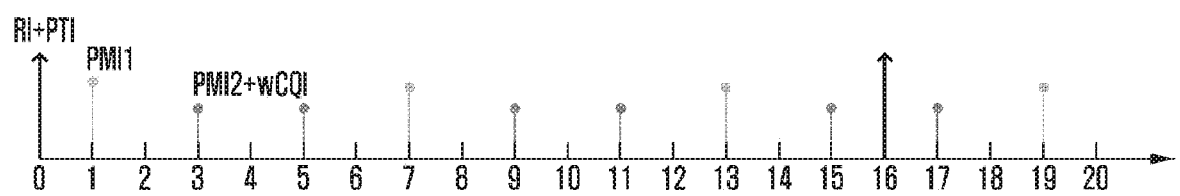
FIG. 2D is a diagram illustrating feedback timing in case of PTE=0 in an LTE system.
Figure 2E:
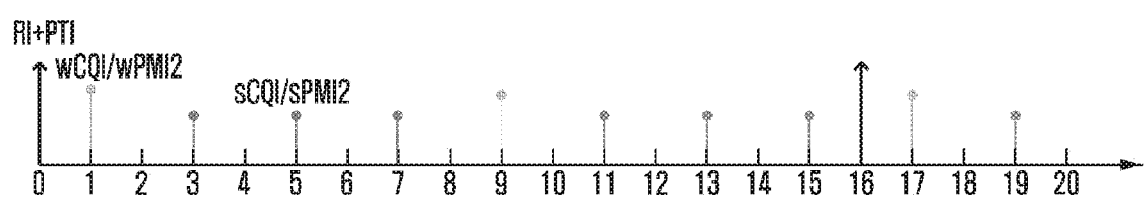
FIG. 2E is a diagram illustrating feedback timing in case of PTE=1 in an LTE system.

FIGS. 2D and 2E are diagrams illustrating feedback timing in case of PTI=0 and PTI=1 with respect to a case of $N_{pd}=2$, $M_{RI}=2$, J=3(10 MHz), K=1, H'=3, $N_{OFFSET,CQI}=1$, and $N_{OFFSET,RI}=-1$.

In LTE/LTE-A, the terminal supports not only periodic feedback but also aperiodic feedback. If it is desired to obtain aperiodic feedback information of a specific terminal, the base station performs uplink data scheduling of the corresponding terminal by configuring an aperiodic feedback indicator included in downlink control information (DCI) for uplink data scheduling of the corresponding terminal to perform specific aperiodic feedback. If an indicator configured to perform the aperiodic feedback is received on the n-th subframe, the corresponding terminal performs uplink transmission through inclusion of the aperiodic feedback information in data transmission on the (n+k)-th subframe. Here, k is a parameter defined in the 3GPP LTE Release 11. During frequency division duplexing (FDD), k is 4, and during time division duplexing (TDD), k is defined as in table 1.

TABLE 1

K value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

If the aperiodic feedback is configured, the feedback information includes RI, PMI, and CQI like the periodic feedback, and RI and PMI may not be fed back in accordance with the feedback configuration. Further, CQI may include both wCQI and sCQI, or may include only wCQI information.

In LTE/LTE-A, codebook subsampling function is provided for periodic channel state report. In LTE/LTE-A, periodic feedback of the terminal is transmitted to the base station through PUCCH. Since an amount of information that can be transmitted at a time through PUCCH is limited, various feedback objects, such as RI, wCQI, sCQI, PMI1, wPMI2, and sPMI2, may be transmitted on PUCCH through subsampling, or two or more kinds of feedback information may be encoded together and transmitted on (joint encoding) PUCCH. As an example, if eight CSI-RS ports are configured by the terminal, RI and PMI1 reported in submode 1 of PUCCH mode 1-1 may be joint-encoded as described in Table 2a. Based on Table 2a, RI composed of 3 bits and PMI1 composed of 4 bits are joint-encoded as 5 bits in total.

In submode 2 of PUCCH mode 1-1, as in Table 2b, PMI1 composed of 4 bits and PMI2 composed of another 4 bits are joint-encoded as 4 bits in total. Since the subsampling level is higher than that of submode 1 (in case of submode 1, 4→3, and in case of submode 2, 8→4), more precoding indexes cannot be reported. As another example, if eight CSI-RS ports are configured by the base station, PMI2 reported in PUCCH mode 2-1 may be subsampled as in Table 2c. Referring to Table 2c, PMI2 is reported as 4 bits if associated RI is 1. However, if associated RI is 2 or more, differential CQI for the second codeword should be additionally reported together, and it can be known that PMI2 is subsampled and reported as 2 bits. In LTE/LTE-A, it is possible to apply subsampling or joint encoding for six kinds of periodic feedbacks in total including those in Tables 2a, 2b, and 2c as described above.

TABLE 2a

Joint encoding of RI and $i_1$ for PUCCH mode 1-1 submode 1

| Value of joint encoding of RI from the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 2b

Joint encoding of RI, $i_1$ and $i_2$ for PUCCH mode 1-1 submode 2

| RI | Relationship between the first PMI value and codebook index $i_1$ | | Relationship between the second PMI value and codebook index $i_2$ | | total #bits |
|---|---|---|---|---|---|
| | Value of the first PMI $I_{PMI1}$ | Codebook index $i_1$ | Value of the second PMI $I_{PMI2}$ | Codebook index $i_2$ | |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4[I_{PMI2}/4] + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 2c

PUCCH mode 2-1 codebook subsampling

| | | Relationship between the second PMI value and codebook index $i_2$ |
|---|---|---|
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 - [I_{PMI2}/2] + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

As described above, in order to effectively implement the FD-MIMO system, it is required for the terminal to accurately measure a channel state and the size of interference, generate effective channel state information using this, and report the generated channel state information to the base station. The base station having received the channel state information determines to what terminals it performs transmission in relation to downlink transmission, at what data transmission speed it performs transmission, and what precoding it applies using the channel state information. In case of the FD-MIMO system, since there are a large number of transmission antennas therein, two-dimensional (2D) antenna array may be considered, and thus the shape of the antenna array capable of being actually applied may be quite diversified. Accordingly, it is not suitable to apply the channel state information transmission/reception method for the LTE/LTE-A system designed in consideration of only up to eight one-dimensional (1D) array transmission antennas to the FD-MIMO system as it is. In order to optimize the FD-MIMO system, it is necessary to define a new codebook applicable to diverse types of antenna array shapes.

In one aspect of the present disclosure to achieve the above-described objects, a method by a base station for receiving feedback information in a mobile communication system includes transmitting configuration information on at least one reference signal to a terminal; measuring the at least one reference signal and transmitting to the terminal feedback configuration information for generating the feedback information in accordance with the result of the measurement; transmitting the at least one reference signal to the terminal; and receiving the feedback information transmitted from the terminal in feedback timing in accordance with the feedback configuration information.

In another aspect of the present disclosure, a base station receiving feedback information from a terminal in a mobile communication system includes a communication unit configured to transmit/receive signals to/from the terminal; and a controller configured to transmit configuration information on at least one reference signal to the terminal, measure the at least one reference signal and transmit to the terminal feedback configuration information for generating the feedback information in accordance with the result of the measurement, transmit the at least one reference signal to the terminal, and receive the feedback information transmitted from the terminal in feedback timing in accordance with the feedback configuration information.

In still another aspect of the present disclosure, a method by a terminal for transmitting feedback information in a mobile communication system includes receiving configuration information on at least one reference signal from a base station; measuring the at least one reference signal and receiving from the base station feedback configuration information for generating the feedback information in accordance with the result of the measurement; receiving the at least one reference signal from the base station; measuring the received at least one reference signal and generating the feedback information in accordance with the feedback configuration information, and transmitting the generated feedback information to the base station in feedback timing in accordance with the feedback configuration information.

In still another aspect of the present disclosure, a terminal transmitting feedback information to a base station in a mobile communication system includes a communication unit configured to transmit/receive signals to/from the base station; and a controller configured to receive configuration information on at least one reference signal from the base station, measure the at least one reference signal and receive from the base station feedback configuration information for generating the feedback information in accordance with the result of the measurement, receive the at least one reference signal from the base station, measure the received at least one reference signal and generate the feedback information in accordance with the feedback configuration information, and transmit the generated feedback information to the base station in feedback timing in accordance with the feedback configuration information.

In general, in case of the FD-MIMO system, there are a large number of transmission antennas therein, and CSI-RS that is in proportion to this should be transmitted. As an example, in case of using 8 transmission antennas in LTE/LTE-A, the base station measures the downlink channel state by transmitting the CSI-RS corresponding to 8-port to the terminal. In this case, in transmitting the CSI-RS corresponding to 8-port, the base station should use radio resources composed of 8 REs, such as A and B of FIG. 2B, in one RB. In case of applying such LTE/LTE-A type CSI-RS transmission to FD-MIMO, radio resources that are in proportion to the number of transmission antennas should be allocated to the CSI-RS. That is, if 128 transmission antennas are provided in the base station, the base station should transmit the CSI-RS using 128 REs in total in one RB. Such a CSI-RS transmission scheme can heighten accuracy of channel measurement between antennas, but has a reverse effect on reduction of the radio resources that are necessary for radio data transmission/reception since it requires excessive radio resources. Accordingly, in the base station having a large number of transmission antennas, such as the FD-MIMO, in consideration of such merits and demerits, two following methods may be considered in transmitting the CSI-RS.

CSI-RS transmission method 1: Transmission method through allocation of radio resources as many as the number of antennas to the CSI-RS CSI-RS transmission method 2: Transmission method through separation of the CSI-RS into a plurality of dimensions FIG. 2F illustrates CSI-RS transmission methods 1 and 2.

Figure 2F:
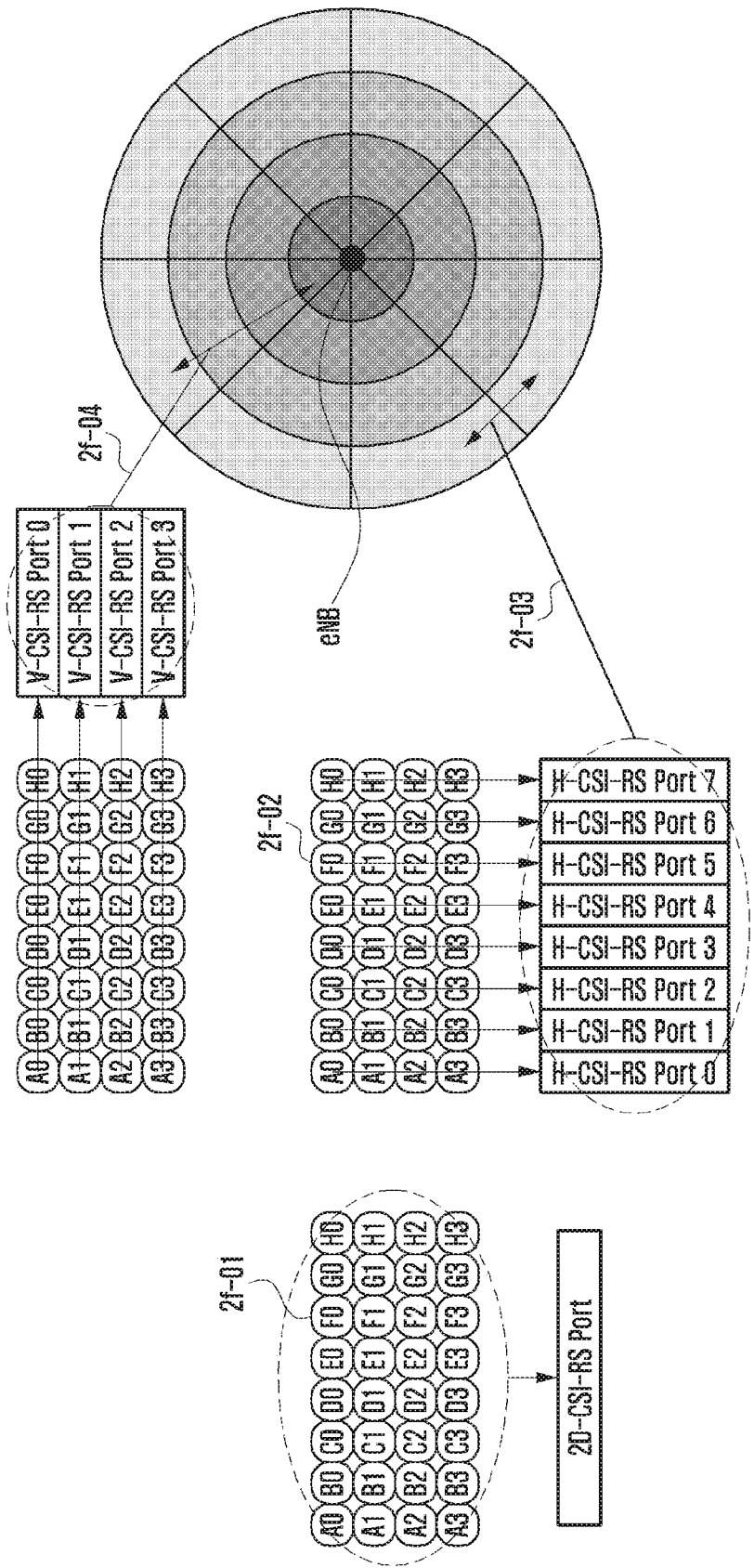
FIG. 2F is a diagram illustrating a CSI-RS transmission method in an LTE system.

Referring to FIG. 2F, the base station operating the FD-MIMO is composed of 32 antennas in total. In FIG. 2F, 2f-01 denotes a transmission method through allocation of radio resources as many as the number of antennas suing the CSI-RS transmission method 1. In 2f-01, 32 antennas are denoted as A0 to A3, B0 to B3, C0 to C3, D0 to D3, E0 to E3, F0 to F3, G0 to G3, and H0 to H3. In 2f-01, 32 antennas transmit one two-dimensional (2D) CSI-RS, and the 2D-CSI-RS for measuring channel states of antennas in all horizontal and vertical directions is composed of 32 antenna ports as denoted above. This method can heighten the accuracy of channel information through allocation of all radio resources for antennas, but is not effective in resource efficiency since it uses a relatively large amount of radio resources for control information or data.

In FIG. 2F, 2f-02 denotes a method enabling the terminal to perform channel measurement for a large number of transmission antennas as allocating a relatively small number of radio resources although the accuracy of the channel information is relatively low using the CSI-RS transmission method 2. This is a transmission method through separation of the whole CSI-RS into N dimensions, and as an example, if the transmission antennas of the base station are 2D-arranged as shown in FIG. 1, the CSI-RS is 2D-separated to be transmitted. In this case, one CSI-RS is operated as horizontal CSI-RS (or may be called first CSI-RS) for measuring channel information in horizontal direction, and the other CSI-RS is operated as vertical CSI-RS (or may be called second CSI-RS) for measuring channel information in vertical direction. In FIG. 2F, 32 antennas in 2f-02 are denoted as A0 to A3, B0 to B3, C0 to C3, D0 to D3, E0 to E3, F0 to F3, G0 to G3, and H0 to H3 in the same manner as 2f-01. Through 32 antennas of FIG. 2F, two CSI-RSs are transmitted. In this case, H-CSI-RS for measuring the channel state in the horizontal direction is composed of eight antenna ports as follows.

H-CSI-RS port 0: Obtained by combining antennas A0, A1, A2, and A3

H-CSI-RS port 1: Obtained by combining antennas B0, B1, B2, and B3

H-CSI-RS port 2: Obtained by combining antennas C0, C1, C2, and C3

H-CSI-RS port 3: Obtained by combining antennas D0, D1, D2, and D3

H-CSI-RS port 4: Obtained by combining antennas E0, E1, E2, and E3

H-CSI-RS port 5: Obtained by combining antennas F0, F1, F2, and F3

H-CSI-RS port 6: Obtained by combining antennas G0, G1, G2, and G3

H-CSI-RS port 7: Obtained by combining antennas H0, H1, H2, and H3

As described above, generation of one CSI-RS port through combination of a plurality of antennas means antenna virtualization, which is generally performed through linear combination of a plurality of antennas. Further, V-CSI-RS for measuring the channel state in the vertical direction is composed of four antenna ports as follows.

V-CSI-RS port 0: Obtained by combining antennas A0, B0, C0, D0, E0, F0, G0, and H0

V-CSI-RS port 1: Obtained by combining antennas A1, B1, C1, D1, E1, F1, G1, and H1

V-CSI-RS port 2: Obtained by combining antennas A2, B2, C2, D2, E2, F2, G2, and H2

V-CSI-RS port 3: Obtained by combining antennas A3, B3, C3, D3, E3, F3, G3, and H3

As described above, if a plurality of antennas are 2D-arranged as M×N (vertical direction×horizontal direction), FD-MIMO channel can be measured using N horizontal CSI-RS ports and M vertical CSI-RS ports. That is, in case of using two CSI-RSs, channel state information can be grasped using M+N CSI-RS ports for M×N transmission antennas. As described above, grasping of information on a larger number of transmission antennas using a smaller number of CSI-RS ports is important in reducing CSI-RS overhead. As described above, channel information on FD-MIMO transmission antennas is grasped using M×N=K CSI-RSs, and such an access may be applied in the same manner even in case of using two CSI-RSs. In the present disclosure, explanation has been made on the assumption of the CSI-RS transmission method 1, and it is to be noted that extension and application can be used in the same manner even in case of using the CSI-RS transmission method 2.

In order to support the plurality of antennas, the CSI-RS port can be supported to tie existing 2, 4, 8 port CSI-RSs in a bundle. Such CSI-Rs port support may differ depending on whether the corresponding method uses non-precoded (NP) CSI-RS for transmitting wide beam CSI-RS in the same manner as the existing 2, 4, 8 port CSI-RSs or beamformed (BF) CSI-RS for reducing CSI-RS overhead using beamforming on the antennas. In order to support the corresponding NP CSI-RS and the BF CSI-RS, CSI-RS port locations for the existing 1, 2, 4, 8 CSI-RS ports or CSI-RS resources may be tied in a bundle. Table 2d below describes configuration for such NP and BF CSI-RSs.

[Table 2d]: CQI Report Configuration for NP CSI-RS and BF CSI-RS Transmission, CSI-Process Configuration, and CSI-RS Related Configuration Information

```
-- ASN1START
CQI-ReportConfig ::=        SEQUENCE {
   cqi-ReportModeAperiodic     CQI-ReportModeAperiodic OPTIONAL,   --
Need OR
```

-continued

```
    nomPDSCH-RS-EPRE-Offset      INTEGER (-1..6),
    cqi-ReportPeriodic           CQI-ReportPeriodic    OPTIONAL
        -- Need ON
}
CQI-ReportConfig-v920 ::=    SEQUENCE {
    cqi-Mask-r9              ENUMERATED {setup}    OPTIONAL,
    -- Cond cqi-Setup
    pmi-RI-Report-r9         ENUMERATED {setup}    OPTIONAL    -- Cond
PMIRI
}
CQI-ReportConfig-r10 ::= SEQUENCE {
    cqi-ReportAperiodic-r10           CQI-ReportAperiodic-r10
        OPTIONAL,    -- Need ON
nomPDSCH-RS-EPRE-Offset      INTEGER (-1..6),
    cqi-ReportPeriodic-r10     CQI-ReportPeriodic-r10    OPTIONAL,  --
Need ON
    pmi-RI-Report-r9          ENUMERATED {setup}         OPTIONAL,   -
- Cond PMIRIPCell
    csi-SubframePatternConfig-r10    CHOICE {
        release                    NULL,
        setup                      SEQUENCE {
            csi-MeasSubframeSet1-r10    MeasSubframePattern-r10,
            csi-MeasSubframeSet2-r10    MeasSubframePattern-r10
        }
    }                                           OPTIONAL    -- Need
ON
}
CQI-ReportConfig-v1130 ::=    SEQUENCE {
    cqi-ReportPeriodic-v1130      CQI-ReportPeriodic-v1130,
    cqi-ReportBoth-r11            CQI-ReportBoth-r11
}
CQI-ReportConfig-v1250 ::=    SEQUENCE {
    csi-SubframePatternConfig-r12    CHOICE {
        release                    NULL,
        setup                      SEQUENCE {
            csi-MeasSubframeSets-r12        BIT STRING (SIZE (10))
        }
    }                                           OPTIONAL,   -- Need ON
    cqi-ReportBoth-v1250 CQI-ReportBoth-v1250           OPTIONAL,    -- Need
ON
    cqi-ReportAperiodic-v1250 CQI-ReportAperiodic-v1250   OPTIONAL,   -- Need ON
    altCQI-Table-r12        ENUMERATED {
                            allSubframes, csi-SubframeSet1,
                            csi-SubframeSet2, spare1}    OPTIONAL
        -- Need OP
}
CQI-ReportConfig-v13xy ::=    SEQUENCE {
    cqi-ReportBoth-v13x0      CQI-ReportBoth-v13x0    OPTIONAL,   -- Need ON
    cqi-ReportAperiodic-v13xy CQI-ReportAperiodic-v13xy  OPTIONAL,  --
Need ON
    cqi-ReportPeriodic-v13xy  CQI-ReportPeriodic-v13xy   OPTIONAL   --
Need ON
}
CQI-ReportConfigSCell-r10 ::=        SEQUENCE {
    cqi-ReportModeAperiodic-r10    CQI-ReportModeAperiodic OPTIONAL,       -
- Need OR
        nomPDSCH-RS-EPRE-Offset-r10    INTEGER (-1..6),
        cqi-ReportPeriodicSCell-r10    CQI-ReportPeriodic-r10
            OPTIONAL,    -- Need ON
        pmi-RI-Report-r10          ENUMERATED {setup}     OPTIONAL  -
- Cond PMIRISCell
}
CQI-ReportConfigSCell-v13x0 ::=    SEQUENCE {
    cqi-ReportPeriodicSCell-v13x0    CQI-geportPeriodic-v13xy
}
CQI-ReportPeriodic ::=       CHOICE {
    release                    NULL,
    setup                      SEQUENCE {
        cqi-PUCCH-ResourceIndex        INTEGER (0..1185),
        cqi-pmi-ConfigIndex            INTEGER (0..1023),
        cqi-FormatIndicatorPeriodic    CHOICE {
            widebandCQI                NULL,
            subbandCQI                 SEQUENCE {
                k                      INTEGER (1..4)
            }
        },
        ri-ConfigIndex             INTEGER (0..1023)    OPTIONAL,         -
- Need OR
        simultaneousAckNackAndCQI      BOOLEAN
```

```
    }
}
CQI-ReportPeriodic-r10 ::=   CHOICE {
    release             NULL,
    setup               SEQUENCE {
        cqi-PUCCH-ResourceIndex-r10    INTEGER (0..1184),
        cqi-PUCCH-ResourceIndexPl-r10  INTEGER (0..1184)
OPTIONAL,   -- Need OR
        cqi-pmi-ConfigIndex            INTEGER (0..1023),
        cqi-FormatIndicatorPeriodic-r10   CHOICE {
            widebandCQI-r10                SEQUENCE {
                csi-ReportMode-r10         ENUMERATED {submode1, submode2 }
OPTIONAL    -- Need OR
            },
            subbandCQI-r10                 SEQUENCE {
                k                          INTEGER (1..4),
                periodicityFactor-r10      ENUMERATED {n2, n4}
            }
        },
        ri-ConfigIndex            INTEGER (0..1023)    OPTIONAL,
            -- Need OR
        simultaneousAcIcNackAndCQI   BOOLEAN,
        cqi-Mask-r9                   ENUMERATED {setup}    OPTIONAL,
                -- Need OR
        csi-ConfigIndex-r10           CHOICE {
            release                   NULL,
            setup                     SEQUENCE {
                cqi-pmi-ConfigIndex2-r10   INTEGER (0..1023),
                ri-ConfigIndex2-r10        INTEGER (0..1023)    OPTIONAL
-- Need OR
            }
        }     OPTIONAL --
Need ON
    }
}
CQI-ReportPeriodic-v1130 ::= SEQUENCE {
    simultaneousAckNackAndCQI-Format3-r11      ENUMERATED {setup}
        OPTIONAL,    -- Need OR
    cqi-ReportPeriodicProcExtToReleaseList-r11    CQI-ReportPeriodicProcExtToReleaseList-
r11 OPTIONAL,    -- Need ON
    cqi-ReportPeriodicProcExtToAddModList-r11    CQI-ReportPeriodicProcExtToAddModList-
r11 OPTIONAL    -- Need ON
}
CQI-ReportPeriodic-v13xy ::= SEQUENCE {
    cri-ReportConfig-r13       CRI-ReportConfig-r13       OPTIONAL,   -- Need
ON
    simultaneousAckNackAndCQI-Format4-Format5-r13      ENUMERATED {setup}
        OPTIONAL-- Need OR
}
CQI-ReportPeriodicProcExtToAddModList-r11 ::=    SEQUENCE (SIZE (1..maxCQI-
ProcExt-r11)) OF CQI-ReportPeriodicProcExt-r11
CQI-ReportPeriodicProcExtToReleaseList-r11 ::=    SEQUENCE (SIZE (1..maxCQI-ProcExt-
r11)) OF CQI-ReportPeriodicProcExtId-r11
CQI-ReportPeriodicProcExt-r11 ::=    SEQUENCE {
    cqi-ReportPeriodicProcExtId-r11    CQI-ReportPeriodicProcExtId-r11,
    cqi-pmi-ConfigIndex-r11            INTEGER (0..1023),
    cqi-FormatIndicatorPeriodic-r11    CHOICE {
        widebandCQI-r11                SEQUENCE {
            csi-ReportMode-r11         ENUMERATED {submode1, submode2}
OPTIONAL       -- Need OR
        },
        subbandCQI-r11                 SEQUENCE {
            k                          INTEGER (1..4),
            periodicityFactor-r11      ENUMERATED {n2, n4}
        }
    },
    ri-ConfigIndex-r11             INTEGER (0..1023)        OPTIONAL,   --
Need OR
    csi-ConfigIndex-r11            CHOICE {
        release                    NULL,
        setup                      SEQUENCE {
            cqi-pmi-ConfigIndex2-r11     INTEGER (0..1023),
            ri-ConfigIndex2-r11          INTEGER (0..1023)    OPTIONAL     -
- Need OR
        }
    }                                              OPTIONAL,    -- Need
ON ...,
    [[  cri-ReportConfig-r13          CRI-ReportConfig-r13         OPTIONAL --
```

```
Need ON
    ]]
}
CQI-ReportAperiodic-r10 ::=    CHOICE {
    release                 NULL,
    setup                   SEQUENCE {
        cqi-ReportModeAperiodic-r10    CQI-ReportModeAperiodic,
        aperiodicCSI-Trigger-r10    SEQUENCE {
            trigger1-r10            BIT STRING (SIZE (8)),
            trigger2-r10            BIT STRING (SIZE (8))
        }                                               OPTIONAL
        -- Need OR
    }
}
CQI-ReportAperiodic-v1250    ::=   CHOICE {
    release                 NULL,
    setup                   SEQUENCE {
        aperiodicCSI-Trigger-v1250        SEQUENCE {
            trigger-SubframeSetIndicator-r12   ENUMERATED {s1, s2},
            trigger1-SubframeSetIndicator-r12  BIT STRING (SIZE (8)),
            trigger2-SubframeSetIndicator-r12  BIT STRING (SIZE (8))
        }
    }
}
CQI-ReportAperiodic-v13xy    ::=   CHOICE {
    release                 NULL,
    setup                   SEQUENCE {
        cqi-ReportModeAperiodic-r13    CQI-ReportModeAperiodic,
        aperiodicCSI-Trigger-v13xy       SEQUENCE {
            trigger1-r13            BIT STRING (SIZE (32)),
            trigger2-r13            BIT STRING (SIZE (32)),
            trigger3-r13            BIT STRING (SIZE (32)),
            trigger4-r13            BIT STRING (SIZE (32)),
            trigger5-r13            BIT STRING (SIZE (32)),
            trigger6-r13            BIT STRING (SIZE (32))
        }                                               OPTIONAL, --
Need OR
        aperiodicCSI-Trigger2-r13    SEQUENCE {
            trigger1-SubframeSetIndicator-r13 BIT STRING (SIZE (32)),
            trigger2-SubframeSetIndicator-r13 BIT STRING (SIZE (32)),
            trigger3-SubframeSetIndicator-r13 BIT STRING (SIZE (32)),
            trigger4-SubframeSetIndicator-r13 BIT STRING (SIZE (32)),
            trigger5-SubframeSetIndicator-r13 BIT STRING (SIZE (32)),
            trigger6-SubframeSetIndicator-r13 BIT STRING (SIZE (32))
        }                                               OPTIONAL
        -- Need OR
    }
}
CQI-ReportAperiodicProc-r11 ::=    SEQUENCE {
    cqi-ReportModeAperiodic-r11     CQI-ReportModeAperiodic,
    trigger01-r11           BOOLEAN,
    trigger10-r11           BOOLEAN,
    trigger11-r11           BOOLEAN
}
CQI-ReportAperiodicProc-r13 ::=    SEQUENCE {
    trigger001-r13          BOOLEAN,
    trigger010-r13          BOOLEAN,
    trigger011-r13          BOOLEAN,
    trigger100-r13          BOOLEAN,
    trigger101-r13          BOOLEAN,
    trigger110-r13          BOOLEAN,
    trigger111-r13          BOOLEAN}
CQI-ReportModeAperiodic ::=        ENUMERATED {
                                   rm12, rm20, rm22, rm30, rm31,
                                   rm32-v1250, rm10-v13xy, rm11-v13xx
}
CQI-ReportBoth-r11 ::=             SEQUENCE {
    csi-IM-ConfigToReleaseList-r11       CSI-IM-ConfigToReleaseList-r11 OPTIONAL,  -
- Need ON
    csi-IM-ConfigToAddModList-r11        CSI-IM-ConfigToAddModList-r11 OPTIONAL,   -
- Need ON
    csi-ProcessToReleaseList-r11         CSI-ProcessToReleaseList-r11 OPTIONAL,  -- Need
ON
    csi-ProcessToAddModList-r11          CSI-ProcessToAddModList-r11       OPTIONAL
        -- Need ON
}
CQI-ReportBoth-v1250 ::=           SEQUENCE {
    csi-IM-ConfigToReleaseListExt-r12    CSI-IM-ConfigId-v1250    OPTIONAL,  --
Need ON
```

```
        csi-IM-ConfigToAddModListExt-r12    CSI-IM-ConfigExt-r12 OPTIONAL     -- Need
ON
}
CQI-ReportBoth-v13x0 ::=    SEQUENCE {
        csi-IM-ConfigToReleaseListExt-r13   CSI-IM-ConfigToReleaseListExt-r13    OPTIONAL,
        -- Need ON
        csi-IM-ConfigToAddModListExt-r13    CSI-IM-ConfigToAddModListExt-r13    OPTIONAL
        -- Need ON
}
CSI-IM-ConfigToAddModList-r11 ::=       SEQUENCE (SIZE (1..maxCSI-IM-r11)) OF CSI-
IM-Config-r11
CSI-IM-ConfigToAddModListExt-r13 ::=    SEQUENCE (SIZE (1..maxCSI-IM-v13x0)) OF
CSI-IM-Config-r12
CSI-IM-ConfigToReleaseList-r11 ::=      SEQUENCE (SIZE (1..maxCSI-IM-r11)) OF CSI-
IM-ConfigId-r11
CSI-IM-ConfigToReleaseListExt-r13 ::=   SEQUENCE (SIZE (1..maxCSI-IM-v13x0)) OF
CSI-IM-ConfigId-v13x0
CSI-ProcessToAddModList-r11 ::=         SEQUENCE (SIZE (1..maxCSI-Proc-r11)) OF CSI-
Process-r11
CSI-ProcessToReleaseList-r11 ::=    SEQUENCE (SIZE (1..maxCSI-Proc-r11)) OF CSI-
ProcessId-r11
CQI-ReportBothProc-r11 ::=          SEQUENCE {
        ri-Ref-CSI-ProcessId-r11    CSI-ProcessId-r11           OPTIONAL,       --
Need OR
        pmi-RI-Report-r11           ENUMERATED {setup}          OPTIONAL
        -- Need OR
}
CRI-ReportConfig-r13 ::=        CHOICE {
        release                     NULL,
        setup                       SEQUENCE {
            cri-ConfigIndex-r13         CRI-ConfigIndex-r13,
            cri-ConfigIndex2-r13        CRI-ConfigIndex-r13   OPTIONAL    -- Need OR
        }
}
CRI-ConfigIndex-r13 ::=         INTEGER (0..1023)
-- ASN1STOP
-- ASN1START
CSI-Process-r11 ::=     SEQUENCE {
        csi-ProcessId-r11           CSI-ProcessId-r11,
        csi-RS-ConfigNZPId-r11      CSI-RS-ConfigNZPId-r11,
        csi-IM-ConfigId-r11         CSI-IM-ConfigId-r11,
        p-C-AndCBSRList-r11 SEQUENCE (SIZE (1..2)) OF P-C-AndCBSR-r11,
        cqi-ReportBothProc-r11      CQI-ReportBothProc-r11              OPTIONAL,
        -- Need OR
        cqi-ReportPeriodicProcId-r11    INTEGER (0..maxCQI-ProcExt-r11)
        OPTIONAL,       -- Need OR
        cqi-ReportAperiodicProc-r11     CQI-ReportAperiodicProc-r11
            OPTIONAL,       -- Need OR
        ...,
        [[  alternativeCodebookEnabledFor4TXProc-r12 ENUMERATED {true}       OPTIONAL,
        -- Need ON
            csi-IM-ConfigIdList-r12     CHOICE {
                release                 NULL,
                setup                   SEQUENCE (SIZE (1..2)) OF CSI-IM-ConfigId-r12
            }                                           OPTIONAL,   -- Need
ON
            cqi-ReportAperiodicProc2-r12 CHOICE {
                release                 NULL,
                setup                   CQI-ReportAperiodicProc-r11
            }                                           OPTIONAL    -- Need
ON
        ]],
        [[ cqi-ReportAperiodicProc-r13     CQI-ReportAperiodicProc-r13    OPTIONAL,
        -- Need ON
            cqi-ReportAperiodicProc2-r13    CHOICE {
                release                 NULL,
                setup                   CQI-ReportAperiodicProc-r13
            }                                           OPTIONAL,
        -- Need ON
            eMIMO-Type-r13          CSI-RS-ConfigEMIMO-r13          OPTIONAL    -
- Need ON
        ]]
}
P-C-AndCBSR-r11 ::= SEQUENCE {
        p-C-r11                     INTEGER (-8..15),
        codebookSubsetRestriction-r11 BIT STRING
}
P-C-AndCBSR-r13 ::= SEQUENCE {
        p-C-r13                     INTEGER (-8..15),
```

```
        cbsr-Selection-r13        CHOICE{
            nonPrecoded-r13          SEQUENCE {
                codebookSubsetRestrictionl-r13      BIT STRING,
                codebookSubsetRestriction2-r13      BIT STRING
            },
            beamformedK1a-r13            SEQUENCE {
                codebookSubsetRestriction3-r13      BIT STRING
            },
            beamformedKN-r13             SEQUENCE {
                codebookSubsetRestriction-r13       BIT STRING
            }
            ...
}
P-C-AndCBSR-PerResourceConfig-r13 ::= SEQUENCE (SIZE (1..2)) OF P-C-AndCBSR-r13
-- ASN1STOP
-- ASN1START
CSI-RS-Config-r10 ::=     SEQUENCE {
    csi-RS-r10              CHOICE {
        release                 NULL,
        setup                   SEQUENCE {
            antennaPortsCount-r10    ENUMERATED {an1, an2, an4, an8},
            resourceConfig-r10       INTEGER (0..31),
            subframeConfig-r10       INTEGER (0..154),
            p-C-r10                  INTEGER (-8..15)
        }
    }                                          OPTIONAL,
        -- Need ON
    zeroTxPowerCSI-RS-r10    ZeroTxPowerCSI-RS-Conf-r12    OPTIONAL
    --Need ON
}
CSI-RS-Config-v1250 ::=      SEQUENCE {
    zeroTxPowerCSI-R52-r12     ZeroTxPowerCSI-RS-Conf-r12    OPTIONAL,
    -- Need ON
    ds-ZeroTxPowerCSI-RS-r12     CHOICE {
        release                 NULL,
        setup                   SEQUENCE {
            zeroTxPowerCSI-RS-List-r12     SEQUENCE (SIZE (1..maxDS-ZTP-CSI-RS-
r12)) OF ZeroTxPowerCSI-RS-r12
        }
    }                                          OPTIONAL
        -- Need ON
}
CSI-RS-Config-v13x0 ::=    SEQUENCE {
    eMIMO-Type-r13          CSI-RS-ConfigEMIMO-r13       OPTIONAL     --
Need ON
}
CSI-RS-ConfigEMIMO-r13 ::= CHOICE {
    release                 NULL,
    setup                   CHOICE {
        nonPrecoded-r13          CSI-RS-ConfigNonPrecoded-r13,
        beamformed-r13           CSI-RS-ConfigBeamformed-r13
    }
}
CSI-RS-ConfigNonPrecoded-r13 ::=         SEQUENCE {
    p-C-AndCBSRList-r13                P-C-AndCBSR-PerResourceConfig-r13
    OPTIONAL,    -- Need OR
    codebookConfigN1 -r13             ENUMERATED {n1, n2, n3, n4, n8},
    codebookConfigN2-r13              ENUMERATED {n1, n2, n3, n4, n8},
    codebookOverSamplingRateConfig-O1-r13ENUMERATED {n4, n8}
        OPTIONAL,       -- Need OR
    codebookOverSamplingRateConfig-O2-r13 ENUMERATED {n4,n8}
        OPTIONAL,       -- Need OR
    codebookConfig-r13                 INTEGER (1..4),
    csi-IM-ConfigIdList-r13            SEQUENCE (SIZE (1..2)) OF CSI-IM-
ConfigId-r13 OPTIONAL, -- Need OR
    csi-RS-ConfigNZP-EMIMO-r13          CSI-RS-ConfigNZP-EMIMO-r13
        OPTIONAL    -- Need ON
}
CSI-RS-ConfigBeamformed-r13 ::=          SEQUENCE {
csi-RS-ConfigNZPIdListExt-r13            SEQUENCE (SIZE (1..7)) OF CSI-RS-
ConfigNZPId-r13    OPTIONAL,    -- Need OR
    csi-IM-ConfigIdList-r13             SEQUENCE (SIZE (1..8)) OF CSI-IM-
ConfigId-r13   OPTIONAL,    -- Need OR
    p-C-AndCBSR-PerResourceConfigList-r13 SEQUENCE (SIZE (1..8)) OF P-C-AndCBSR-
PerResourceConfig-r13OPTIONAL,    -- Need OR
    ace-For4Tx-PerResourceConfigList-r13      SEQUENCE (SIZE (1..7)) OF BOOLEAN
        OPTIONAL,        -- Need OR
    alternativeCodebookEnabledBeamformed-r13   ENUMERATED {true}    OPTIONAL,    -
- Need OR
```

```
    channelMeasRestriction-r13        ENUMERATED {on}        OPTIONAL  -
- Need OR
}
ZeroTxPowerCSI-RS-Conf-r12 ::= CHOICE {
    release                           NULL,
    setup                             ZeroTxPowerCSI-RS-r12
}
ZeroTxPowerCSI-RS-r12 ::= SEQUENCE {
    zeroTxPowerResourceConfigList-r12    BIT STRING (SIZE (16)),
    zeroTxPowerSubframeConfig-r12        INTEGER (0..154)
}
-- ASN1STOP
```

Using the field, 8, 12, 16, or more CSI-RS ports are supported in NP CSI-RS using locations for the existing CSI-RSs in one subframe. The corresponding field is configured in CSI-RS-ConfigNZP-EMIMO. Using this, the terminal can grasp and receive the locations for the CSI-RS resources. Further, in BF CSI-RS, individual CSI-RS resources that may have different CSI-RS port numbers, subframes, and codebook subset restrictions are tied to be used as the BF CSI-RS using csi-RS-ConfigNZPIdListExt-r13 and csi-IM-ConfigIdListExt-r13. In the NP CSI-RS, a new 2D codebook is necessary to support 2D antennas, and this may differ depending on antennas for dimensions, oversampling factor, and codebook configuration.

In explaining the present disclosure, the following shortened words are used.

RI: Rank indicator indicating the rank obtained by simultaneously applying precoding in horizontal and vertical directions to 2D-CSI-RS that is reported to the base station by the terminal, or determined by a predetermined rule i1: The first precoding matrix indicator indicating the optimum precoding obtained based on a channel obtained by applying 2D precoding to 2D-CSI-RS and reported to the base station by the terminal. The first precoding matrix indicator may indicate a beam group selected in horizontal and vertical directions.

i11: Beam group selected from 2D-CSI-RS in the first dimension. It may be partial bits of W1 bit payload.

i12: Beam group selected from 2D-CSI-RS in the second dimension. It may be partial bits of W1 bit payload.

i2: The second precoding matrix indicator indicating the optimum precoding obtained based on a channel obtained by applying 2D precoding to 2D-CSI-RS and reported to the base station by the terminal. The second precoding matrix indicator may indicate co-phasing required to compensate for a phase difference between antennas having different polarization from that of a beam selected from a beam group selected in horizontal and vertical directions.

CQI: Terminal supportable data rate generated on the assumption that 2D precoding is simultaneously applied.

The structure of a 2D codebook may be expressed as in the following equation.

$$W = (W_{11} \otimes W_{12}) W_2 = W_1 W_2$$

In this case, W11 and W12 are selected by i11 and i12 of PMI. In this case, such an equation may be directly expressed in the codebook, or may indirectly appear. Further, in the same manner as i11/i12, W2 is selected by i2. Tables 2e-a to 2e-d below exemplarily express rank1 2D codebook using such a 2D codebook structure.

TABLE 2e-a

Codebook for 1-layer CSI reporting using antenna ports 15 to 14 + P

| Value of Codebook-Config | $i_{1,1}$ | $i_{1,2}$ | | |
|---|---|---|---|---|
| 1 | $0, 1, \ldots, O_1 N_1 - 1$ | $0, 1, \ldots, O_2 N_2 - 1$ | | |
| | $i_2$ | | | |
| | 0 | 1 | 2 | 3 |
| | $W_{i_{1,1},i_{1,2},0}^{(1)}$ | $W_{i_{1,1},i_{1,2},1}^{(1)}$ | $W_{i_{1,1},i_{1,2},2}^{(1)}$ | $W_{i_{1,1},i_{1,2},3}^{(1)}$ | where $W_{l,m,n}^{(1)} = \dfrac{1}{\sqrt{P}} \begin{bmatrix} v_{l,m} \\ \varphi_n v_{l,m} \end{bmatrix}$ TABLE 2e-b Codebook for 1-layer CSI reporting using antenna ports 15 to 14 + P

| Value of Codebook-Config | $i_{1,1}$ | $i_{1,2}$ | $i_2$ | | | |
|---|---|---|---|---|---|---|
| | | | 0 | 1 | 2 | 3 |
| 2 | $0, 1, \ldots, \dfrac{N_1 O_1}{2} - 1$ | $0, 1, \ldots, \dfrac{N_2 O_2}{2} - 1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |

| Value of Codebook-Config | $i_{1,1}$ | $i_{1,2}$ | $i_2$ | | | |
|---|---|---|---|---|---|---|
| | | | 4 | 5 | 6 | 7 |
| 2 | $0, 1, \ldots, \dfrac{N_1 O_1}{2} - 1$ | $0, 1, \ldots, \dfrac{N_2 O_2}{2} - 1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |

TABLE 2e-b-continued

Codebook for 1-layer CSI reporting using antenna ports 15 to 14 + P

| Value of Codebook-Config | $i_{1,1}$ | $i_{1,2}$ | $i_2$ 8 | 9 | 10 | 11 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |

| Value of Codebook-Config | $i_{1,1}$ | $i_{1,2}$ | $i_2$ 12 | 13 | 14 | 15 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ | where $W^{(1)}_{l,m,n} = \frac{1}{\sqrt{P}} \begin{bmatrix} v_{l,m} \\ \varphi_n v_{l,m} \end{bmatrix}$ TABLE 2e-c Codebook for 1-layer CSI reporting using antenna ports 15 to 14 + P

| Value of Codebook-Config | $i_{1,1}$ | $i_{1,2}$ | $i_2$ 0 | 1 | 2 | 3 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |

| Value of Codebook-Config | $i_{1,1}$ | $i_{1,2}$ | $i_2$ 4 | 5 | 6 | 7 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |

| Value of Codebook-Config | $i_{1,1}$ | $i_{1,2}$ | $i_2$ 8 | 9 | 10 | 11 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+1,2y+1,0}$ | $W^{(1)}_{2x+1,2y+1,1}$ | $W^{(1)}_{2x+1,2y+1,2}$ | $W^{(1)}_{2x+1,2y+1,3}$ |

| Value of Codebook-Config | $i_{1,1}$ | $i_{1,2}$ | $i_2$ 12 | 13 | 14 | 15 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+3,2y+1,0}$ | $W^{(1)}_{2x+3,2y+1,1}$ | $W^{(1)}_{2x+3,2y+1,2}$ | $W^{(1)}_{2x+3,2y+1,3}$ | where $x = i_{1,1}$, $y = i_{1,2}$, $W^{(1)}_{l,m,n} = \frac{1}{\sqrt{P}} \begin{bmatrix} v_{l,m} \\ \varphi_n v_{l,m} \end{bmatrix}$, if $N_1 \geq N_2$ $x = i_{1,2}$, $y = i_{1,1}$, $W^{(1)}_{l,m,n} = \frac{1}{\sqrt{P}} \begin{bmatrix} v_{m,l} \\ \varphi_n v_{m,l} \end{bmatrix}$, if $N_1 < N_2$ TABLE 2e-d Codebook for 1-layer CSI reporting using antenna ports 15 to 14 + P

| Value of Codebook-Config | $i_{1,1}$ | $i_{1,2}$ | $i_2$ | | | |
|---|---|---|---|---|---|---|
| | | | 0 | 1 | 2 | 3 |
| 4 | $0, 1, \ldots, \frac{N_1 O_1}{2} - 1$ | $0, 1, \ldots, \frac{N_2 O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ | | | |
|---|---|---|---|---|---|---|
| | | | 4 | 5 | 6 | 7 |
| 4 | $0, 1, \ldots, \frac{N_1 O_1}{2} - 1$ | $0, 1, \ldots, \frac{N_2 O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| Value of Codebook-Config | $i_{1,1}$ | $i_{1,2}$ | $i_2$ | | | |
|---|---|---|---|---|---|---|
| | | | 8 | 9 | 10 | 11 |
| 4 | $0, 1, \ldots, \frac{N_1 O_1}{2} - 1$ | $0, 1, \ldots, \frac{N_2 O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

Figure 2G:
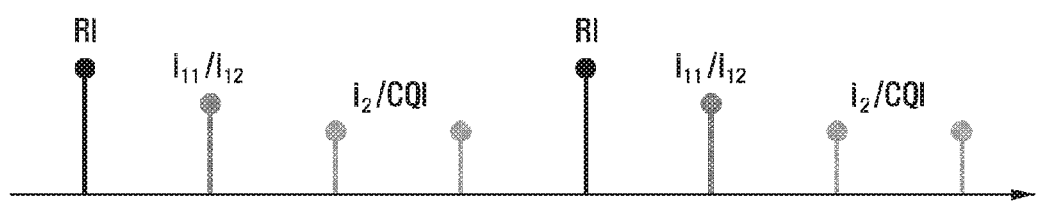
FIG. 2G is a diagram illustrating a report method having three types of report time points proposed in the present disclosure.

| Value of Codebook-Config | $i_{1,1}$ | $i_{1,2}$ | $i_2$ | | | |
|---|---|---|---|---|---|---|
| | | | 12 | 13 | 14 | 15 |
| 4 | $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}$, if $N_1 < N_2$ N1, N2, O1, and O2 config that are required in the above-described tables are equal to codebookConfigN1, codebookConfigN2, codebookOverSamplingRateConfig-O1, codebookOverSamplingRateConfig-O2, and codebookConfig in Table 2d. In this case, N1 and N2 are parameters for indicating the number of antennas supported in the first and second dimensions, and O1 and O2 are oversampling factors for indicating how minutely such a precoder is dividedly configured. The codebookConfig is a parameter for supporting the beam group shape optimized to various types of antenna arrays, and "1" is configuration in which the beam group is not supported, but only one beam and co-phasing selection is supported by i1. Configuration 2 has a square beam group for supporting a 2D type channel having low angular spread, and configuration 3 has a wide beam group shape in the form of a chessboard for supporting a 2D type channel having high angular spread. Configuration 4 is to support a 1D type beam group, and has a horizontally long beam group shape. In Rel-13 FD-MIMO, a subband channel state report having three existing report time points can be extended to a full-band and a subband to support a periodic channel state report based on the codebook. FIG. 2G is a diagram illustrating the corresponding operation.

Through analysis of PMI bits of the codebook, bits for i2 (W2) report are smaller than 4 bits, and thus the existing channel state report method can be used. However, in case of i11/i12, PMI bits are increased with respect to N1, N2, O1, O2, and CodebookConfig supported as in Table 2f below.

TABLE 2f

PMI overhead analysis of 2D codebook

| (N1, N2) | (O1, O2) combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

Config = 1

| (N1, N2) | (O1, O2) | W11/W12 bits | (O1, O2) | W11/W12 bits |
|---|---|---|---|---|
| (8, 1) | (4, —) | 5 + 2 bits | (8, —) | 6 + 2 bits |
| (2, 2) | (4, 4) | 3 + 1 bits/3 bits | (8, 8) | 4 + 1 bits/4 bits |
| (2, 3) | (8, 4) | 4 + 1 bits/4 bits | (8, 8) | 4 + 1 bits/5 bits |
| (3, 2) | (8, 4) | 5 + 1 bits/3 bits | (4, 4) | 4 + 1 bits/3 bits |
| (2, 4) | (8, 4) | 4 + 1 bits/4 bits | (8, 8) | 4 + 1 bits/5 bits |
| (4, 2) | (8, 4) | 5 + 1 bits/3 bits | (4, 4) | 4 + 1 bits/3 bits |

Config = 2, 3, 4

| (N1, N2) | (O1, O2) | W11/W12 bits | (O1, O2) | W11/W12 bits |
|---|---|---|---|---|
| (8, 1) | (4, —) | 4 + 2 bits | (8, —) | 5 + 2 bits |
| (2, 2) | (4, 4) | 2 + 1 bits/2 bits | (8, 8) | 3 + 1 bits/3 bits |
| (2, 3) | (8, 4) | 3 + 1 bits/3 bits | (8, 8) | 3 + 1 bits/4 bits |

TABLE 2f-continued

PMI overhead analysis of 2D codebook

| | | | | |
|---|---|---|---|---|
| (3, 2) | (8, 4) | 4 + 1 bits/2 bits | (4, 4) | 3 + 1 bits/2 bits |
| (2, 4) | (8, 4) | 3 + 1 bits/3 bits | (8, 8) | 3 + 1 bits/4 bits |
| (4, 2) | (8, 4) | 4 + 1 bits/2 bits | (4, 4) | 3 + 1 bits/2 bits |

+k: additional bits for rank 3 and 4

Through identification based on the above table, it can be identified that i1 is maximized in case where (N1,N2,O1, O2)=(2,4,8,8) and Config is 1, and 10 bits should be transmitted. In case of PUCCH format 2 used for the existing periodic channel state report, Reed-Muller code used for channel coding can be transmitted up to 13 bits, whereas in case of an extended CP, HARQ ACK/NACK of 2 bits should be supported, and the payload size actually transmittable in the normal CP state is of 11 bits. For CSI transmission using such PUCCH format 2, ACK/NACK resource indicator (ARI) information is transmitted using a transmit power control (TPC) field, and in case of the CSI transmission, unlike HARQ ACK/NACK transmission in which information required for the corresponding PUCCH transmission can be known through preconfigured information, it is not possible to transfer ARI information through DCI, and thus resources for the corresponding transmission should be preconfigured. This becomes possible through cqi-PUCCH-ResourceIndex and cqi-PUCCH-ResourceIndexP1 in Table 2d.

In case of i1 (W11/W12) bits of Table 2f, it can be identified that the sum of the two does not exceed 11 bits. Accordingly, to solve this, as described above with reference to FIGS. 2D and 2E, CSI reporting instance used in the existing subband is applied to a wideband. In this case, the report time point may be the same as that in the method as described above with reference to FIGS. 2D and 2E. The advantage of this method is that it can perform periodic channel state report by not applying or minimally applying subsampling that may deteriorate the performance. Accordingly, as shown in FIG. 2G, wideband PMI reporting time points for i11/i12 can be separated. In case of the wideband report, this method requires additional reporting instance, and more uplink resources are used in order for the base station to receive the channel state report. Accordingly, if the base station configures a long report period in order to reduce the uplink resource amount, system performance may deteriorate.

As described above with reference to FIGS. 2D and 2E, such a structure requires RI report time, first PMI (i1) report time, and second PMI (i2) and CQI report time in a wideband CQI report mode in the same manner as the report structure of the subband CQI report mode, and thus period configuration of the first PMI (i1) is required even in the wideband CQI report mode. Such an RI report time is configured as below through only CQI period and RI period configuration parameter since the number of subbands does not exist unlike the subband report.

$$(10 \times n_f + \lfloor n_s/2 \rfloor - N_{OFFSET,CQI} - N_{OFFSET,RI}) \mod (N_{pd} \cdot M_{RI}) = 0$$

The second PMI(i2) and CQI report time can be configured with reference to the existing wideband mode report.

$$(10 \times n_f + \lfloor n_s/2 \rfloor - N_{OFFSET,CQI}) \mod N_{pd} = 0$$

The following methods are possible as the first PMI report time configuration method.

First PMI report time configuration method 1: Designate a fixed value in the standard.

First PMI report time configuration method 2: Introduce the same periodicityFactor as that of the subband in widebandCQI field.

First PMI report time configuration method 3: Refer to periodicityFactor field of subbandCQI field.

First PMI report time configuration method 4: Use an equal value to $M_{RI}$ configuration.

The first PMI report time configuration method 1 is a method for fixing the PMI report time to one value. Possible multiple values for the first PMI period configuration using the existing peridocityFactor are 2 and 4, and the actually permitted degree of freedom is not high as compared with the configured degree of freedom. Accordingly, if the PMI report time is fixed to 2 or 4, which is the existing support value, or one other value, the first PMI report time can be configured without necessitating additional RRC configuration. However, this method has the disadvantage that the degree of freedom for the first PMI report time is lost, and thus the degree of freedom of base station configuration is degraded. If the first PMI report time is fixed to 2 through the configuration method 1, it can be expressed as follows.

$$(10 \times n_f + \lfloor n_s/2 \rfloor - N_{OFFSET,CQI}) \mod (2 N_{pd}) = 0$$

In this case, the numeral 2 may be changed to 4 or another fixed numeral, and if the CSI reporting type is configured and the corresponding value is configured to class A (non-precoded CSI-RS) in the terminal in which 'TM9/TM10 is configured in a state where H' parameter is maintained as it is, definition of "the corresponding value is 2" in the standard has the same effect.

$$(10 \times n_f + \lfloor n_s/2 \rfloor - N_{OFFSET,CQI}) \mod (H' \cdot N_{pd}) = 0, H' = 2$$

Further, even in this method, the numeral 2 may be changed to 4 or another numeral.

The first PMI report time configuration method 2 is to introduce the same periodicityFactor as that of the subband to the wideband CQI field. This method is the simplest and flexibly configurable method, and configuration can be introduced as in Table 2h.

[Table 2g]: Periodic Channel State Report Configuration Field for the First PMI Report Time Configuration Method 2

```
cqi-FormatIndicatorPeriodic-r10    CHOICE {
        widebandCQI-r10                SEQUENCE {
            csi-ReportMode-r10     ENUMERATED {submode1,
submode2}   OPTIONAL -- Need OR
            periodicityFactor-r13 ENUMERATED {n2, n4}
        OPTIONAL -- Need OR
        },
        subbandCQI-r10                 SEQUENCE {
            k                          INTEGER (1..4),
            periodicityFactor-r10      ENUMERATED {n2, n4}
        }
    },
```

The corresponding field can be configured in case where the CSI reporting type is configured and the corresponding value is configured to class A (non-precoded CSI-RS) in the terminal in which TM9/TM10 is configured, and this method has the disadvantage that RRC signaling overhead is increased through addition of new periodicityFactor parameter.

The first PMI report time configuration method 3 is a method for configuring the first PMI report time of the wideband CQI report mode with reference to the periodicityFactor field of the subbandCQI field. For this, the first PMI report time may be defined as follows.

$$(10 \times n_f + \lfloor n_s/2 \rfloor - N_{OFFSET,CQI}) \bmod (H' \cdot N_{pd}) = 0,$$
$$H' = \text{periodicityFactor}$$

In this case, the first PMI report time should be configured in association with the periodic channel state report mode configuration. Table 2h shows a configurable periodic channel state report mode supported in L Rel-13.

TABLE 2h

| Periodic channel state report mode | | | |
|---|---|---|---|
| | | PMI Feedback Type | |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Unlike those described in Table 2h, modes 1-0, 1-1, 2-0, and 2-1 can be configured in accordance with the feedback type (wideband/subband) and PMI report/non-report (No PM/Single PMI). In case of operations TM8, TM9, and TM10, unlike the aperiodic channel state report in which an accurate mode value is configured through an RRC field and through this, the corresponding report mode is underway, the periodic channel state report mode operates to select a mode in accordance with PMI/RI report configuration of Table 2d and whether to configure widebandCQI and subbandCQI fields. For example, if PMI/RI report is configured and subbandCQI field is also configured, the terminal recognizes this as configuration of the periodic channel state report mode 2-1. As another example, if the PMI/RI report is not configured, but the widebandCQI field is configure, the terminal recognizes this as configuration of the mode 1-0.

The method for configuring the periodicityFactor field of the subbandCQI field used in the first PMI report time configuration method 3 requires both widebandCQI field and subbandCQI field configurations. Accordingly, in this case, it is not possible to configure the periodic channel state report mode using the existing method. In case where class A (non-precoded CSI-RS) is configured to solve this, it may be grasped that the widebandCQI mode is configured if two fields of widebandCQI and subbandCQI are configured in all, whereas it may be grasped that the subbandCQI mode is configured if only the subbandCQI field is configured. For this, in case where the CSI reporting type is configured and the corresponding value is configured to class A (non-precoded CSI-RS) in the terminal in which TM9/TM10 is configured, it may be defined that the widebandCQI mode is configured if both the widebandCQI and the subbandCQI are configured. In this case, the configuration field may be expressed as follows.

TABLE 2i

| Periodic channel state report configuration field for the first PMI report time configuration method 3 | | | | |
|---|---|---|---|---|
| cqi-FormatIndicatorPeriodic-r13 | SEQUENCE { | | | |
| | widebandCQI-r13 | | SEQUENCE { | |
| | | csi-ReportMode-r13 | ENUMERATED {submode1, submode2} | OPTIONAL -- Need OR |
| | | } | | OPTIONAL -- Need OR, |
| | subbandCQI-r13 | | SEQUENCE { | |
| | | k | INTEGER (1..4), | |
| | | periodicityFactor-r13 | ENUMERATED {n2, n4} | |
| | | } | | OPTIONAL -- Need OR |
| | }, | | | |

In the above-described example, although the field name or field configuration structure may differ, the widebandCQI field and the subbandCQI field can be simultaneously configured, differently from the existing configuration. Further, in case where the CSI reporting type is configured and the corresponding value is configured to class A (non-precoded CSI-RS) in the terminal in which TM9/TM10 is configured like the channel state report mode configuration of the aperiodic channel state report, it may be one method to put a direct mode configuration field.

The first PMI report time configuration method 4 is to use the same value as $M_{RI}$. As described above, $M_{RI}$ is a parameter used to define the RI report time. As described above in the first PMI configuration method 1, if one fixed value is used, the degree of freedom for the first PMI configuration is degraded. For this, the fixed value may be used in association with the RI report period, and this case may be expressed as in an equation below.

$$(10 \times n_f + \lfloor n_s/2 \rfloor - N_{OFFSET,CQI}) \bmod (N_{pd} \cdot M_{RI}) = 0$$

Further, making H' equal to MRI using the existing equation may also be a possible expression method, and may have the same effect. This method may be expressed as in an equation below.

$$(10 \times n_f + \lfloor n_s/2 \rfloor - N_{OFFSET,CQI}) \bmod (H' \cdot N_{pd}) = 0, H' = M_{RI}$$

As described above, not only referring to and using the direct MRI value but also making the H value differ in accordance with the MRI value may be performed in association. For example, this method may be expressed as in a mathematical expression below.

$$(10 \times n_f + \lfloor n_s/2 \rfloor - N_{OFFSET,CQI}) \bmod (H' \cdot N_{pd}) = 0,$$
H'=2, if $1 \leq M_{RI} \leq 4$
H'=4 if $8 \leq M_{RI} \leq 32$ Although the above-described mathematical expression is based on the existing periodicityFactor values of 2 and 4, other values than 2 and 4 may be used, and it is to be noted that as for the condition on $M_{RI}$, not only the above-described values obtained by dividing the existing $M_{RI}$ value into halves but also other conditions can also be used. Like the above-described configuration methods, the above-described condition may be applied in case where the CSI reporting type is configured, the corresponding value is configured to class A (non-precoded CSI-RS), and the current mode is a wideband CQI report mode, in the terminal in which TM9/TM10 is configured. According to this method, the first PMI report period can be flexibly changed in accordance with the RI report period without requiring an overhead for introduction of a new RRC parameter, and thus the degree of freedom can be secured. Further, in case where there are many terminals requiring corresponding channel state reports, uplink resources are not sufficient, or the channel state is not frequently changed, long RI report period is configured to be dividedly used in order to reduce the report amount, and thus it may be effective to use the H' value also in association with the $M_{RI}$ value.

In case of a subband report mode, it may be used with reference to the existing RI report, the first PMI report, and the second PMI and CQI report time points, and at the first PMI report time, unlike the related art, 1i including i11/i12 is transmitted. For the second PMI and CQI report, in the subband CSI reporting, additional information for reporting the subband location is necessary, and thus additional subsampling should be considered in reporting for i2. In case of such subsampling, codebook config 1 that does not support the base group is featured to have small i2 size that is unnecessary, and thus the subsampling is referred to only for partial channel state report corresponding to Config 2, 3, 4. This subsampling table corresponds to Table 2j below.

TABLE 2j codebook subsampling for 8Tx

Relationship between the second PMI value and codebook index $i_2$

| RI | Value of the second PMI $I_{PMI2}$ | Codebook index $i_2$ |
|----|------------------------------------|----------------------|
| 1  | 0-15                               | $I_{PMI2}$           |
| 2  | 0-3                                | $2I_{PMI2}$          |
| 3  | 0-3                                | $8 \cdot [I_{PMI2}/2] + (I_{PMI2} \bmod 2) + 2$ |
| 4  | 0-3                                | $2I_{PMI2}$          |
| 5  | 0                                  | 0                    |
| 6  | 0                                  | 0                    |
| 7  | 0                                  | 0                    |
| 8  | 0                                  | 0                    |

In order to calculate an increase of the corresponding maximum number of PMI bits to support an eFD-MIMO supporting 32 CSI-RS ports at maximum, (N1,N2,O1,O2) having i1 at maximum may be predicted as (N1,N2,O1,O2)=(2,8,8,8). Through this, the size of a codebook may be predicted using a method for calculating the number of PMI bits in the existing codebook. If i11/i12 bits are calculated through conversion into config 1 that requires relatively large i11/i12 bits as compared with config 2, 3, and 4, maximally 11 bits including i11=4+1 (additional bits for notifying of a beam group type at rank 3/4) bits and i12=6 bits become necessary. Accordingly, as described above, the report using PUCCH format 2 can be used as it is. However, if O1 and O2 have values larger than 8, they may have much larger values, and in this case, codebook subsampling may be necessary for report. However, as compared with the Rel-12 wideband report mode supporting only two report time points of RI/i1 and i2/CQI (in submode 1, and RI and i1/i2/CQI in submode 2), the method for reporting a channel state using PUCCH format 2 requires three report time points in discovering information on all finally used RI/i1/i2/CQI using i2/CQI report, and thus inter-subframe dependency) is increased. Considering that the probability of an accurate transfer of the PUCCH transmission is not 100%, the probability that the overall information is not properly transferred becomes heightened. In particular, in consideration of the fact that RI and i1 reports are essential in deciphering i2/CQI information, and for this, a plural pieces of i2/CQI information refer to one piece of RI/i1 information, its importance becomes higher. Further, if transmission through an unlicensed band is supported in Rel-13 LTE, and uplink transmission of a terminal is permitted through Rel-14 LTE, security of a transmission time point through listen before talk (LBT) is absolutely necessary, and thus RI/PMI information may not be transmitted at a predetermined report time. Further, if non-transmitted information is RI/i1, valid information may not be transferred through the subsequent transmission. Accordingly, there is a need for a new method capable of transferring through less report time points, and for this, PUCCH format 3/4/5 that can transmit more bits at a time may be used to transmit channel state information of a single cell. PUCCH format 3 has been introduced to transmit HARQ ACK for several CCs that are necessary in eCA, and up to 11 bits of HARQ ACK/NACK can be supported using a Reed-Muller code that supports up to 11 bits. If HARQ ACK/NACK exceeds 11 bits, up to 22 bits thereof can be supported using dual RM that uses two Reed-Muller codes. Since PUCCH format 3 is used only for HARQ ACK/NACK transmission or accompanying channel state information report, predetermined resources, like those in PUCCH format 2, do not exist. Accordingly, separate resource configuration is necessary to support a periodic channel state report in which HARQ ACK/NACK is not multiplexed through PUCCH format 3. Table 2k below exemplifies a field for the corresponding resource configuration.

[Table 2K]: resource configuration for PUCCH format 3

```
CQI-ReportPeriodic-r10 ::=      CHOICE {
  release                       NULL,
  setup                         SEQUENCE {
    cqi-PUCCH-ResourceIndex-r10         INTEGER (0..1184),
    cqi-PUCCH-ResourceIndexP1-r10       INTEGER (0..1184),
      OPTIONAL,    -- Need OR
    cqi-PUCCH-format3-ResourceIndex-r14          INTEGER (0..549),
  OPTIONAL,    -- Need OR
    cqi-PUCCH-format3-ResourceIndexP1-r14        INTEGER (0..549),
      OPTIONAL,    -- Need OR
    cqi-pmi-ConfigIndex            INTEGER (0..1023),
    cqi-FormatIndicatorPeriodic-r10     CHOICE {
      widebandCQI-r10                   SEQUENCE {
        csi-ReportMode-r10      ENUMERATED {submode1, submode2}
      OPTIONAL    -- Need OR
    },
```

```
        subbandCQI-r10          SEQUENCE {
            k                   INTEGER (1..4),
            periodicityFactor-r10   ENUMERATED {n2, n4}
        }
    },
    ri-ConfigIndex          INTEGER (0..1023)       OPTIONAL,
    -- Need OR
    simultaneousAckNackAndCQI   BOOLEAN,
    cqi-Mask-r9             ENUMERATED {setup}      OPTIONAL,
    -- Need OR
    csi-ConfigIndex-r10     CHOICE {
        release             NULL,
        setup               SEQUENCE {
            cqi-pmi-ConfigIndex2-r10    INTEGER (0..1023),
            ri-ConfigIndex2-r10         INTEGER (0..1023)   OPTIONAL
    --Need OR
        }
    } OPTIONAL                                      --
Need ON
    }
}
```

In Table 2k, resources for Format3 can be configured through cqi-PUCCH-Format3-ResourceIndex and cqi-PUCCH-Format3-ResourceIndexP1. Such a field may be supported in format3 field in PUCCH-format field rather than CQI-ReportPeriodic field. Table 21 exemplifies a field indicating such configuration.

TABLE 21 resource configuration for PUCCH format 3

```
pucch-Format-r13            CHOICE {
    format3-r13                     SEQUENCE {
        n3PUCCH-AN-List-r13     SEQUENCE (SIZE (1..4)) OF INTEGER (0..549)   OPTIONAL,
        -- Need ON
            twoAntennaPortActivatedPUCCH-Format3-r13    CHOICE {
                release                     NULL,
                setup                       SEQUENCE {
                    n3PUCCH-AN-ListP1-r13   SEQUENCE (SIZE (1..4)) OF INTEGER (0..549)
                }
            }                                       OPTIONAL -- Need
ON
            format3-CSI-resourceConfiguration-r14       SEQUENCE (SIZE (1..2)) OF
INTEGER (0..549) OPTIONAL   -- Need OR
    },
    channelSelection-r13        SEQUENCE {
        n1PUCCH-AN-CS-r13               CHOICE {
            release                     NULL,
            setup                       SEQUENCE {
                n1PUCCH-AN-CS-List-r13      SEQUENCE (SIZE (1..2)) OF
N1PUCCH-AN-CS-r10,
                n1PUCCH-AN-CS-ListP1-r13    SEQUENCE (SIZE (2..4)) OF
INTEGER (0..2047)
            }
        }                                           OPTIONAL -- Need
ON
    },
    format4-r13                         SEQUENCE {
        format4-resourceConfiguration-r13       SEQUENCE (SIZE (4)) OF Format4-resource-
r13,
        format4-MultiCSI-resourceConfiguration-r13  SEQUENCE (SIZE (1..2)) OF Format4-
resource-r13 OPTIONAL       -- Need OR
    },
    format5-r13                 SEQUENCE {
        format5-resourceConfiguration-r13       SEQUENCE (SIZE (4)) OF Format5-resource-
r13,
        format5-MultiCSI-resourceConfiguration-r13  Format5-resource-r13 OPTIONAL   --
Need OR
    }
```

PUCCH format 4 and 5 may be transmitted using tailbiting convolutional codes (TBCC). Using QPSK modulation, format 5 is dividedly transmitted to two terminals through an orthogonal sequence. Accordingly, since 1 RB is transmitted on 144 REs using a code rate of 1/3, PUCCH format 4 and 5 (in case of format 4, a plurality of RBs can be configured) capable of transmitting 96 bits (1 RB configuration basis) and 48 bits at maximum can transmit bits as many as the number obtained by multiplying 96 bits by the number of RBs. Resources for such PUCCH format 4 and 5 can be configured using Table 2l and Table 2m below.

TABLE 2m resource configuration for PUCCH format 4 and 5

```
Format4-resource-r13::=           SEQUENCE {
    startingPRB-format4-r13              INTEGER (0..109),
    numberOfPRB-format4-r13              INTEGER (0..7)
}
Format5-resource-r13::=           SEQUENCE {
    startingPRB-format5-r13              INTEGER (0..109),
    cdm-index-format5-r13                INTEGER (0..1)
}
```

Such PUCCH format 3, 4, 5-based report may be applied when the CSI reporting type is configured, the corresponding value is configured as class A (non-precoded CSI-RS), and the terminal in which TM9/TM10 is configured is in a wideband CQI report mode. Further, only part of the 3, 4, and 5 may be used for channel state report of a single cell. However, as compared with format 3/4/5, PUCCH format 2 transmits a smaller number of bits, and thus decoding performance and supportable coverage in single transmission become higher. Accordingly, in case where the base station configures so that the terminal can operate in a desired format, it may perform transmission using a better format in accordance with the situation. For this, the base station may provide configuration for selection. In this case, PUCCH format for a single cell of the terminal, which can be configured by the base station, may be the whole or a part of the format 3/4/5. For example, it may be possible to support only the channel state report using format 3 among the above-described format 3/4/5. As the amount of report used for the channel state information report of a single cell, based on PUSCH 3-2 having the largest amount of information, class A transmits maximally 124 bits including RI in order to transmit RI, wideband first PMI, wideband second PMI, subband second PMIS, and subband differential CQIs. In case of a periodic channel state report based on PUCCH, as compared with PUSCH report mode 3-2 of the aperiodic channel state report, respective bandwidth parts, which defines a subband group by tying several subbands, report only information on the selected subbands. Such bandwidth part may be configured as in Table 2n in accordance with the system bandwidth configuration.

TABLE 2n

Subband size (k) and bandwidth parts (J) vs. downlink system bandwidth

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

As can be identified in Table 2n as described above, unlike the aperiodic channel state report for transmitting information on maximally 13 subbands (in case of 100 RBs), the periodic channel state report requires only information on maximally four bandwidth parts, and thus maximally four pieces of information are necessary. Accordingly, the maximum amount of the periodic channel state report that is transmitted at a time is 69 bits, which is smaller than that of the aperiodic channel state report excluding PTI 69 bits. In case of transmitting such information using PUCCH format 4, it can be transmitted at a time like the aperiodic channel state report. However, since it is possible to perform the periodic channel state report using PUSCH in case of transmitting all information at a time, its utility may be lowered, and such report may not match the periodic channel state report to obtain rough information. For a similar reason, PUCCH format 5 may not be supported in the same manner.

As another example, only PUCCH format 3 and 5 may be supported in addition to PUCCH format 2. As described above, in case of transmitting such information using PUCCH format 4, it can be transmitted at a time like the aperiodic channel state report. However, in case of PUCCH format 5, all information of a wideband CQI mode can be transmitted at a time, but all information of a subband CQI mode cannot be transmitted at a time. Further, a large amount of such information requires a large amount of time delay in receiving the whole information. Accordingly, in case of using format 5, since the whole information can be transferred through only twice report, efficient transmission can be performed, and the system performance can be improved. Further, as another method, the information of the wideband CQI mode may be supported by format 3, and the information of the subband CQI mode may be supported by format 5.

As still another example, only PUCCH format 5 may be supported in addition to PUCCH format 2. In case of PUCCH format 3, although a possible information amount is increased to 22 bits, effects of reducing report time points are relatively low due to the difference of 11 bits as compared with the existing information. Further, in case of PUCCH format 4, all information can be sent at a time, and such a method can be supported using the aperiodic channel state report. Accordingly, the report time points can be reduced at a high level, and as still another method, only format 5 that can show a difference from the aperiodic channel state report may be supported.

As still another example, only PUCCH format 4 may be supported in addition to PUCCH format 2. As described above, in case of PUCCH format 4, all information can be transmitted at a time, and thus the report time points can be reduced at the highest level. Although all information can be sent at a time like the aperiodic channel state report, this case has a wider coverage than the coverage of PUSCH due to the characteristic of PUCCH, and the amount of information is also smaller than that of the aperiodic channel state report. Accordingly, in case of applying such channel state report, the highest effect can be obtained. In this case, if PUCCH format 4 is used for the periodic channel state report based on one cell, transmission becomes possible unless a plurality of RBs are configured, and thus for such an operation, startingPRB-format4 field using only one RB may be additionally configured. Further, in case of the transmission based on PUCCH format 4 during the channel state report for a single cell through the corresponding configuration, numberOfPRB-format 4 may be always considered as 0 (one PRB is always used). Further, in order for several terminals to dividedly use them, offsets can be configured by terminals, and the periodic channel state report for a single cell can be transmitted by applying the offsets by terminals in startingPRB-format4.

As for the report based on PUCCH format 3/4/5 as described above with reference to the examples, for convenience in explanation, PUCCH format 3/4/5 has been directly mentioned, but actual configuration and title may differ from those as mentioned above. For example, terms of alternative periodic CSI reporting, enhanced CSI reporting, and advanced CSI reporting may be used. Further, even in case of the channel state report methods using PUCCH format 3/4/5 to be described below, such terms may be configured and used. Possible methods for configuring PUCCH format use as described in the above-described examples are as follows.

PUCCH format configuration method 1 for periodic channel state report: This method is configured through a direct field.

PUCCH format configuration method 2 for periodic channel state report: This method is indirectly configured through resource configuration.

PUCCH format configuration method 3 for periodic channel state report: This method is configured through a frame structure of the corresponding transmission or band characteristics.

PUCCH format configuration method 4 for periodic channel state report: This method is configured when PMI/RI report is configured.

PUCCH format configuration method 5 for periodic channel state report: This method is configured when sub-band CQI mode is configured.

The PUCCH format configuration method 1 for the periodic channel state report is a configuration method through the direct field. Tables 2o and 2p below correspond to configuration examples for the PUCCH format configuration method 1.

TABLE 2o

Configuration example 1 for PUCCH format configuration method 1

```
CQI-ReportPeriodic-r10 ::=        CHOICE {
    release                       NULL,
    setup                         SEQUENCE {
        cqi-PUCCH-ResourceIndex-r10             INTEGER (0..1184),
        cqi-PUCCH-ResourceIndexP1-r10           INTEGER (0..1184),
            OPTIONAL,   -- Need OR
        cqi-PUCCH-ReportingConfig-r14           ENUMENRATED {format3, format4, format5}
            OPTIONAL,   -- Need OR
        cqi-PUCCH-Format3-ResourceIndex-r10             INTEGER (0..549),
            OPTIONAL,   -- Need OR
        cqi-PUCCH-Format3-ResourceIndexP1-r10           INTEGER (0..549),
            OPTIONAL,   -- Need OR
        cqi-pmi-ConfigIndex                     INTEGER (0..1023),
        cqi-FormatIndicatorPeriodic-r10         CHOICE {
            widebandCQI-r10                         SEQUENCE {
                csi-ReportMode-r10                  ENUMERATED {submode1, submode2}     OPTIONAL -- Need OR
            },
            subbandCQI-r10                          SEQUENCE {
                k                                   INTEGER (1..4),
                periodicityFactor-r10               ENUMERATED {n2, n4}
            }
        },
        ri-ConfigIndex                          INTEGER (0..1023)       OPTIONAL,
            -- Need OR
        simultaneousAckNackAndCQI               BOOLEAN,
        cqi-Mask-r9                             ENUMERATED {setup}      OPTIONAL,
            -- Need OR
        csi-ConfigIndex-r10                     CHOICE {
            release                                 NULL,
            setup                                   SEQUENCE {
                cqi-pmi-ConfigIndex2-r10                INTEGER (0..1023),
                ri-ConfigIndex2-r10                     INTEGER (0..1023)       OPTIONAL    -- Need OR
            }
        }       OPTIONAL                                                                                -- Need ON
    }
}
```

TABLE 2p

Configuration example 2 for PUCCH format configuration method 1

```
CQI-ReportPeriodic-r10 ::=        CHOICE {
    release                       NULL,
    setup                         SEQUENCE {
        cqi-PUCCH-ResourceIndex-r10             INTEGER (0..1184),
            OPTIONAL,   -- Need OR
        cqi-PUCCH-ResourceIndexP1-r10           INTEGER (0..1184),
```

TABLE 2p-continued

Configuration example 2 for PUCCH format configuration method 1

```
        OPTIONAL,    -- Need OR
    cqi-PUCCH-Format3-ReportingConfig-r14      ENUMENRATED {true},
OPTIONAL,    -- Need OR
    cqi-PUCCH-Format4-ReportingConfig-r14      ENUMENRATED {true},
OPTIONAL,    -- Need OR
    cqi-PUCCH-Format5-ReportingConfig-r14      ENUMENRATED {true},
OPTIONAL,    -- Need OR
    cqi-PUCCH-Format3-ResourceIndex-r10            INTEGER (0..549),    OPTIONAL,  --
Need OR
    cqi-PUCCH-Format3-ResourceIndexP1-r10          INTEGER (0..549),
OPTIONAL, -- Need OR
    cqi-pmi-ConfigIndex           INTEGER (0..1023),
    cqi-FormatIndicatorPeriodic-r10           CHOICE {
        widebandCQI-r10                  SEQUENCE {
            csi-ReportMode-r10       ENUMERATED {submode1, submode2}       OPTIONAL --
Need OR
        },
        subbandCQI-r10               SEQUENCE {
            k                            INTEGER (1..4),
            periodicityFactor-r10        ENUMERATED {n2, n4}
        }
    },
    ri-ConfigIndex                INTEGER (0..1023)       OPTIONAL,
                -- Need OR
    simultaneousAckNackAndCQI         BOOLEAN,
    cqi-Mask-r9                   ENUMERATED {setup}       OPTIONAL,
        -- Need OR
    csi-ConfigIndex-r10           CHOICE {
        release                       NULL,
        setup                         SEQUENCE {
            cqi-pmi-ConfigIndex2-r10        INTEGER (0..1023),
            ri-ConfigIndex2-r10             INTEGER (0..1023)       OPTIONAL  -- Need
OR
        }
    }     OPTIONAL                                                       -- Need
ON
    }
}
```

As described above, the configuration method of Table 2o is a method capable of directly configuring corresponding formats in order to configure corresponding PUCCH formats. Such a configuration method may be used more effectively in case of permitting a plurality of formats, that is, format 4 and format 5, rather than permitting one PUCCH format. The configuration method of Table 2l is to provide respective fields, and this method can be used more valuably in case of supporting one of 3/4/5 formats rather than selecting one of several formats.

The PUCCH format configuration method 2 for the periodic channel state report is an indirect configuration method through resource configuration. As exemplified and described in Tables 2k and 2l, in order to support the periodic channel state report based on PUCCH format 3, resource configuration for this is necessary. Accordingly, if such a resource is configured to the terminal, the terminal may perform the corresponding periodic channel state report based on PUCCH format 3. In the same manner, in case of PUCCH format 4 and 5, the resource for a single-cell report may be additionally configured in the resource for the periodic channel state repot for the existing multi-cell.

The PUCCH format configuration method 3 for the periodic channel state report is a configuration method through the frame structure of the corresponding transmission or band characteristics. In Rel-13, downlink data transmission in an unlicensed band is supported through LAA. In order to use such a band, it is required to secure a transmittable band through LBT or the like. Accordingly, if the periodic channel state report is performed in the unlicensed band at the periodic channel state report time predetermined by the base station, specific periodic channel state information may not be transmitted, and if such information is RI or wideband first PMI information, information at a lower report time depending on this becomes meaningless. Accordingly, dependency between subframes becomes more important in the unlicensed band. Accordingly, in case where the corresponding cell or CC operates in the unlicensed band, it may be configured to perform the periodic channel state report for a single cell using the whole, a part, or one of PUCCH format 3/4/5 without any special configuration field. Such an unlicensed band condition may be differently expressed, such as in case where frame structure type 3 of LTE is configured.

The PUCCH format configuration method 4 for the periodic channel state report is a configuration method when PMI/RI report is configured. As described above, in TM 8/9/10, the corresponding periodic or aperiodic channel state report mode can be configured through PMI/RI report configuration.

The PMI report is a part in which overhead required for the report is most increased in accordance with the increase of the number of CSI-RS ports. Accordingly, if the PMI/RI report is not configured, the necessity for the channel state report using PUCCH format 3/4/5 may be lowered. Accordingly, in a state where the CSI reporting type is configured and the corresponding value is configured to class A (non-precoded CSI-RS) in the terminal in which 'TM9/TM10 is configured, if the PMI/RI report is not configured, PUCCH format 2 is always used, whereas if the PMI/RI report is configured, the report can be performed using PUCCH format 3/4/5.

The PUCCH format configuration method 5 for the periodic channel state report is a configuration method in a subband CQI mode. In case of periodic channel state report modes 2-0 and 2-1 supporting the subband CQI mode, information selected by a plurality of bandwidth parts should be transmitted dividedly at several report times as described above, and thus time delay for transferring the information becomes large. Accordingly, in case of such a subband CQI mode, by tying and transmitting such information at a time, the time delay can be reduced, and the system performance can be improved. Further, since the time delay is reduced in case of using such PUCCH format 3/4/5, the PTI report may not be necessary.

The format configuration methods 1 to 5 as described above may be used in combination. For example, during the PMI/RI report configuration of method 4, the report using the PUCCH format 3/4/5 may be configured through the configuration method 1 or 2, or during the unlicensed band configuration of method 3, the report using the PUCCH format 3/4/5 may be configured through the configuration method 1 or 2. Further, during the subband report mode configuration of method 5, the report using the PUCCH format 3/4/5 can also be configured through the configuration method 1 or 2. Further, the condition for the configuration method 1 or 2 may be configured by combining the methods 3, 4, and 5. For example, if the PMI/RI report and the unlicensed band are all configured by the method 3/4, it may be also possible that the report using PUCCH format 3/4/5 is configured through the method 1 or 2. Further, if the PMI/RI report and the subband report mode are all configured, it may be also possible that the report using PUCCH format 3/4/5 is configured through the method 1 or 2. Such combination of the format configuration methods may help configuration so that it can be used only in case where the report using the corresponding PUCCH format 3/4/5 is surely necessary for a single cell.

As described above, PUCCH format 3 can transmit information of 22 bits at a time. Accordingly, the information transmitted at plural report time points in the related art can be summed and transmitted at one transmission time. For this, the existing RI and wideband first PMI reports can be summed and transmitted.

Transmission method 1 at a first report time for PUCCH format 3: RI/wideband first PMI(i1) are transmitted together.

Transmission method 2 at a first report time for PUCCH format 3:
RI/wideband first PMI(i1)/wideband second PMI(i2)/CQI are transmitted together.

The transmission method 1 at the first report time for PUCCH format 3 is a method for transmitting RI/wideband first PMI(i1) together.

Figure 2H:
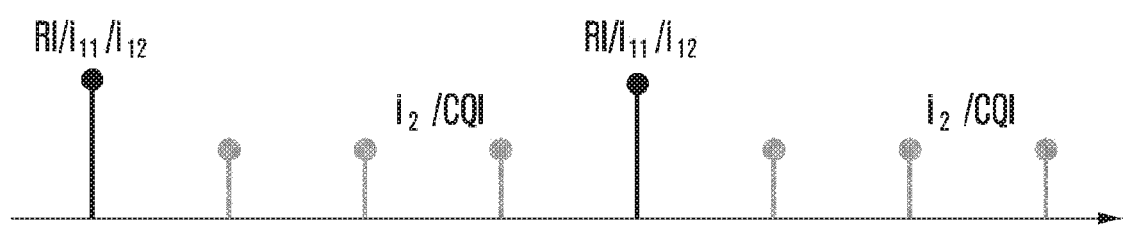
FIG. 2H is a diagram illustrating a case where a terminal supports periodic channel state report to a base station based on a transmission method at a first report time point for PUCCH format 3.

FIG. 2H is a diagram illustrating a case where a terminal supports periodic channel state report to a base station based on a transmission method at a first report time point for such PUCCH format 3.

The PUCCH format 3 that permits up to 22 bits can send RI and i1 at a time without codebook sub sampling. Further, since it is expected that such a method requires about 15 bits, it has the advantage that it can extensionally cope with an additional increase of i1 in accordance with the increase of CSI-RS ports. However, as compared with a case where PUCCH format 2 is transmitted, there is not a large amount of information transmitted at a time, and thus the system performance may be less improved. Further, in case of a wideband CQI mode, only wideband i2 and wideband CQI remain as information to be additionally transmitted, and thus the corresponding operation may be unfit for the wideband report, but may be fit for the subband CQI mode. In the subband CQI mode, at the second report time, wideband i2 and wideband CQI, and subband i2 and subband CQI can be transmitted at a time. Accordingly, by tying and transmitting such information, time delay for the subband report can be minimized. Accordingly, in order to support the transmission method 1 proposed in the present disclosure, a new PUCCH reporting type should be defined. Further, at the second report time, tying of wideband and subband and tying of subband only may coexist, and for this, the report time point may be divided into three report time points.

The transmission method 2 at the first report time for PUCCH format 3 is a method for transmitting RI/wideband first PMI(i1)/wideband second PMI(i2)/CQI together.

Figure 2I:
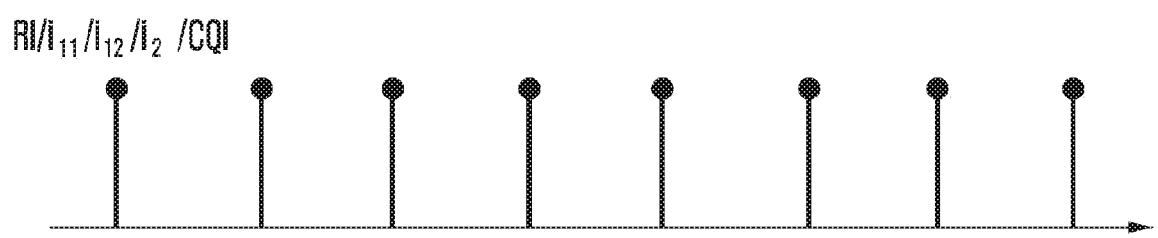
FIG. 2I is a diagram illustrating a case where a terminal supports periodic channel state report to a base station based on a transmission method at a first report time point for such PUCCH format 3.

FIG. 2I a diagram illustrating a case where a terminal supports periodic channel state report to a base station based on a transmission method at a first report time point for such PUCCH format 3.

As described above, in the transmission method 2 at the first report time for PUCCH format 3, RI, i1, and i2 CQI can be transmitted together. It is expected that such a method requires 23 to 24 bits as a while. Accordingly, for the report at the first report time, subsampling is necessary. Possible codebook subsampling methods for the transmission method 2 are as follows.

Subsampling method 1 for transmission method 2: O1 and O2 of codebook configuration are limited only when a periodic channel state report is generated.

Subsampling method 2 for transmission method 2: Duplicate beam group is removed when it is used.

In this case, the first subsampling method is a method for limiting O1 and O2 of the codebook configuration only when the periodic channel state report is generated. Even if (O1, O2) configuration value is large, such as (8,8), in the actual codebook configuration, the subsampling can be performed through limiting of the corresponding value to (4, 4). Such a method has the advantage that the subsampling can be performed through configuration supported by the corresponding codebook. Further, the method is applied only to the periodic channel state report, and in case of the aperiodic channel state report, the report having higher accuracy can be performed using the codebook having high oversampling factor.

The second sub sampling method is a method for removing a duplicate beam group of i1. The beam group in the codebook is selected through i1. In this case, such a beam group may include four beams, and in order to improve the system performance, two equal beams may be included in adjacent beam groups. Accordingly, if the duplicate beams are removed, the oversampling can be efficiently performed while the performance deterioration is lowered.

Further, the two methods as described above may be simultaneously applied. If i2 bits of the codebook are larger than bits permitted in PUCCH format 3 by two bits or more, only one oversampling method may be insufficient. Accordingly, if the above-described methods are compositely applied, more bits can be reduced. Further, in case of Codebook Config 2-4, since i1 bits are smaller than those of Codebook Config 1 by one bit, but i2 bits are larger than those of Codebook Config 1 by 2 bits at maximum, the overhead required for the report may be larger by one bit. Accordingly, it is also possible to apply the sub sampling method 1 to all Codebook Config, and to apply the sub sampling method 2 to the periodic channel state report based on Codebook Config 2-4.

If the wideband CQI mode is configured while the transmission method 2 at the first report time for PUCCH format 3 proposed in the present disclosure, all information required for the wideband report is transmitted, and thus only one report time point is necessary. However, since subband-related information should be additionally transmitted, the second report time point is necessary in case of the subband CQI mode. As described above, since the wideband information is all transmitted at the first report time, information corresponding to several subbands or bandwidth parts may be tied and transmitted dividedly at several time points. In this case, in consideration of possible bits of PUCCH format 3, the number of subbands or bandwidth parts transmitted together may be 2.

Considering the characteristic of PUCCH format 4 supportable up to 96 bits in case of reporting the periodic channel state information of a single cell using PUCCH format 4, all information can be transmitted at one report time in consideration of the bandwidth part. This is to transmit RI/wideband first PMI(i1)/wideband second PMI (i2)/wideband CQI/subband second PMI(i2)/subband CQI at a time. In this case, unlike the existing PUCCH dividedly reported at several time points, transmission at a time is performed as in the aperiodic channel state report using PUSCH, and thus it may not be necessary to make the CQI of the first codewords of wideband CQI and subband CQI 4-bit CQI like the existing PUCCH and to use the CQI of the second codeword as 3-bit differential CQI. In this case, in the same manner as the PUSCH-based report, the wideband CQI of all codewords may be used as 4-bit CQI, and the CQI of the subband may be applied as 2-bit differential CQI with respect to all codewords. Tables 2q and 2r below exemplify such 3-bit differential CQI and 2-bit differential CQI tables.

TABLE 2q

Mapping spatial differential CQI value to offset level (3 bit)

| Spatial differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

TABLE 2r

Mapping spatial differential CQI value to offset level (2 bit)

| Subband differential CQI value | Offset level |
|---|---|
| 0 | 0 |
| 1 | 1 |
| 2 | ≥2 |
| 3 | ≤−1 |

In PUCCH format 5, in the same manner as the transmission method 2 at the first report time for PUCCH format 3, wideband information can be transmitted at a time, but transmission of all subband information at a time is not possible. Accordingly, in case of the channel state report based on PUCCH format 5, in the same manner as the transmission method 2 at the first report time for PUCCH format 3, the report time may be divided into two report periods only in case of a subband CQI report mode. In this case, at the first report time, RI/wideband first PMI(i1)/wideband second PMI(i2)/wideband CQI/PTI can be transmitted at a time, and at the second report time, subband second PMI/subband CQI for all bandwidth parts can be transmitted at a time. The transmission method 2 at the first report time for PUCCH format 5 is different from the transmission method 2 at the first report time for PUCCH format 3 on the point that report for 4 bandwidth parts is necessary in case where a downlink bandwidth is 20 MHz (100RB), and in this case, about 44 bits of overhead are necessary in accordance with the necessity of 4 reports. Accordingly, in the transmission method based on PUCCH format 3, it is possible to transmit information of all bandwidth parts in which subband reports should be transmitted at plural time points, whereas in the transmission method based on PUCCH format 5, it is necessary to define a new PUCCH reporting type for transmitting RI/wideband first PMI(i1)/wideband second PMI(i2)/wideband CQI/PTI for which information of all bandwidth parts can be transmitted through only once report, and subband second PMI(i2)/subband CQI for the bandwidth parts.

In this case, the PTI may not be transmitted. This is because delay is not great since the information of all the subbands can be transmitted at one report time, and thus sufficiently good system performance can be shown even if divided transmission is not performed using the PTI. In case of using the PTI, only the first report is performed in case of PTI=0, and first and second reports can be simultaneously performed in case of PTI=1.

In the transmission method 2 at the first report time for PUCCH format 3 and the transmission method for PUCCH format 5, as described above, it may be necessary to define one report time point in the wideband CQI mode and to define two transmission report time points in the subband CQI mode. In such a report, the report time point of the wideband CQI mode may be expressed as follows.

$(10 \times n_f + \lfloor n_s/2 \rfloor - N_{OFFSET,CQI}) \bmod N_{pd} = 0$

Further, the second report time point at which a plurality of subband second PMI/subband CQI are transmitted may be expressed as follows.

$(10 \times n_f + \lfloor n_s/2 \rfloor - N_{OFFSET,CQI}) \bmod N_{pd} = 0$

For configuration of $N_{pd}$, Table 2s may be used.

TABLE 2s

Mapping of $I_{CQI/PMI}$ to $N_{pd}$ and $N_{OFFSET,CQI}$ for FDD or for FDD-TDD and primary cell frame structure type 1

| $I_{CQI/PMI}$ | Value of $N_{pd}$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

Possible methods for configuring the first report time point in a subband CQI report mode are as follows.

First report time configuration method 1: The first report time is configured using a period that is a multiple of a report period at the second report time and an offset.

First report time configuration method 2: The first report time is configured using a period that is a multiple of a report period at the second report time.

First report time configuration method 3: The first report time is configured using a period that is the same as the second report time and an offset.

The first report time configuration method 1 is a configuration method using a period that is a multiple of the report period at the second report time and an offset. The report at the first report time may be defined using a multiple of a period and an offset based on the second report time point. The periodic channel state report method using PUCCH format 5 includes information that is not changed for a long time, such as RI and wideband first PMI. Accordingly, for this, the following report time point may be defined.

$$(10 \times n_f + \lfloor n_s/2 \rfloor - N_{OFFSET,CQI} - N_{OFFSET,RI}) \bmod (N_{pd} \cdot M_{RI}) = 0$$

In this case, the corresponding $M_{RI}$ may be indicated using Table 2t below.

TABLE a

Mapping of $I_{RI}$, $M_{RI}$ and $N_{OFFSET,RI}$ when RI reporting is configured

| $I_{RI}$ | Value of $M_{RI}$ | Value of $N_{OFFSET, RI}$ |
|---|---|---|
| 0 ≤ $I_{RI}$ ≤ 160 | 1 | $-I_{RI}$ |
| 161 ≤ $I_{RI}$ ≤ 321 | 2 | $-(I_{RI} - 161)$ |
| 322 ≤ $I_{RI}$ ≤ 482 | 4 | $-(I_{RI} - 322)$ |
| 483 ≤ $I_{RI}$ ≤ 643 | 8 | $-(I_{RI} - 483)$ |
| 644 ≤ $I_{RI}$ ≤ 804 | 16 | $-(I_{RI} - 644)$ |
| 805 ≤ $I_{RI}$ ≤ 965 | 32 | $-(I_{RI} - 805)$ |
| 966 ≤ $I_{RI}$ ≤ 1023 |  | Reserved |

However, in such a case, a report of wideband second PMI and wideband CQI should be received for a long period, and thus it may be advantageous to transmit such information using a longer period than the period of subband information. Accordingly, in case of scheduling the full band to the corresponding terminal, the system performance may deteriorate due to the delay.

The first report time configuration method 2 is a method for configuring the first report time point with no offset using a period that is a multiple of the report period at the second report time. Such a report time point may be expressed as follows.

$$(10 \times n_f + \lfloor n_s/2 \rfloor - N_{OFFSET,CQI}) \bmod (N_{pd} \cdot M_{RI}) = 0$$

Further, the following expressions have the same effect.

$$(10 \times n_f + \lfloor n_s/2 \rfloor - N_{OFFSET,CQI}) \bmod (H' \cdot M_{RI}) = 0$$

$$(10 \times n_f + \lfloor n_s/2 \rfloor - N_{OFFSET,CQI}) \bmod (H \cdot M_{RI}) = 0$$

If there is no PTI, the report time point may be defined using one of two equations as above, whereas if there is the PTI, the report time point may be defined using H' in case of PTI=0 and using H in case of PTI=1.

As described above, H' may be configured through periodicityFactor of RRC signaling, and may have a value of 2 or 4. Further, H may be expressed as follows in case where two bandwidth parts are tied and transmitted during transmission based on PUCCH format 3.

$$H = \left\lceil \frac{J}{2} \right\rceil \cdot K + 1$$

In this case, J is the number of bandwidth parts.

In case of the PUCCH format 5 basis, as described above, information of all bandwidth parts can be reported through one report, and may be expressed as follows.

$$H = K + 1$$

In this case, K is a value that can be configured through RRC, and may have a value of 1 to 4.

In case where the periodic channel state report is performed using the report time point, there exists no offset, and the first report time point and the second report time point always overlap each other. In this case, information of the first report time point is information transferred through a longer period, and since this information has high priority, report of information of the second report time point should be dropped.

The first report time configuration method 3 is a configuration method using the same period as that of the second report time point and an offset. In the periodic channel state report method using the above-described method, the wideband CQI report is included in the first report, and since the wideband CQI is important information for grasping the whole channel state of the corresponding terminal, it may be operated based on the period having the same level as that of the subband information. For this, the following report time point may be defined.

$$(10 \times n_f + \lfloor n_s/2 \rfloor - N_{OFFSET,CQI} - N_{OFFSET,RI}) \bmod (N_{pd}) = 0$$

In this case, the offset may be indicated as in Table 2u.

TABLE 2u

Mapping of $I_{RI}$ to $N_{OFFSET,RI}$ when RI reporting is configured

| $I_{RI}$ | Value of $N_{OFFSET, RI}$ |
|---|---|
| 0 ≤ $I_{RI}$ ≤ 160 | $-I_{RI}$ |
| 161 ≤ $I_{RI}$ ≤ 1023 | Reserved |

Figure 2J:
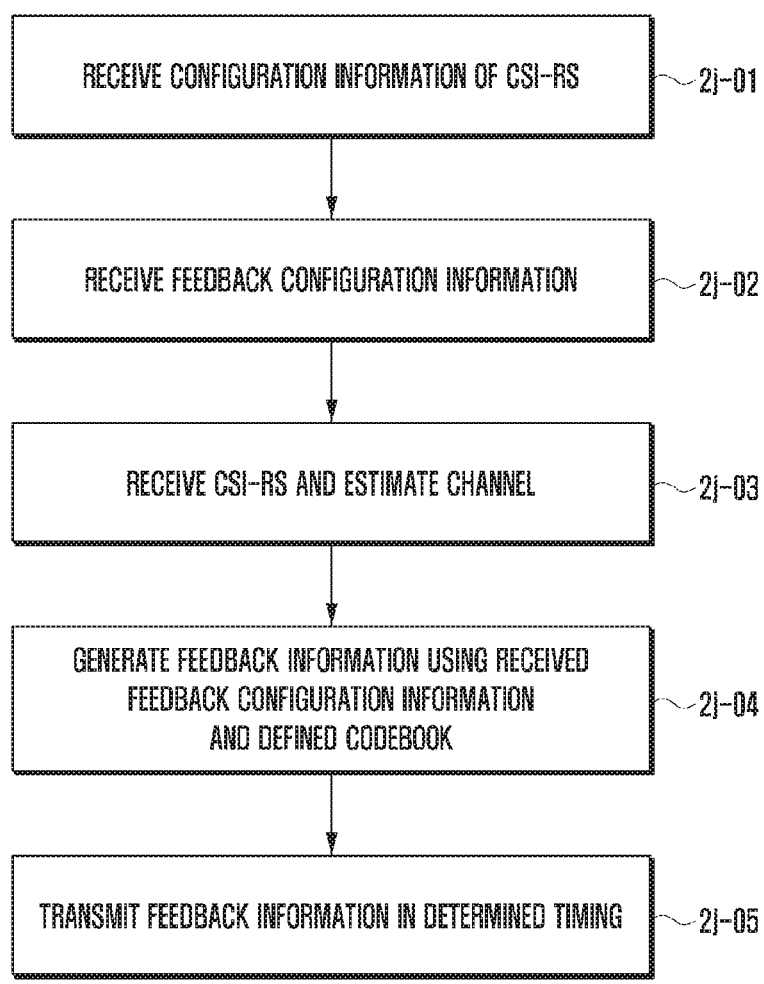
FIG. 2J is a flowchart illustrating the operation order of a terminal according to an embodiment of the present disclosure.

FIG. 2J is a flowchart illustrating the operation order of a terminal according to an embodiment of the present disclosure.

Referring to FIG. 2J, at operation 2j-01, the terminal receives configuration information on CSI-RS configuration. Further, the terminal may identify, based on the received configuration information, at least one of the number of ports of each NP CSI-RS, N1 and N2 that are the numbers of antennas for respective dimensions, O1 and O2 that are oversampling factors for respective dimensions, a plurality of resource config for configuring one subframe config and location to transmit a plurality of CSI-RSs, information related to codebook subset restriction, information related to CSI report, CSI-process index, and transmission power information. Thereafter, at operation 2j-02, the terminal configures one piece of feedback configuration information based on at least one 2, 4, 8 port CSI-RS location. In the corresponding information, PMI/CQI period and offset, RI period and offset, wideband/subband, and submode may be configured. At operation 2j-04, if a plurality of CSI-RSs are received in one subframe based on the corresponding information, the terminal estimates a channel between a base station antenna and a terminal reception antenna based on this. At operation 2j-04, the terminal generates a feedback information rank, PMI, and CQI using the received feedback configuration based on the estimated channel and a virtual channel added between CSI-RSs. In this case, one of embodiments proposed in the present disclosure is used to generate the corresponding information, and a plurality of embodiments among embodiments proposed in the present disclosure may be considered together, and this can be performed through submode configuration. Thereafter, at operation 2j-05, the terminal transmits the feedback information to the base station in the determined feedback timing in accordance with the feedback configuration of the base station to complete the channel feedback generation and report process in consideration of a two-dimensional (2D) arrangement.

Figure 2K:
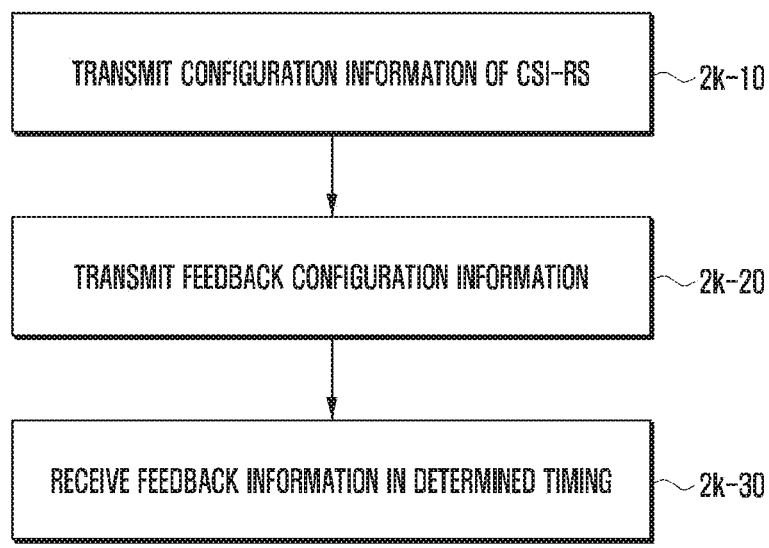
FIG. 2K is a flowchart illustrating the operation order of a base station according to an embodiment of the present disclosure.

For the timing at this time proposed in the present disclosure, FIG. 2K is a flowchart illustrating the operation order of a base station according to an embodiment of the present disclosure.

Referring to FIG. 2K, the base station, at operation 2k-01, transmits CSI-RS configuration information for measuring a channel to the terminal. The configuration information may include at least one of the number of ports of each NP CSI-RS, N1 and N2 that are the numbers of antennas for respective dimensions, O1 and O2 that are oversampling factors for respective dimensions, a plurality of resource config for configuring one subframe config and location to transmit a plurality of CSI-RSs, information related to codebook subset restriction, information related to CSI report, CSI-process index, and transmission power information. Thereafter, at operation 2k-02, the base station transmits to the terminal feedback configuration information based on at least one CSI-RS. In the corresponding information, PMI/CQI period and offset, RI period and offset, wideband/subband, and submode may be configured. Thereafter, the base station transmits the configured CSI-RS to the terminal. The terminal estimates channels for respective antenna ports, and based on this, estimates an additional channel for a virtual resource. In this case, one of embodiments proposed in the present disclosure is used to generate the corresponding information, and a plurality of embodiments among embodiments proposed in the present disclosure may be considered together, and this can be performed through submode configuration. The terminal determines feedback, and generates and transmits to the base station corresponding PMI, RI, and CQI. Accordingly, the base station, at operation 2k-03, receives the feedback information from the terminal in the determined timing, which is used to determine the channel state between the terminal and the base station.

Figure 2L:
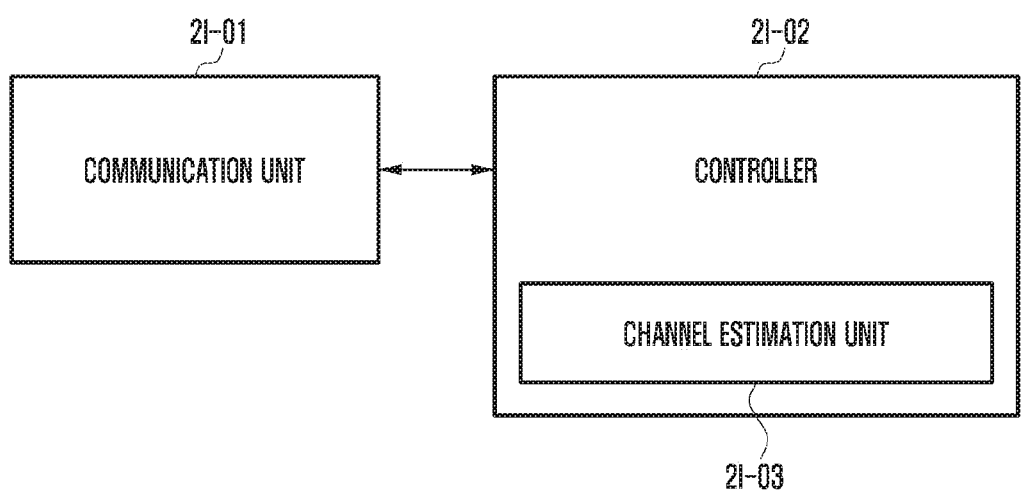
FIG. 2L is a block diagram illustrating the internal structure of a terminal according to an embodiment of the present disclosure.

FIG. 2L is a block diagram illustrating the internal structure of a terminal according to an embodiment of the present disclosure.

Referring to FIG. 2L, the terminal includes a communication unit 2l-01 and a controller 2l-02. The communication unit 2l-01 transmits/receives data to/from an outside (e.g., base station). Here, the communication unit 2l-01 may transmit feedback information to the base station under the control of the controller 2l-02. The controller 2l-02 controls the states and operations of all constituent elements configuring the terminal. Specifically, the controller 2l-02 generates the feedback information in accordance with information allocated from the base station. Further, the controller 2l-02 controls the communication unit 2l-01 to perform feedback of the generated channel information to the base station in accordance with timing information allocated from the base station. For this, the controller 2l-02 may include a channel estimation unit 2l-03. The channel estimation unit 2l-03 determines necessary feedback information through CSI-RS and feedback allocation information received from the base station, and estimates a channel using the received CSI-RS based on the feedback information. Although FIG. 2L shows an example in which the terminal is composed of the communication unit 2l-01 and the controller 2l-02, the terminal according to the present disclosure is not limited thereto, but may be further provided with various configurations in accordance with the functions performed by the terminal. For example, the terminal may further include a display unit displaying the current state of the terminal, an input unit receiving an input of a signal for function performing from a user, and a storage unit storing data generated by the terminal. Further, it is illustrated that the channel estimation unit 2l-03 is included in the controller, but is not limited thereto. The controller 2l-02 may control the communication unit 2l-01 to receive from the base station configuration information of at least one reference signal. Further, the controller 2l-02 may measure the at least one reference signal, and may control the communication unit 2l-01 to receive from the base station the feedback configuration information for generating the feedback information in accordance with the result of the measurement.

Further, the controller 2l-02 may measure at least one reference signal received through the communication unit 2l-01, and may generate the feedback information in accordance with the feedback configuration information. Further, the controller 2l-02 may control the communication unit 2l-01 to transmit the generated feedback information to the base station in the feedback timing in accordance with the feedback configuration information. Further, the controller 2l-02 may receive a channel status indication-reference signal (CSI-RS) from the base station, generate the feedback information based on the received CSI-RS, and transmit the generated feedback information to the base station. In this case, the controller 2l-02 may select precoding matrices for respective antenna port groups of the base station, and may further select one additional precoding matrix based on the relationship between the antenna port groups of the base station.

Further, the controller 2l-02 may receive the CSI-RS from the base station, generate the feedback information based on the received CSI-RS, and transmit the generated feedback information to the base station. In this case, the controller 2l-02 may select one precoding matrix for all antenna port groups of the base station. Further, the controller 2l-02 may receive the feedback configuration information from the base station, receive the CSI-RS from the base station, generate the feedback information based on the received feedback configuration information and CSI-RS, and transmit the generated feedback information to the base station. In this case, the controller 2l-02 may receive the feedback configuration information corresponding to the respective antenna port groups and the additional feedback configuration information based on the relationship between the antenna port groups.

Figure 2M:
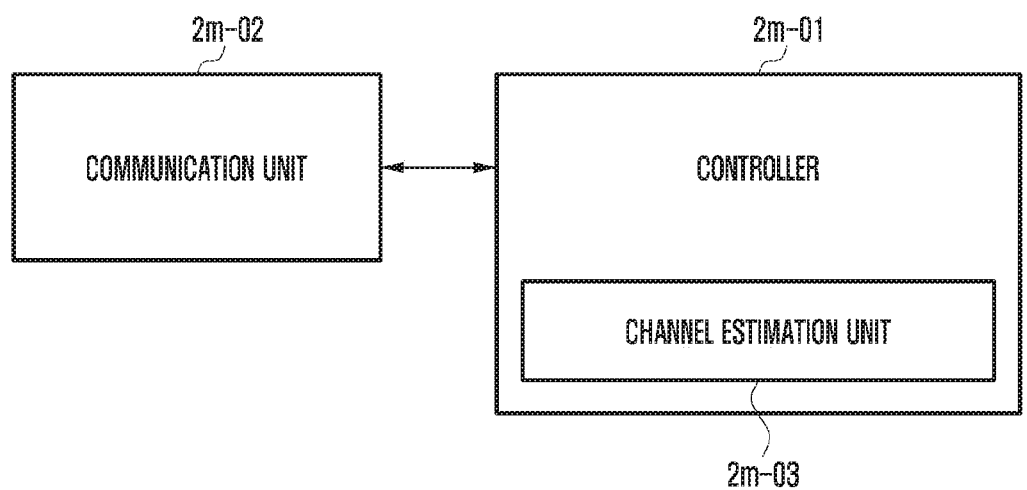
FIG. 2M is a block diagram illustrating the internal structure of a base station according to an embodiment of the present disclosure.

FIG. 2M is a block diagram illustrating the internal structure of a base station according to an embodiment of the present disclosure.

Referring to FIG. 2M, the base station includes a controller 2m-01 and a communication unit 2m-02. The controller 2m-01 controls the states and operations of all configurations constituting the base station. Specifically, the controller 2m-01 allocates a CSI-RS resource for channel estimation of a terminal to the terminal, and allocates a feedback resource and feedback timing to the terminal. For this, the controller 2m-01 may further include a resource allocation unit 2m-03. Further, the controller allocates feedback configuration and feedback timing to prevent feedbacks from several terminals from colliding, and receives and analyzes the feedback information configured in the corresponding feedback timing. The communication unit 2m-02 transmits/receives data, a reference signal, and feedback information to/from the terminal. Here, the communication unit 2m-02 transmits the CSI-RS to the terminal through the allocated resource under the control of the controller 2m-01, and receive the feedback for the channel information from the terminal.

As described above, it is illustrated that the resource allocation unit 2m-03 is included in the controller 2m-01, but is not limited thereto. The controller 2m-01 may control the communication unit 2m-02 to transmit to the terminal configuration information of at least one reference signal, or generate the at least one reference signal. Further, the controller 2m-01 may control the communication unit 2m-02 to transmit to the terminal the feedback configuration information for generating the feedback information in accordance with the result of the measurement. Further, the controller 2m-01 may control the communication unit 2m-02 to transmit the at least one reference signal to the terminal, and to receive the feedback information transmitted from the terminal in the feedback timing in accordance with the feedback configuration information. Further, the controller 2m-01 may transmit the feedback configuration information to the terminal, transmit the CSI-RS to the terminal, and receive from the terminal the feedback information generated based on the feedback configuration information and the CSI-RS. In this case, the controller 2m-01 may transmit the feedback configuration information corresponding to the respective antenna port groups of the base station and additional feedback configuration information based on the relationship between the antenna port groups. Further, the controller 2m-01 may transmit the CSI-RS beamformed based on the feedback information to the terminal, and may receive the feedback information generated based on the CSI-RS from the terminal. According to the embodiment of the present disclosure as described above, the base station having transmission antennas having a structure of a large number of 2D antenna arrays can prevent excessive feedback resources from being allocated in transmitting the CSI-RS and prevent the channel estimation complexity of the terminal from being increased, and the terminal can effectively measure all channels for a large number of transmission antennas, and configure and report the feedback information to the base station.

Second Embodiment

Hereinafter, the operation principle according to a preferred embodiment of the present disclosure will be described in detail with reference to the accompanying drawings. In the drawings, the same reference numerals are given to the same constituent elements across various figures. In describing the present disclosure, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined based on the contents of the whole description of the present disclosure.

The present disclosure may be variously modified and may have various embodiments, and some embodiments of the present disclosure will be described in detail with reference to the accompanying drawings. However, it should be understood that the present disclosure is not limited to the specific embodiments described hereinafter, but includes various modifications, equivalents, and/or alternatives that are included in the scope of the present disclosure.

Further, unless clearly indicating other contents in the description, it should be understood that a singular expression, such as "a(n)" or "the", may include a plural expression. Accordingly, as an example, a "component surface" may include one or more component surfaces.

Further, the terms including ordinal numbers, such as "first, second, and so forth", are used to describe diverse elements regardless of their order and/or importance and to discriminate one element from other elements, but are not limited to the corresponding elements. For example, without departing from the scope of the present disclosure, a first element may be called a second element, and the second element may be called the first element in a similar manner. Also, the term "and/or" includes the respective described items and combinations thereof.

Further, the terms used herein are for the purpose of describing specific embodiments only, but are not intended for limiting the present disclosure. A singular expression may include a plural expression unless specially described. In the present disclosure, it should be understood that the term "includes" or "has" used in the present disclosure specifies the presence of stated features, steps, operations, components, parts mentioned in the present disclosure, or a combination thereof, but do not preclude the presence or addition of one or more other features, numerals, steps, operations, components, parts, or a combination thereof.

Hereinafter, a base station according to another embodiment of the present disclosure is the subject that performs resource allocation to a terminal, and may be at least one of an eNode B, Node B, base station (BS), radio connection unit, base station controller, and node on a network. The terminal according to an embodiment of the present disclosure may include user equipment (UE), mobile station (MS), cellular phone, smart phone, computer, multimedia system that can perform a communication function, small sensor including a communication function, wearable device, or Internet of things. In an embodiment of the present disclosure, a downlink (DL) is a radio transmission path of a signal that is transmitted from the base station to the terminal, and an uplink (UL) means a radio transmission path of a signal that is transmitted from the terminal to the base station. Hereinafter, although an LTE or LTE-A system is exemplified in explaining an embodiment of the present disclosure, the embodiment of the present disclosure may be applied to even other communication systems having similar technical backgrounds or channel types. Further, the embodiment of the present disclosure may also be applied to other communication systems through partial modifications thereof in a range that does not greatly deviate from the scope of the present disclosure through the judgment of those skilled in the art.

Hereinafter, although all embodiments of the present disclosure are not exclusive to each other, and one or more embodiments may be compositely performed, individual embodiments and examples will be dividedly described for convenience in explanation.

(2-1)-Th Embodiment

The present disclosure relates to a method for transmitting and receiving channel state information, in which a terminal measures a channel quality (radio channel state) and notifies a base station of the result of the measurement, in a wireless mobile communication system applying a multiple access scheme using multi-carriers, such as orthogonal frequency division multiple access (OFDMA).

Hereinafter, in describing in detail embodiments of the present disclosure, an OFDM-based wireless communication system, in particular, 3GPP EUTRA standard, will be the main subject, but the primary gist of the present disclosure can be applied to other communication systems having similar technical backgrounds and channel types through slight modifications in a range that does not greatly deviate from the scope of the present disclosure.

Figure 3A:
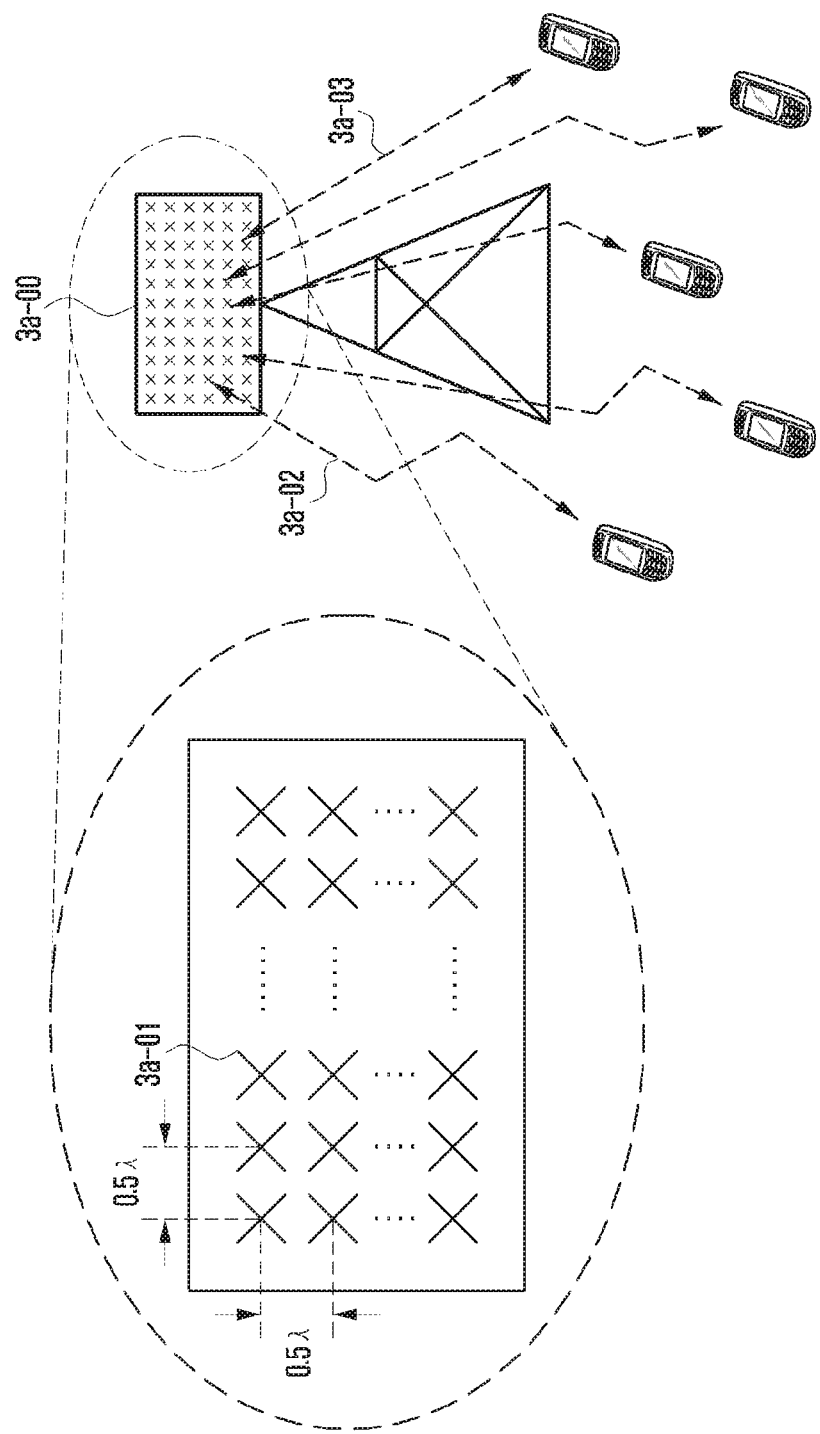
FIG. 3A is a diagram illustrating an FD-MIMO system to which an embodiment of the present disclosure is applied.

FIG. 3A is a diagram illustrating an FD-MIMO system to which an embodiment of the present disclosure is applied. The FD-MIMO system introduced from LTE-A Pro has evolved from the existing LTE/LTE-A MIMO technology, and a plurality of transmission antennas, for example, eight or more transmission antennas, may be used therein. In FIG. 3A, base station transmission equipment 3a-00 transmits radio signals through eight or more transmission antennas. For example, as indicated as 3a-01, the plurality of transmission antennas are deployed to maintain the minimum distance between them. The minimum distance may correspond to, for example, a half of a wavelength of the radio signal being transmitted. In general, if the distance corresponding to a half of the wavelength of the radio signal is maintained between the transmission antennas, signals transmitted from the respective transmission antennas are affected by radio channels having low correlation between them. If the band of the radio signal being transmitted is 2 GHz, the distance becomes 7.5 cm, and if the band becomes higher than 2 GHz, the distance becomes shorter.

In FIG. 3A, eight or more transmission antennas deployed on the base station transmission equipment 3a-00 are used to transmit signals 3a-02 to one or a plurality of terminals. Proper precoding may be applied to the plurality of transmission antennas to simultaneously transmit signals to the plurality of terminals. In this case, one terminal may receive one or more information streams. In general, the number of information streams that one terminal can receive is determined in accordance with the number of reception antennas that the terminal possesses and the channel state.

Figure 3B:
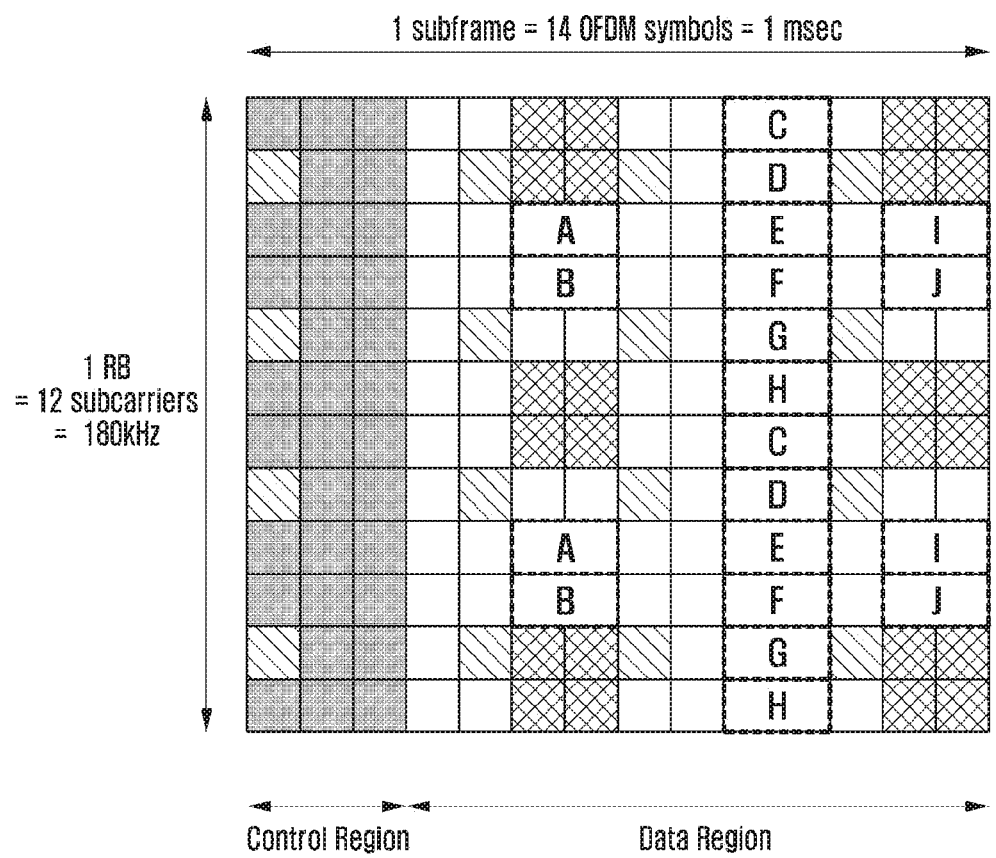
FIG. 3B is a diagram illustrating a radio resource corresponding to 1 subframe and 1 resource block (RB) that are minimum units that can be scheduled on downlink in an LTE/LTE-A system.

FIG. 3B is a diagram illustrating a radio resource corresponding to one subframe and one resource block (RB), which is the minimum unit capable of performing downlink scheduling in an LTE/LTE-A system. A radio resource as illustrated in FIG. 3B is composed of one subframe on a time axis and one resource block (RB) on a frequency axis. The radio resource as described above is composed of 12 subcarriers in a frequency domain and 14 OFDM symbols in a time domain to have 168 inherent frequencies and time locations in total. In LTE/LTE-A, each of the inherent frequencies and time locations in FIG. 3B is called a resource element (RE).

On the radio resources as illustrated in FIG. 3B, different kinds of plural signals may be transmitted as follows.

1. Cell specific RS (CRS): A reference signal periodically transmitted for all terminals belonging to one cell. A plurality of terminals may commonly use the CRS.

2. Demodulation reference signal (DMRS): A reference signal transmitted for a specific terminal. The DMRS is transmitted only in case where data is transmitted to the corresponding terminal. The DMRS may be composed of eight DMRS ports in total. In LTE/LTE-A, ports 7 to 14 correspond to DMRS ports, and the respective ports maintain orthogonality so that no interference occurs between them using CDM or FDM.

3. Physical downlink shared channel (PDSCH): A data channel transmitted to a downlink. The PDSCH is used by the base station to transmit traffic to the terminal, and it is transmitted using the RE to which a reference signal is not transmitted from a data region of FIG. 2.

4. Channel status information reference signal (CSI-RS): A reference signal transmitted for terminals belonging to one cell. The CSI-RS is used to measure the channel state. A plurality of CSI-RSs may be transmitted to one cell. In an LTE/LTE-A system, one CSI-RS may correspond to one, two, four, or eight antenna ports. In an LTE-A Pro system, one CSI-RS may correspond to one, two, four, eight, twelve, or sixteenth antenna ports, and in future, it may be extended up to maximally 30 antenna ports.

5. Other control channels (PHICH, PCFICH, and PDCCH): These control channels are used to provide control information that is necessary for the terminal to receive PDSCH or to transmit ACK/NACK for operating HARQ for uplink data transmission.

In addition to the above-described signals, in the LTE-A/LTE-A Pro system, muting may be configured so that CSI-RSs transmitted by other base stations can be received in terminals of the corresponding cell without interference. The muting may be applied in a location in which the CSI-RSs can be transmitted, and in general, the terminal receives a traffic signal through jumping over the corresponding radio resource. In the LTE-A/LTE-A Pro system, the muting may be called zero-power CSI-RS as another term. This is because due to the characteristic of the muting, the muting is equally applied to the location of the CSI-RS and in this case, no transmission power is transmitted.

Referring to FIG. 3B, the CSI-RSs may be transmitted using parts of locations indicated as A, B, C, D, E, E, F, G, H, I, and J in accordance with the number of antennas that transmit the CSI-RSs. Further, the muting may be applied to the parts of the locations indicated as A, B, C, D, E, E, F, G, H, I, and J. In particular, the CSI-RSs may be transmitted to 2, 4, and 8 REs in accordance with the number of transmission antenna ports. In FIG. 3B, if the number of antenna ports is 2, the CSI-RSs are transmitted to a half of a specific pattern, whereas if the number of antenna ports is 4, the CSI-RSs are transmitted to the whole of the specific pattern. If the number of antenna ports is 8, the CSI-RSs are transmitted using two patterns. In contrast, the muting is always performed in the unit of one pattern. That is, the muting may be applied to a plurality of patterns, but if the location of the muting does not overlap the location of the CSI-RS, it cannot be applied to only a part of one pattern. However, only in case where the location of the CSI-RS overlaps the location of the muting, the muting can be applied to only a part of one pattern.

As described above, in the LTE/LTE-A, two, four, or eight antenna ports may be configured on one CSI-RS resource. In case of transmitting the CSI-RS for two antenna ports, two REs connected together on a time axis transmit signals of respective antenna ports, and the signals of the respective antenna ports are discriminated from one another by orthogonal codes. Further, in case of transmitting the CSI-RS for four antenna ports, in addition to the CSI-RS for two antenna ports, signals for the remaining two antenna ports are transmitted in the same method using two additional REs. Transmission of the CSI-RS for eight antenna ports is performed in the same manner.

Figure 3C:
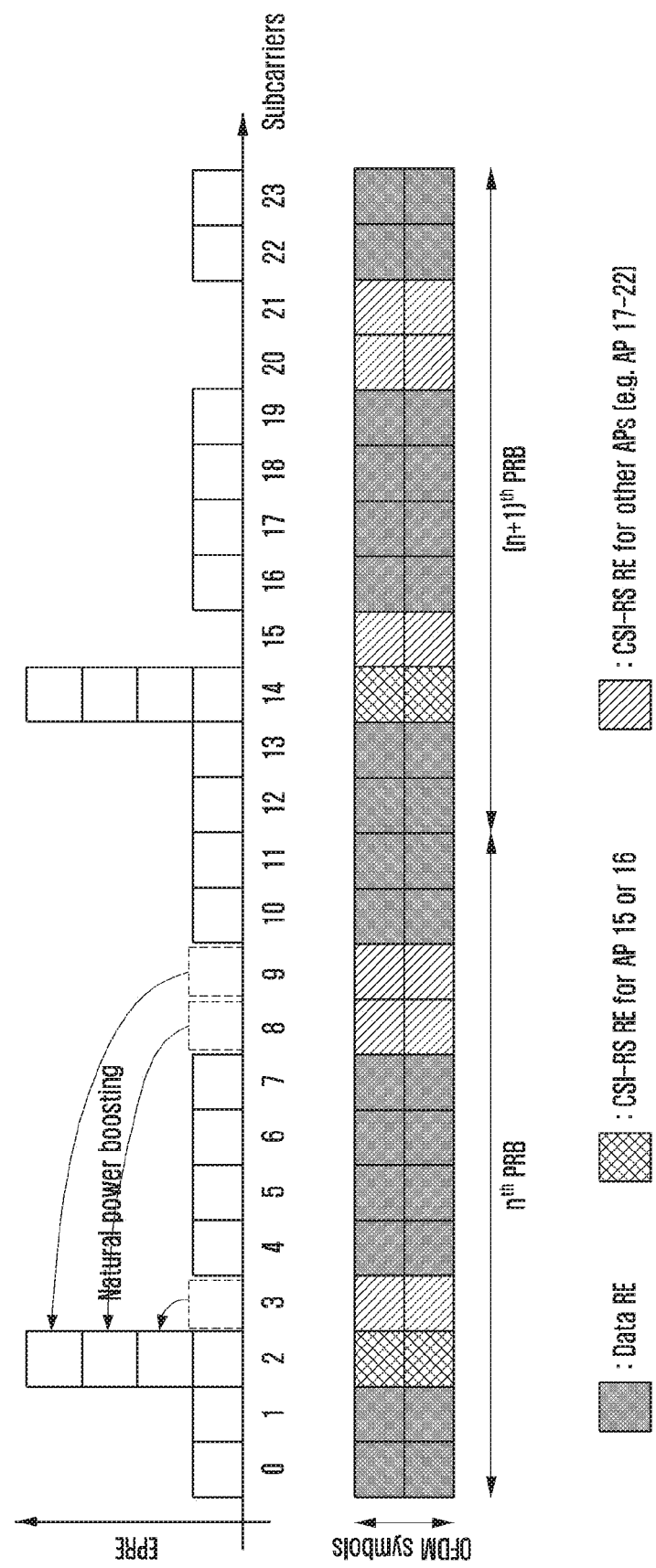
FIG. 3C is a diagram illustrating an example of CSI-RS RE mapping for n-th and (n+1)-th PRBs in case where a base station transmits 8 CSI-RSs.

In order to improve channel estimation accuracy, the base station may boost the transmission power of the CSI-RS. In case of transmitting the CSI-RS for four or eight antenna ports (AP), specific CSI-RS ports are transmitted from only the CSI-RS RE in a predetermined location, but they are not transmitted from other OFDM symbols in the same OFDM symbols. FIG. 3C is a diagram illustrating an example of CSI-RS RE mapping for the n-th and the (n+1)-th PRBs in case where the base station transmits eight CSI-RSs. Referring to FIG. 3C, if the CSI-RS RE location for an AP 15 or 16 is as shown as a check pattern in FIG. 3C, transmission power for the AP 15 or 16 is not used in the CSI-RS RE for the remaining APs 17 to 22 indicated as a slanting-line pattern. Accordingly, as indicated in FIG. 3C, the AP 15 or 16 may use the transmission power to be used for the 3rd, 8th, and 9th subcarriers in the 2nd subcarrier. Such natural power boosting enables the transmission power of a CSI-RS port 15 transmitted through the 2nd subcarrier to be highly configured maximally up to 6 dB as compared with the transmission power of AP 15 used in a data RE. According to the current 2/4/8 port CSI-RS patterns, natural power boosting of 0/2/6 dB is possible, and through this, the respective APs can transmit CSI-RSs through full power utilization.

Further, a terminal can be allocated with CSI-IMs (or interference measurement resources (IMRs)) together with the CSI-RSs, and the CSI-IM resources have the same resource structure and location as those of the CSI-RSs supporting 4 ports. The CSI-IM is a resource for a terminal that receives data from one or more base stations to accurately measure interference from an adjacent base station. For example, if it is desired to measure the amount of interference when the adjacent base station transmits data and the amount of interference when the adjacent base station does not transmit the data, the base station configures a CSI-RS and two CSI-IM resources, the base station can effectively measure the amount of interference exerted by the adjacent base station in a manner that it makes the adjacent base station always transmit a signal on one CSI-IM whereas it makes the adjacent base station always not transmit the signal on the other CSI-IM.

In the LTE-A/LTE_A Pro system, the base station may report CSI-RS configuration information to the terminal through higher layer signaling. The CSI-RS configuration information includes an index of the CSI-RS configuration information, the number of antenna ports included in the CSI-RS, a transmission period of the CSI-RS, a transmission offset, CSI-RS configuration information, a CSI-RS scrambling ID, and QCL information. Specifically, the terminal may determine from what REs the CSI-RS is transmitted through combination of the CSI-RS configuration and port number information included in the CSI-RS.

In the LTE-A/LTE-A Pro system, the base station transmits to the terminal a reference signal for measuring the downlink channel state, and the terminal measures the channel state between the base station and the terminal itself using the CRS or CSI-RS transmitted by the base station. The channel state basically has some requisites that should be considered, and here, it includes the amount of interference in a downlink. The amount of interference in the downlink includes an interference signal and thermal noise generated by antennas that belong to the adjacent base station, and it plays an important role when the terminal determines the channel state of the downlink. As an example, if the base station having one transmission antenna transmits a signal to the terminal having one reception antenna, the terminal should determine energy per symbol that can be received through the downlink and the amount of interference to be simultaneously received in a section in which the corresponding symbol is received using the reference signal received from the base station, and should determine Es/Io. The determined Es/Io is converted into a data transmission speed or a value corresponding to the data transmission speed, and is reported to the base station in the form of a channel quality indicator (CQI) to enable the base station to determine at what data transmission speed the base station is to perform data transmission to the terminal in the downlink.

In the LTE-A/LTE-A Pro system, the terminal feeds information on the channel state of the downlink back to the base station so that the feedback information can be used for the downlink scheduling of the base station. That is, the terminal measures the reference signal that the base station transmits to the downlink, and feeds information extracted from the reference signal back to the base station in the form defined in the LTE/LTE-A standards. In the LTE/LTE-A, information that the terminal feeds back to the base station is briefly classified into three types as follows.

Rank indicator (RI): The number spatial layers that the terminal can receive in the current channel state.

Precoder matrix indicator (PMI): an indicator of a precoding matrix to which the terminal prefers in the current channel state.

Channel quality indicator (CQI): The maximum data rate at which the terminal can receive data in the current channel state. The CQI may be replaced by an SINR that can be used similarly to the maximum data rate, maximum error correction code rate and modulation method, and data efficiency per frequency.

The RI, PMI, and CQI have meanings in association with one another. As an example, the precoding matrix supported in the LTE/LTE-A is differently defined by ranks. Accordingly, although the PMI value when RI has a value of "1" and the PMI value when RI has a value of "2" are equal to each other, they are differently analyzed. Further, it is assumed that the rank value and the PMI value that the terminal has reported to the base station has been applied to the base station even in the case where the terminal determines the CQI. That is, if the rank is RI_X and the precoding is PMI_Y in the case where the terminal has reported RI_X, PMI_Y, and CQI_Z to the base station, it means that the terminal can receive the data rate corresponding to the CQI_Z. As described above, the terminal assumes in what transmission method the terminal performs transmission to the base station when calculating the CQI, and thus it can obtain an optimum performance when performing actual transmission in the corresponding transmission method.

The RI, PMI, and CQI may be fed back in a periodic or aperiodic type. If the base station desires to obtain aperiodic feedback information of a specific terminal, the base station performs uplink data scheduling of the corresponding terminal by configuring an aperiodic feedback indicator included in downlink control information (DCI) for uplink data scheduling of the corresponding terminal to perform specific aperiodic feedback. If an indicator configured to perform the aperiodic feedback is received on the n-th subframe, the corresponding terminal performs uplink transmission through including of the aperiodic feedback information in data transmission on the (n+k)-th subframe. Here, k is 4 in frequency division duplexing (FDD), and is defined as in Table 3a in time division duplexing (TDD).

TABLE 3a

K value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |

TABLE 3a-continued

K value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | — | — | 4 | — | — | — | — | — | — | — |
| 6 | — | — | 7 | 7 | 5 | — | — | 7 | 7 | — |

In the case of a base station that possesses a massive antenna to perform the channel information generation and report, it is necessary for the base station to configure reference signal resources for measuring channels of 8 or more antennas to transmit the reference signal resources to the terminal. For this, in the LTE-A Pro, 2, 4, 8, 12, or 16 antenna ports may be configured in one CSI-RS resource, and in future, 20, 24, 28, and 32 antenna port configuration functions may be added. Specifically, in LTE-A Pro Release 13, two kinds of CSI-RS configuration methods are provided.

The first method corresponds to non-precoded CSI-RS (CSI-RS for Class A CSI reporting), and the base station can configure one or more CSI-RS patterns, that is, 4 or 8-port CSI-RS patterns to the terminal, and can configure to receive 8 or more CSI-RS ports through aggregation of the configured CSI-RS patterns. Specifically, {1, 2, 4, 8}-port CSI-RS follows the existing mapping rule, 12-port CSI-RS is configured as an aggregation of three 4-port CSI-RS patterns, and 16-port CSI-RS is configured as an aggregation of two 8-port CSI-RS patterns. Further, in the LTE/LTE-A release 13, code division multiplexing (CDM)-2 or CDM-4 is supported using an orthogonal cover code (OCC) of length 2 or 4 with respect to 12-/16-port CSI-RSs. The above explanation of FIG. 3C refers to CSI-RS power boosting based on CDM-2, and according to the above explanation, maximally 9 dB power boosting is necessary in comparison to the PDSCH for full power utilization for the 12-/16-port CSI-RSs based on CDM-2. This means that high-performance hardware is necessary in comparison to the existing one for the full power utilization during operation of the 12-/16-port CSI-RSs based on CDM-2. In the LTE-A Pro Release 13, in consideration of this, the 12-/16-port CSI-RSs based on the CDM-4 have been introduced, and in this case, the full power utilization becomes possible through the existing 6 dB power boosting.

Figure 3D:
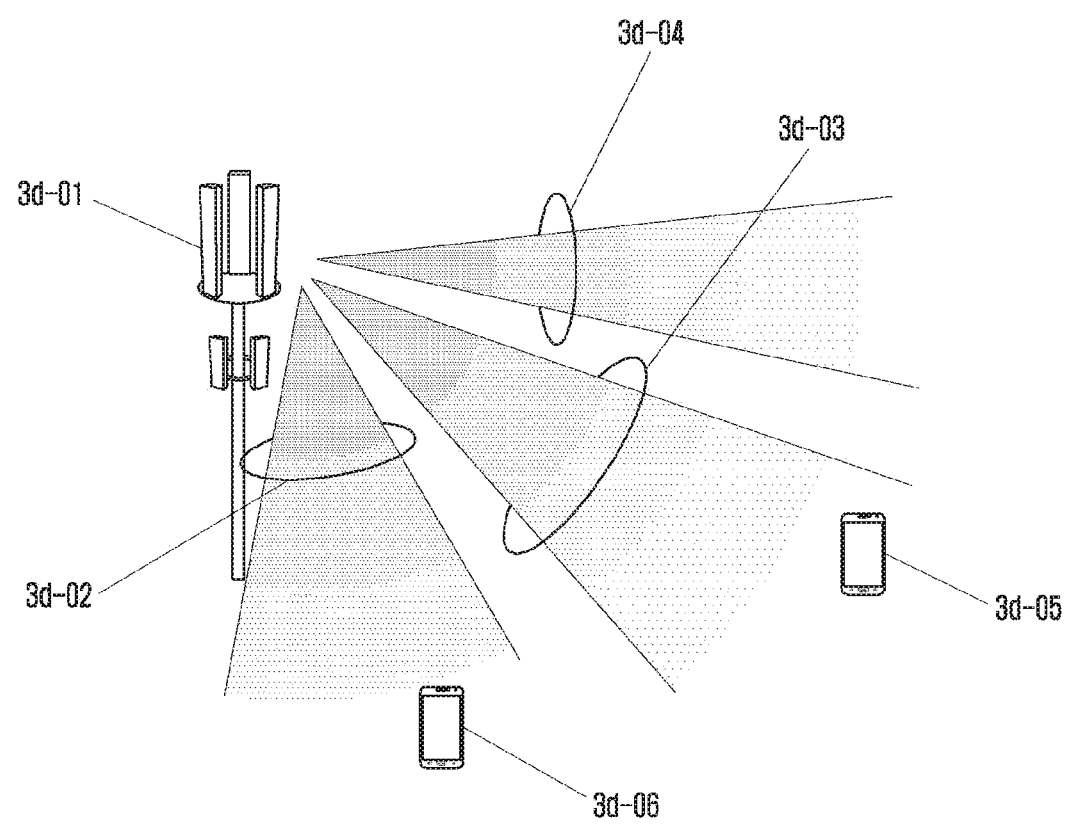
FIG. 3D is a diagram illustrating an example of BF CSI-RS operation.

The second method corresponds to beamformed (BF) CSI-RS (CSI-RS for Class B CSI reporting), and it is possible for the base station to make the terminal recognize a plurality of transceiver units (RXRUs) as one CSI-RS port by applying specific beams to the plurality of TXRUs. If the base station knows in advance channel information of the terminal, it may configure only a small number of CSI-RSs to which beams suitable to the channel information are applied to its TXRU. As another example, the base station may configure a plurality of CSI-RS resource configurations including 8 or less CSI-RS ports to the terminal. In this case, the base station can perform beamforming of the CSI-RS ports by applying beams in different directions for respective CSI-RS resource configurations. FIG. 3D illustrates an example of BF CSI-RS operation. Referring to FIG. 3D, the base station 3d-01 may configure three CSI-RSs 3d-02, 3d-03, and 3d-04 beamformed in different directions to terminals 3d-05 and 3d-06. Each of CSI-RS resources 3d-02, 3d-03, and 3d-04 may include one or more CSI-RS ports. The terminal 3d-05 may generate channel state information with respect to the configured CSI-RS resources 3d-02, 3d-03, and 3d-04, and may report an index of the CSI-RS resource preferred by the terminal to the base station through a CSI-Rs resource indicator (CRI). In an example of FIG. 3D, if the terminal 3d-05 prefers to the CSI-RS resource indicator 3d-03, it may report the index corresponding to 3d-03 to the base station, whereas if the terminal 3d-06 prefers to the CSI-RS resource 3d-02, it may report the index corresponding to 3d-02 to the base station.

Although the CRI supports a report of one CSI-RS index most preferred by the terminal, this can be extended to an aggregation of CSI-RS indexes preferred by the terminal 3d-05 in future. For example, if two CSI-RS resources most preferred by the terminal 3d-05 are 3d-03 and 3d-04, 3d-05 can directly report two indexes of the corresponding CSI-RS resources, or can report an index indicating a set composed of the corresponding CSI-RS resources. This is to make various applications possible, such as support of the terminal having wide angular spread of a channel or having high mobility with beams in various directions, or support of selection of a plurality of CSI-RSs transmitted from different transmission and reception points (TRPs).

(2-2)-Th Embodiment: Aperiodic CSI-RS Configuration Method 1

As for CSI-RS up to LTE-A Pro Release 13, semi-static detailed configuration values are determined by higher layer signaling or RRC signaling as described above in the (2-1)-th embodiment. The CSI-RS resource configuration up to the LTE-A Pro Release 13 includes the following information.

1. Number of CSI-RS ports: The number of CSI-RS ports included in one CSI-RS resource
2. CSI-RS configuration: Configuration values indicating locations of CSI-RS REs together with the number of CSI-RS ports
3. CSI-RS subframe configuration, ICSI-RS: Configuration values indicating a CSI-RS transmission period, TCSI-RS and CSI-RS subframe ΔCSI-RS
4. CSI-RS power boosting factor, PC: UE assumption of a ratio of CSI-RS transmission power to PDSCH
5. Scrambling ID, nID
6. Quasi co-location (QCL) information.

The existing CSI-RS includes the number of ports determined in accordance with the predetermined detailed configuration values, and is periodically transmitted. Accordingly, if it is assumed that UE-specific beamforming is applied to the beamformed CSI-RS, CSI-RS resource configurations as many as the number of UEs are required to cause a very great burden. Further, even in case of applying cell-specific beamforming to the beamformed CSI-RS, the number of antennas of the base station is increased, and if the beam width is narrowed due to such an increase of the number of antennas, a large number of CSI-RS resource configurations are required.

In order to solve such a problem and make efficient CSI-RS resource allocation possible, aperiodic CSI-RS (Ap-CSI-RS) transmission can be introduced. As seen from one terminal, in the aperiodic CSI-RS, the CSI-RS may not be always transmitted on all configured resources, but the CSI-RS may be transmitted only on resources satisfying a specific condition.

Figure 3E:
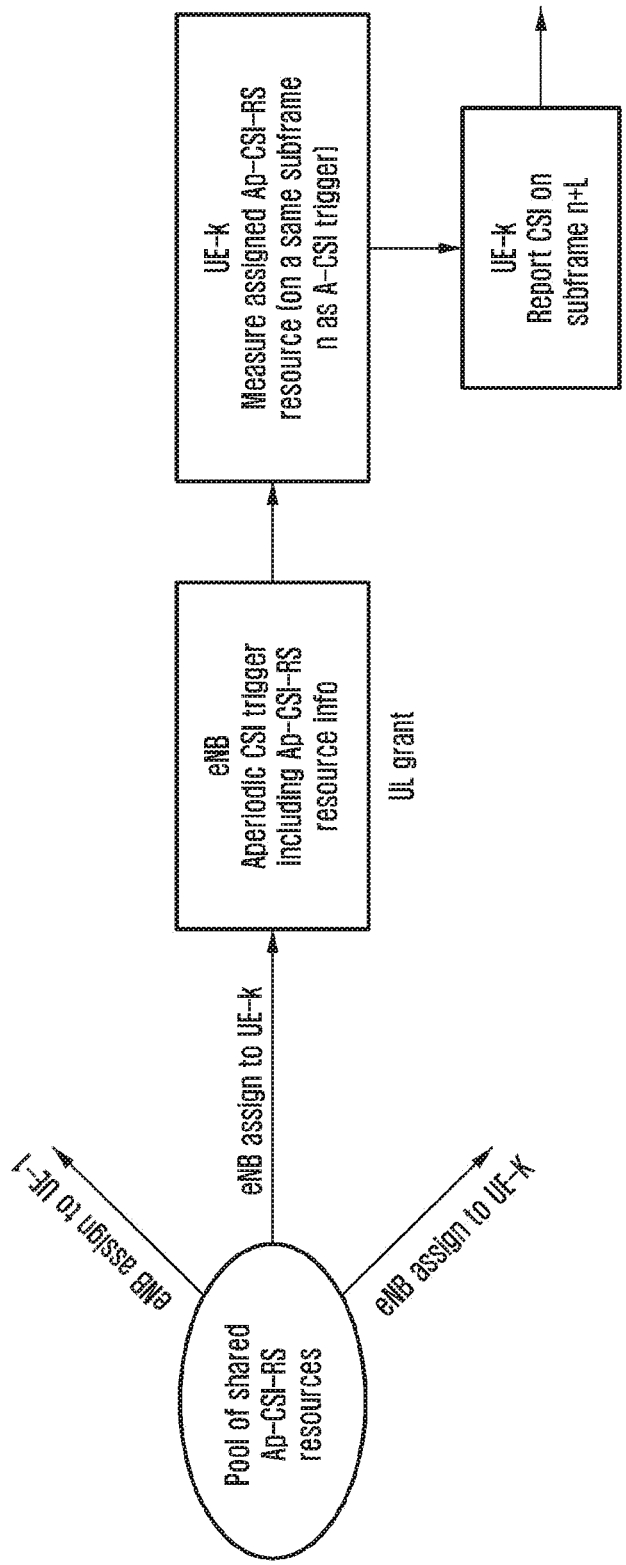
FIG. 3E is a diagram illustrating an example of aperiodic CSI-RS transmission/reception and corresponding CSI reporting.

FIG. 3E is a diagram illustrating an example of aperiodic CSI-RS transmission/reception and corresponding CSI reporting. Referring to FIG. 3E, a base station may configure a CSI-RS resource for aperiodic CSI-RS transmission to a terminal. In this case, the base station may configure the same aperiodic CSI-RS resource to a plurality of terminals in consideration of the point that the aperiodic CSI-RS may not be always transmitted. This is to heighten the CSI-RS resource use efficiency by operating an aperiodic CSI-RS resource pool that is shared by a predetermined number of terminals. Based on the CSI-RS configuration information, the base station may trigger aperiodic CSI reporting to the terminal through L1 signaling, such as UL grant. In accordance with an aperiodic CSI-RS configuration method based on the aperiodic CSI triggering, the terminal can receive 1) an aperiodic CSI-RS transmitted to a subframe, such as aperiodic CSI trigger, 2) an aperiodic CSI-RS transmitted to a subframe that is closest to a subframe on which the aperiodic CSI trigger has been signaled, 3) an aperiodic CSI-RS transmitted to a subframe that is closest to a subframe after the subframe on which the aperiodic CSI trigger has been signaled, or 4) an aperiodic CSI-RS transmitted after a predetermined time, for example, after the I-th subframe, from the subframe on which the aperiodic CSI trigger has been signaled. Here, 1 may be configured to be smaller than k as described above. Further, 1 may be a predetermined value or a value designated by higher layer signaling/L1 signaling. Thereafter, the terminal may generate CSI based on the received aperiodic CSI-RS, and may report the CSI to the base station on the (n+k)-th subframe. Here, the n-th subframe is a subframe including the aperiodic CSI trigger. If the terminal follows "4) the method for receiving the aperiodic CSI-RS transmitted after the predetermined time, for example, after the I-th subframe from the subframe on which the aperiodic CSI trigger has been signaled", it is also possible to report the generated CSI to the base station on the (n+k+l)-th subframe. This is to secure a terminal processing time for CSI generation.

As a detailed method for operating the aperiodic CSI-RS resource pool, 1) RRC signaling+L1 signaling, 2) RRC signaling+MAC CE signaling+L1 signaling, or 3) RRC signaling+MAC CE signaling may be used. The RRC signaling/MAC CE signaling/L1 signaling have high reliability in the order of RRC>MAC CE>L1, and require low delay time in the order of L1<MAC CE<RRC. For example, information configured through the RRC signaling has very high reliability, but requires a very long reception time, whereas information configured through L1 signaling requires a very short reception time, but has a relatively low reliability. Further, since the L1 signaling is transmitted on the capacity-limited downlink control channel (DCI), signaling costs may be increased.

As in the first example, in case of using 1) RRC signaling+L1 signaling, the base station configures N CSI-RS resources to the terminal through the RRC signaling, and thereafter, selects L (<N) CSI-RS resources among the N CSI-RS resources using the L1 signaling. In this case, L1 signaling overhead is determined by N and L (N combination L), and for example, if it is assumed that N=8 CSI-RS resources are configured through the RRC and L≤2 resources are chosen through the L1 signaling, a very large DCI payload of $\lceil \log_2(28+8) \rceil = 6$ bits in total may be required.

On the other hand, as in the second example, in case of using 2) RRC signaling+MAC CE signaling+L1 signaling, it is possible to activate/deactivate specific CSI-RS resources designated through the MAC CE signaling among the RRC-signaled CSI-RS resources and to perform the L1 signaling thereof. Through this, the base station can obtain proper tradeoff between the CSI-RS resource configuration delay time and the DCI signaling overhead. For example, if it is assumed that N=8 CSI-RS resources are configured through the RRC, K=4 resources among them are activated by the MAC CE, and then L≤2 resources are chosen through the L1 signaling, it can be known that the required DCI payload of $\lceil \log_2(6+4) \rceil = 4$ bits in total is reduced in comparison to that as in the first example.

As in the third example, in case of using 3) RRC signaling+MAC CE signaling, it is possible to activate/deactivate K CSI-RS resources designated through the MAC CE signaling among the N RRC-signaled CSI-RS resources. In this case, unlike the first and second examples, the terminal finally determine whether to transmit the CSI-RS by the MAC CE without the L1 signaling. In this case, indication of the CSI-RS aperiodic transmission for each subframe is not possible, but the DCI overhead is greatly reduced.

In this embodiment, it is possible that the aperiodic CSI-RS is configured through higher layer signaling. As described above, the CSI-RS resource configuration for the aperiodic CSI-RS may include detailed configuration information, such as the number of CSI-RS ports, CSI-RS configuration, CSI-RS subframe configuration, CSI-RS power boosting factor, Scrambling ID, and quasi co-location (QCL) information. In case where the CSI-RS resource configuration for the aperiodic CSI-RS includes the CSI-RS subframe configuration among the detailed configuration information, the method for receiving "2) the aperiodic CSI-RS transmitted to the subframe that is closest to the subframe on which the aperiodic CSI trigger has been signaled", or "3) the aperiodic CSI-RS transmitted to the subframe that is closest to the subframe after the subframe on which the aperiodic CSI trigger has been signaled" among the aperiodic CSI-RS reception methods as described above may be used. This is because the CSI-RS subframe configuration includes information on candidate subframes to which the aperiodic CSI-RS may be transmitted.

On the other hand, if the CSI-RS resource configuration for the aperiodic CSI-RS does not include the CSI-RS subframe configuration among the detailed configuration information, or includes the CSI-RS subframe configuration, but is engaged (or indicated by the base station) to disregard the same, the CSI-RS resource configuration does not include information on the candidate subframes to which the aperiodic CSI-RS may be transmitted. Accordingly, among the aperiodic CSI-RS reception methods as described above, the method for receiving "1) the aperiodic CSI-RS transmitted to the same subframe as that of the aperiodic CSI trigger", or "4) the aperiodic CSI-RS transmitted after the predetermined time, for example, after the I-th subframe, from the subframe on which the aperiodic CSI trigger has been signaled" may be used.

In the L1 signaling (UL DCI or UL grant), the aperiodic CSI-RS triggering composed of one bit or a plurality of bits may exist.

In case where one-bit aperiodic CSI-RS triggering is supported, a method for analyzing a CSI request field of DCI format 1 or DCI format 4 can be changed in accordance with triggering/non-triggering. For example, if the aperiodic CSI-RS is not triggered, the CSI request field serves to indicate a set to report the CSI among a set of serving cells configured by the higher layer, a set of CSI processes, and a set of CSI subframes in the same manner as that in the related art. In contrast, if the aperiodic CSI-RS is triggered, the CSI request field serves to indicate the CSI-RS resources on which the aperiodic CSI-RS is transmitted among a plurality of CSI-RS resource candidates as described in Table 3b. In this case, since the aperiodic CSI-RS transmission is triggered through additional L1 signaling of one bit, all code points of the CSI request field may have different meanings in addition to "no aperiodic CSI-RS and aperiodic CSI are triggered". As another example, if one-bit aperiodic CSI-RS triggering is supported, the method for analyzing the CSI request field of DCI format 1 or DCI format 4 can be indicated by the higher layer signaling (RRC signaling). In this case, the CSI request field may serve to indicate the set to report the CSI among the set of serving cells configured by the higher layer as in the related art, the set of CSI processes, and the set of CSI subframes through one-bit RRC signaling, or may service to indicate the CSI-RS resource on which the aperiodic CSI-RS is transmitted among the plurality of CSI-RS resource candidates as in an example of Table 3c. In this case, since the CSI request field includes a function for the aperiodic CSI-RS triggering, at least one code point may have the meaning of 'no aperiodic CSI-RS and aperiodic CSI are triggered".

TABLE 3b

Method for analyzing a CSI request field by one-bit aperiodic CSI-RS triggering based on L1 signaling

| Value of CSI request field | Description |
|---|---|
| 00 | Aperiodic CSI-RS and aperiodic CSI report are triggered for a set of CSI-RS resources configured by higher layers for serving cell c |
| 01 | Aperiodic CSI-RS and aperiodic CSI report are triggered for a 1$^{st}$ set of CSI-RS resources configured by higher layers |
| 10 | Aperiodic CSI-RS and aperiodic CSI report are triggered for a 2$^{nd}$ set of CSI-RS resources configured by higher layers |
| 11 | Aperiodic CSI-RS and aperiodic CSI report are triggered for a 3$^{rd}$ set of CSI-RS resources configured by higher layers |

TABLE 3c

Method for analyzing a CSI request field by one-bit aperiodic CSI-RS triggering based on higher layer signaling

| Value of CSI request field | Description |
|---|---|
| 00 | No aperiodic CSI-RS and aperiodic CSI reporting are triggered |
| 01 | Aperiodic CSI-RS and aperiodic CSI report are triggered for a set of CSI-RS resources configured by higher layers for serving cell c |
| 10 | Aperiodic CSI-RS and aperiodic CSI report are triggered for a 1$^{st}$ set of CSI-RS resources configured by higher layers |
| 11 | Aperiodic CSI-RS and aperiodic CSI report are triggered for a 2$^{nd}$ set of CSI-RS resources configured by higher layers |

In contrast, in case of the aperiodic CSI-RS triggering composed of a plurality of bits, it is possible to include a function of reporting on what CSI-RS resource the aperiodic CSI-RS is to be transmitted. Table 3b exemplifies the aperiodic CSI-RS triggering field composed of two bits. According to an example of Table 3d, in the aperiodic CSI-RS triggering field, at least one code point may have the meaning of "no aperiodic CSI-RS and aperiodic CSI are triggered". In addition, three code points respectively mean aperiodic CSI-RS triggering in serving cell c, and aperiodic CSI-RS triggering for first and second CSI-RS sets by higher layer signaling with respect to across serving cells. In this case, respective CSI-RSs are related to different aperiodic CSI-RS and aperiodic CSI reporting. Table 3d can be extended by a similar principle even in case where the aperiodic CSI triggering field is composed of three or more bits. A new table, like Table 3d, may be designated by a new transmission mode $^{TM}$, for example, TM11.

TABLE 3d

Method for analyzing an aperiodic CSI-RS field by two-bit aperiodic CSI-RS triggering

| Value of aperiodic CSI-RS field | Description |
|---|---|
| 00 | No aperiodic CSI-RS and aperiodic CSI reporting are triggered |
| 01 | Aperiodic CSI-RS and aperiodic CSI report are triggered for a set of CSI-RS resources configured by higher layers for serving cell c |
| 10 | Aperiodic CSI-RS and aperiodic CSI report are triggered for a 1$^{st}$ set of CSI-RS resources configured by higher layers |
| 11 | Aperiodic CSI-RS and aperiodic CSI report are triggered for a 2$^{nd}$ set of CSI-RS resources configured by higher layers |

(2-3)-Th Embodiment: Aperiodic CSI-RS Configuration Method 2

In this embodiment, an example of dynamic port numbering configuration in an aperiodic CSI-RS configuration method will be described. The dynamic port numbering means that the number of CSI-RS ports included in an aperiodic CSI-RS resource may be changed during transmission of the aperiodic CSI-RS. As an example, the aperiodic CSI-RS resource may be configured by dynamic CSI-RS resource aggregation.

Figure 3F:
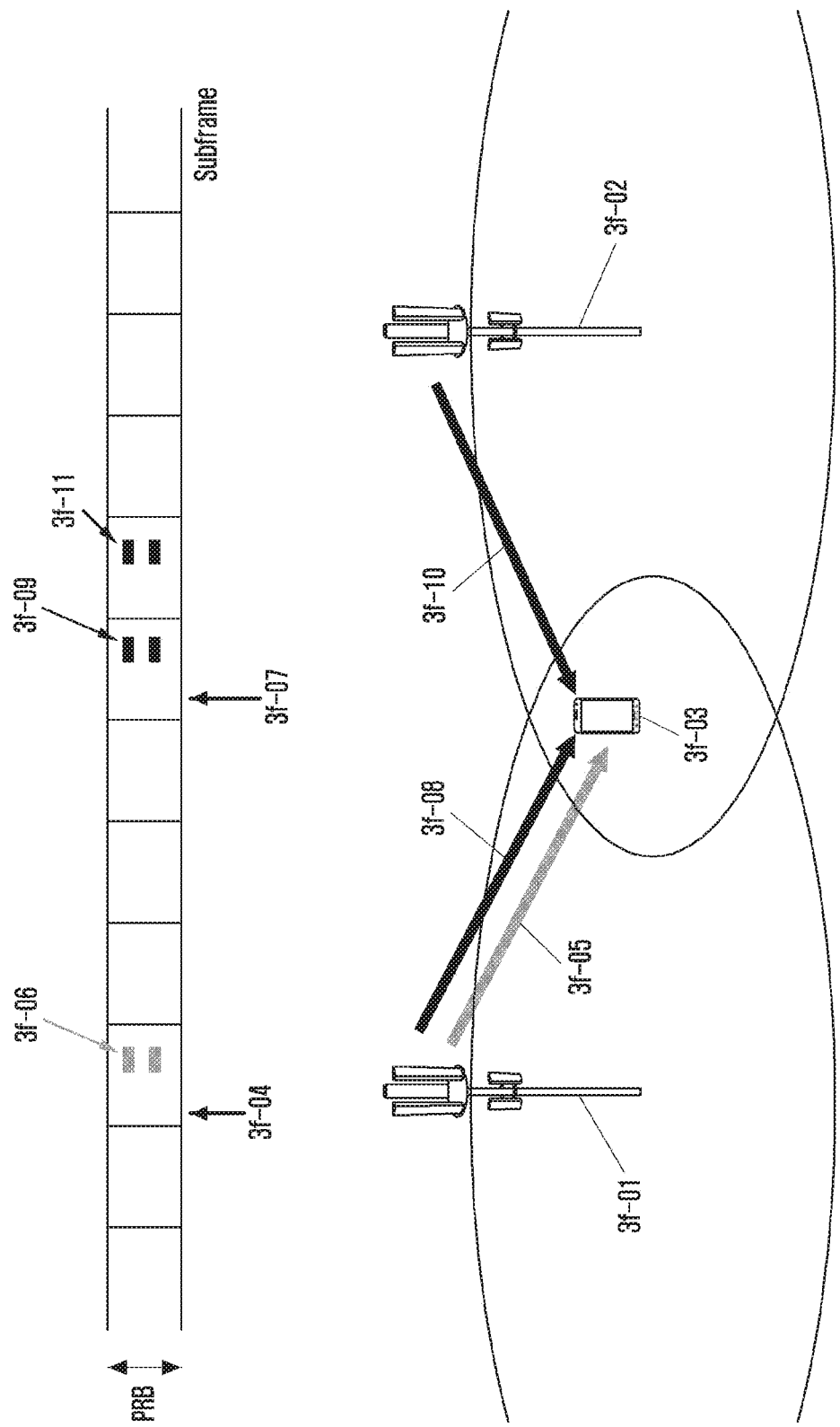
FIG. 3F is a diagram illustrating an example of a dynamic port numbering operation scenario for an aperiodic CSI-RS.

FIG. 3F is a diagram illustrating an example of a dynamic port numbering operation scenario for an aperiodic CSI-RS. In FIG. 3F, it is assumed that each of base stations 3f-01 and 3f-02 operates 8 CSI-RS ports.

As an example, in case where a terminal 3f-03 receives data transmitted from the base station 3f-01, the base station 3f-01 may perform aperiodic CSI-RS transmission and aperiodic CSI trigger through L1 signaling at 3f-04. Through this, the terminal 3f-03 can receive the aperiodic CSI-RS transmitted form an aperiodic CSI-RS resource 3f-06 through a similar method to the method according to the second embodiment, and generate and report to the base station the CSI for a channel 3f-05 composed of 8-port CSI-RS.

As another example, in case where the terminal 3f-03 receives data simultaneously from the base stations 3f-01 and 3f-02 (e.g., like CoMP JT), the base station may perform aperiodic CSI-RS transmission and aperiodic CSI trigger through L1 signaling at 3f-07. In this case, the aperiodic CSI-RS triggering may mean that an aperiodic CSI-RS resource 3f-09 for measuring the channel 3f-08 and an aperiodic CSI-RS resource 3f-11 for measuring the channel 3f-10 are simultaneously transmitted. For convenience in explanation, FIG. 3F illustrates a situation in which 3f-09 and 3f-11 are configured on different subframes, but is not limited thereto. It is also possible to perform transmission in the same subframe in accordance with the aperiodic CSI-RS triggering method according to the second embodiment as described above. The terminal may receive the aperiodic CSI-RSs 3f-09 and 3f-11, and generate and report 8-port CSI-RS based CSI for each CSI-RS resource (using 8 Tx codebook). However, the terminal can also recognize CSI- RSs of 3*f*-09 and 3*f*-11 as one CSI-RS resource (aggregation between aperiodic CSI-RS resources), and generate and report 16-port CSI-RS based CSI (using 16 Tx codebook). This is for the terminal to generate a PMI using a codebook having a size that is larger than the number of antennas of a single base station, and since the PMI generated as above suggestively includes not only a phase difference between respective base station antennas but also a phase difference between TRP 3*f*-01 and TRP 3*f*-02, CQI mismatch problem in CoMP JT can be solved.

Figure 3G:
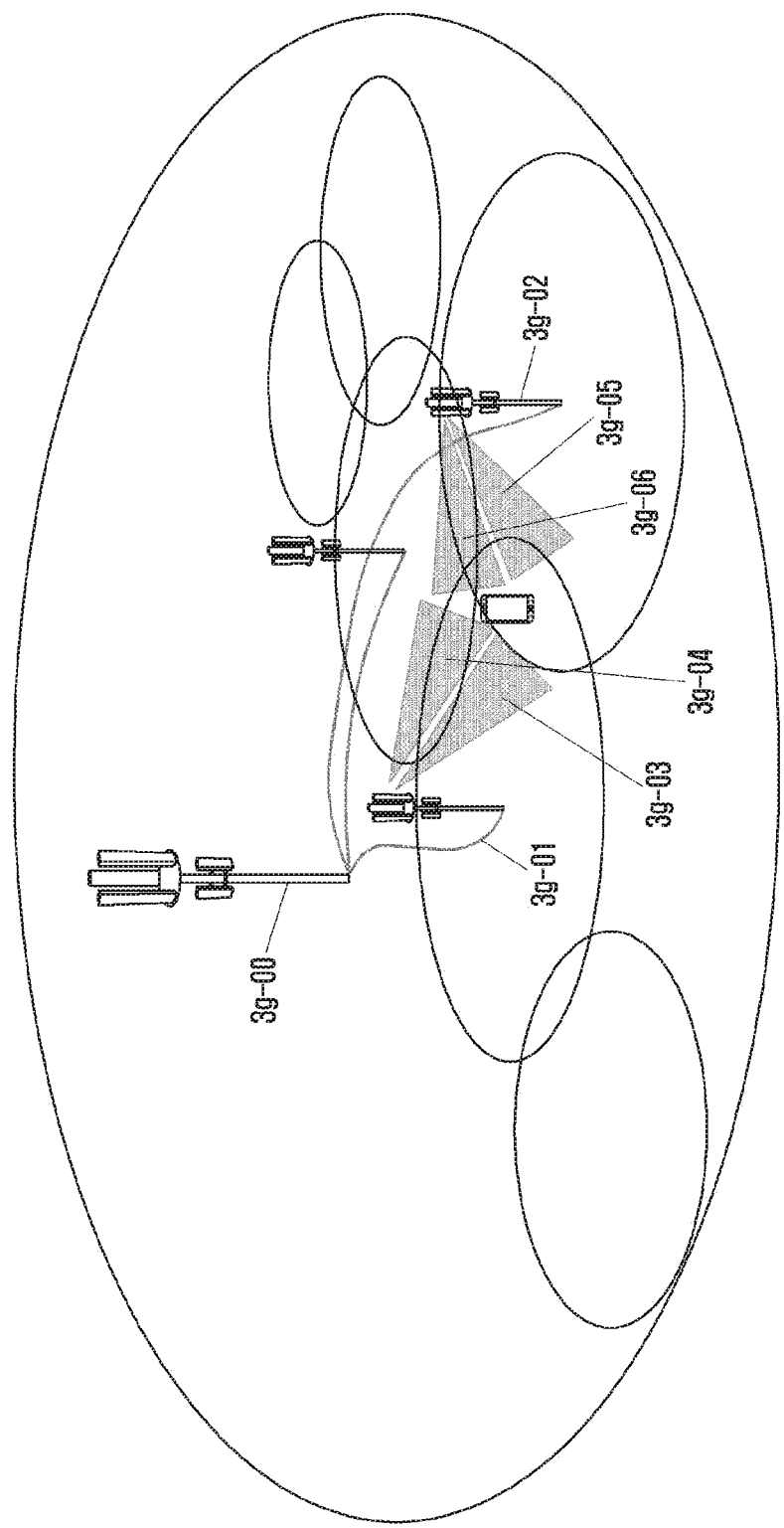
FIG. 3G is a diagram illustrating another example of a dynamic port numbering operation scenario for an aperiodic CSI-RS.

FIG. 3G is a diagram illustrating another example of a dynamic port numbering operation scenario for an aperiodic CSI-RS. In future, the CRI may be extended to have a function of indicating one subset composed of a plurality of preferable CSI-RS resources or a plurality of CSI-RS resources. If the total sums of the CSI-RS port numbers of the CSI-RS resources included in one subset are different from each other, it may be necessary to apply different precoding schemes in accordance with the selected CSI-RS resource subset. For example, "one cell" operation scenario as illustrated in FIG. 3G may be assumed. In this case, a coverage RS (or CRS, coverage CSI-RS, or cell-specific CSI-RS) is transmitted by a macro eNB 3*g*-00, but a UE-specific RS (or CSI-RS, UE-specific CSI-RS, or dedicated CSI-RS) 3*g*-03 to 3*g*-06 can be transmitted from different TRPs. That is, the respective TRPs may be discriminated by the UE-specific RS. If it is assumed that the respective TRPs have a plurality of UE-specific RS resources to which different beams are applied, the terminal may report preferable UE-specific RS resource information for each TRP to the base station through the CRI for each TRP. For example, if TRPs 3*g*-01 and 3*g*-02 receive data on the assumption that the terminal receives data from the plurality of TRPs, the terminal may report a preferable one of CSI-RSs e3*g*-03 and 3*g*-04 for TRP 3*g*-01, and may report a preferable one of CSI-RSs 3*g*-05 and 3*g*-06 for TRP 3*g*-02. In this case, the base station can transmit the aperiodic CSI-RS selectively from a plurality of CSI-RS resources with reference to the preference of the terminal. In case of transmitting the aperiodic CSI-RS on the plurality of CSI-RS resources, a detailed configuration and transmission method may be performed in a similar manner to the example of FIG. 3F.

Specifically, the following methods may be considered for the aperiodic CSI-RS configuration based on dynamic port configuration or dynamic resource aggregation.

Figure 3H:
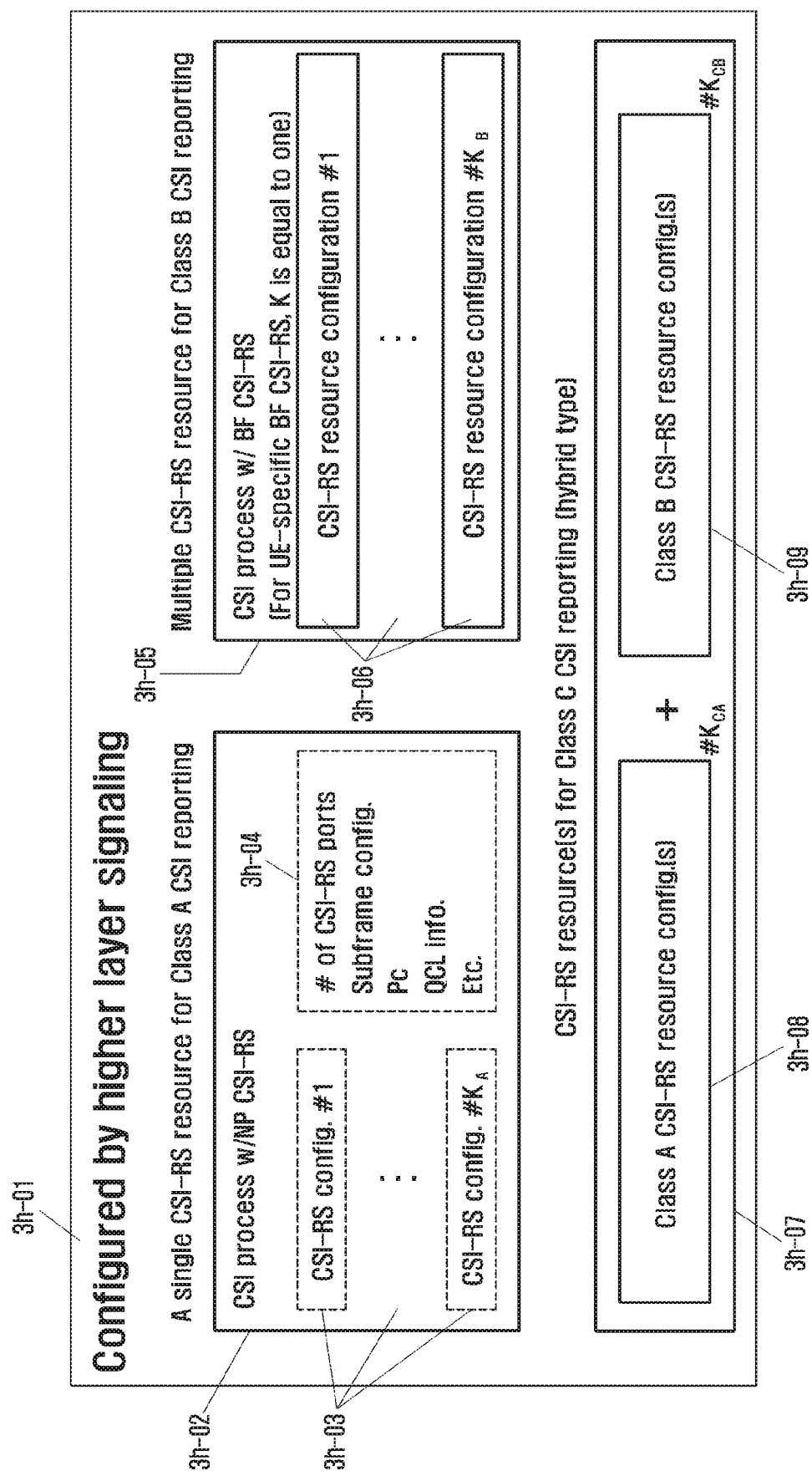
FIG. 3H is a diagram illustrating CSI-RS resource configuration by higher layer signaling for an aperiodic CSI-RS.

Aperiodic CSI-RS Configuration Method 2a:

The first method is aperiodic CSI-RS configuration through higher layer signaling and one-bit L1 signaling. In this example, the CSI-RS resource configuration by higher layer signaling for the aperiodic CSI-RS is as illustrated in FIG. 3H. Referring to FIG. 3H, in consideration of the non-precoded CSI-RS, beamformed CSI-RS, and hybrid CSI-RS, three kinds of higher layer signaling are possible. In this case, the higher layer signaling may include RRC signaling and MAC CE signaling as described above in the embodiment 3-2. This means that CSI-RS resources or configurations called KA, KB, KCA, and KCB in FIG. 3H can depend on only RRC configuration, but can also be activated/deactivated through the MAC CE configuration. Since FIG. 3H is prepared in first consideration of RRC configuration, but can be extended to be configured as an aggregation of RRC/MAC CE in a similar manner to that as described in the embodiment 2-2, detailed explanation thereof will be omitted.

In case of non-precoded CSI-RS, the higher layer signaling may include signaling information, such as 3*h*-02. Specifically, 3*h*-02 includes KA-numbered CSI-RS configurations 3*h*-03 for configuring 8 or more CSI-RS ports and one other detailed configuration information 3*h*-04. In this case, if the aperiodic CSI-RS is triggered through one-bit L1 signaling, this means that the aperiodic CSI-RS is transmitted from all CSI-RS REs designated by 3*h*-03.

In case of beamformed CSI-RS, higher layer signaling may include signaling information, such as 3*h*-05. Specifically, 3*h*-05 includes KB-numbered CSI-RS resource configurations to which different beams can be applied, and each of the CSI-RS resource configurations 3*h*-06 includes CSI-RS detailed configuration information. In this case, if the aperiodic CSI-RS is triggered through the one-bit L1 signaling, it may be engaged to be understood as two methods as follows. The first method is engaged to mean that the aperiodic CSI-RS is transmitted from all CSI-RS REs designated by 3*h*-06. In this case, a CRI report through the aperiodic CSI-RS is possible, but the CSI-RS overhead reduction effect due to the aperiodic CSI-RS becomes reduced. The second method is engaged so that the aperiodic CSI-RS is transmitted only on the CSI-RS resource designated by the CRI pre-reported by the terminal through 3*h*-06. In this case, the CSI-RS overhead reduction effect is maximized, but the CRI report through the aperiodic CSI-RS becomes difficult. In the second method, if the CRI designates a plurality of CSI-RS resources, the CSI-RS resources designated together may be recognized as a single CSI-RS resource. For example, when the CRI designates two 8-port CSI-RS resources as the aperiodic CSI-RS resource, the number of aperiodic CSI-RS ports assumed by the terminal becomes 16 that is the total sum of the CSI-RS port numbers included in the two CSI-RS resources.

In case of hybrid CSI-RS, higher layer signaling may include signaling information, such as 3*h*-07. Specifically, 3*h*-07 may be composed of two parts of 3*h*-08 including KCA-numbered CSI-RS configurations for configuring a plurality of CSI-RS ports and 3*h*-09 including KCB-numbered CSI-RS resource configurations to which different beams can be applied. As an example, 3*h*-08 may be similar to 3*h*-02, and 3*h*-09 may be similar to 3*h*-05. In this case, if the aperiodic CSI-RS is triggered through the one-bit L1 signaling, it may be engaged to be understood as two methods as follows. The first method is engaged to mean that the aperiodic CSI-RS is transmitted from all CSI-RS REs designated by 3*h*-08. In this case, CSI-RS ports designated by 3*h*-09 are transmitted on periodic CSI-RS resources. The second method is to make the aperiodic CSI-RS be transmitted only to a part designated by the CRI among all CSI-RS REs designated by 3*h*-09 or all CSI-RS resources designated by 3*h*-09. In case of the hybrid CSI-RS, it is also possible to support aperiodic CSI-RS triggering through two-bit L1 signaling. For example, the respective bits may be used to indicate whether the aperiodic CSI-RS is transmitted from the CSI-RS resources designated by 3*h*-08 and whether the aperiodic CSI-RS is transmitted from the CSI-RS resources designated by 3*h*-09.

In this example, if the L1 signaling for the aperiodic CSI-RS triggering is applied for "all CSI-RS resources", the L1 signaling can be individually supported for each CSI process. Further, if the L1 signaling for the aperiodic CSI-RS triggering is applied for "the CSI-RS resource designated by the CRI", the L1 signaling can be applied to the corresponding CSI-RS resource regardless of the CSI process.

Figure 3I:
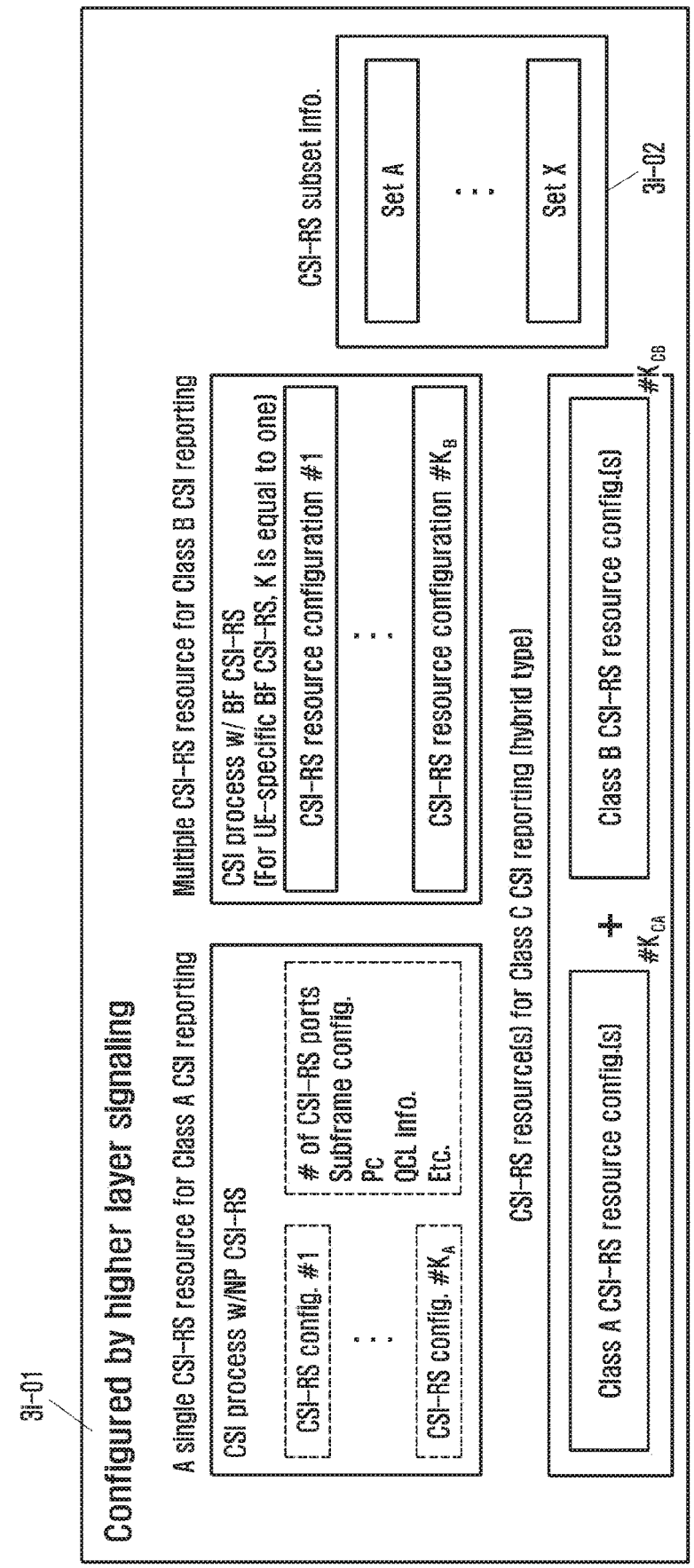
FIG. 3I is a diagram illustrating CSI-RS resource configuration by higher layer signaling for an aperiodic CSI-RS.

Aperiodic CSI-RS Configuration Method 2b:

The second method is aperiodic CSI-RS configuration through higher layer signaling and L1 signaling composed of a plurality of bits. In this example, the CSI-RS resource configuration by higher layer signaling for the aperiodic CSI-RS is as illustrated in FIG. 3I. In this case, the higher layer signaling may include RRC signaling and MAC CE signaling as described above in the embodiment 2-2. This means that CSI-RS resources or configurations called KA, KB, KCA, and KCB in FIG. 3I can depend on only RRC configuration, but can also be activated/deactivated through the MAC CE configuration. Since FIG. 3I is prepared in first consideration of RRC configuration, but can be extended to be configured as an aggregation of RRC/MAC CE in a similar manner to that as described in the embodiment 2-2, detailed explanation thereof will be omitted.

Referring to FIG. 3I, three kinds of higher layer signaling are possible in consideration of non-precoded CSI-RS, beamformed CSI-RS, and hybrid CSI-RS. In this example, it is possible to designate CSI-RS resource subsets on which the aperiodic CSI-RS is to be transmitted through L1 signaling, and the CSI-RS resource subsets may be notified to the terminal through the higher layer signaling, such as $3i$-02. In $3i$-02, at least one CSI-RS resource may be allocated to set A to set X, and if two or more CSI-RS resources are allocated to one set, the CSI-RS resources allocated together may be recognized as a single CSI-RA resource. For example, if set A is designated as the aperiodic CSI-RS resource through L1 signaling, the number of aperiodic CSI-RS resources assumed by the terminal is the total sum of the CSI-RS port numbers included in all CSI-RS resources included in set A. In embodiment 3-2, activation/deactivation by the MAC CE signaling is one of detailed examples for configuring the CSI-RS resource subset. If only RRC and MAC CE configurations are provided as in the third example of embodiment 3-2 and L1 signaling is not supported, the terminal may assume that all CSI-RSs included in the CSI-RS resource subsets set A to set X are being transmitted.

In case of non-precoded CSI-RS, higher layer signaling may include signaling information, such as $3h$-02, in a similar manner to that of the aperiodic CSI-RS configuration method 2a. Specifically, $3h$-02 includes KA-numbered CSI-RS configurations $3h$-03 for configuring 8 or more CSI-RS ports and one other detailed configuration information $3h$-04. In this case, if the aperiodic CSI-RS is triggered through L1 signaling composed of a plurality of bits, this means that the aperiodic CSI-RS is transmitted from the corresponding RE in replacement of the CSI-RS resource configuration information designated by $3i$-02 while disregarding partial configuration information of $3h$-02. For example, if the aperiodic CSI-RS is triggered through 2-bit L1 signaling, it is possible to transmit the aperiodic CSI-RS with reference to Table 3b, 3c, 3d, or 3e. The purpose of Tables 3b to 3d are as described above, and in case of Table 3e, if the base station configures "00", the terminal can use the CSI-RS resources on which the aperiodic CSI-RS is transmitted for the purpose of reporting the CRI without aggregation of the CSI-RS resources. As another method, it is also possible to perform signaling whether to transmit the aperiodic CSI-RS for the respective CSI-RS configurations through L1 signaling composed of KA-numbered bits.

TABLE 3e

Aperiodic CSI-RS field analysis method by 2-bit aperiodic CSI-RS triggering

| Value of aperiodic CSI-RS field | Description |
| --- | --- |
| 00 | Aperiodic CSI-RS and aperiodic CSI report are triggered for all CSI-RS resources |
| 01 | Aperiodic CSI-RS and aperiodic CSI report are triggered for a $1^{st}$ set of CSI-RS resources configured by higher layers |
| 10 | Aperiodic CSI-RS and aperiodic CSI report are triggered for a $2^{nd}$ set of CSI-RS resources configured by higher layers |
| 11 | Aperiodic CSI-RS and aperiodic CSI report are triggered for a $3^{rd}$ set of CSI-RS resources configured by higher layers |

In case of beamformed CSI-RS, higher layer signaling may include signaling information, such as $3h$-05, in a similar manner to that of the aperiodic CSI-RS configuration method 2a. Specifically, $3h$-05 includes KB-numbered CSI-RS resource configurations to which different beams can be applied, and each of the CSI-RS resource configurations $3h$-06 includes CSI-RS detailed configuration information. In this case, if the aperiodic CSI-RS is triggered through the L1 signaling composed of a plurality of bits, it may be engaged to be understood as two methods as follows. The first method is to perform signaling whether to transmit the aperiodic CSI-RS for the respective CSI-RS resource configurations of $3h$-06 through the L1 signaling composed of KB-numbered bits. This is the most fluid method, but requires high L1 signaling overhead. The second method is to receive the aperiodic CSI-RS configuration information with reference to the configuration information of $3i$-02 through the L1 signaling composed of a smaller number of bits in order to reduce the L1 signaling overhead. As an example, it is possible to use an aperiodic CSI request field as the aperiodic CSI-RS configuration information based on Table 3b, 3c, or 3d, or to introduce a new table as in Table 3e. The detailed explanation thereof is similar to that of the above-described examples, and thus will be omitted.

In case of hybrid CSI-RS, higher layer signaling may include signaling information, such as $3h$-07, in a similar manner to that of the aperiodic CSI-RS configuration method 2a. Specifically, $3h$-07 may be composed of two parts of $3h$-08 including KCA-numbered CSI-RS configurations for configuring a plurality of CSI-RS ports and $3h$-09 including KCB-numbered CSI-RS resource configurations to which different beams can be applied. As an example, $3h$-08 may be similar to $3h$-02, and $3h$-09 may be similar to $3h$-05. In this case, if the aperiodic CSI-RS is triggered through L1 signaling composed of a plurality of bits, it may be engaged to be understood as two methods as follows. The first method is to perform signaling whether to transmit the aperiodic CSI-RS for the respective CSI-RS resource configurations of $3h$-07 through the L1 signaling composed of (KCA+KCB-numbered or (1+KCB)-numbered bits. If the L1 signaling is composed of (1+KCB)-numbered bits, the CSI-RS configurations included in 3h-08 are considered as one group to determine whether to use the aperiodic CSI-RS transmission. This is the most fluid method, but requires high L1 signaling overhead. The second method is to receive the aperiodic CSI-RS configuration information with reference to the configuration information of 3i-02 through the L1 signaling composed of a smaller number of bits in order to reduce the L1 signaling overhead. As an example, it is possible to use an aperiodic CSI request field as the aperiodic CSI-RS configuration information based on Table 3b, 3c, or 3d, or to introduce a new table as in Table 3e. The detailed explanation thereof is similar to that of the above-described examples, and thus will be omitted.

Aperiodic CSI-RS Configuration Method 2c:

The third method is aperiodic CSI-RS configuration through higher layer signaling and L1 signaling composed of a plurality of bits. In this example, the CSI-RS resource configuration by higher layer signaling for the aperiodic CSI-RS is as illustrated in FIG. 3H. In this case, the higher layer signaling may include RRC signaling and MAC CE signaling as described above in the embodiment 2-2. This means that CSI-RS resources or configurations called KA, KB, KCA, and KCB in FIG. 3H can depend on only RRC configuration, but can also be activated/deactivated through the MAC CE configuration. Since FIG. 3H is prepared in first consideration of RRC configuration, but can be extended to be configured as an aggregation of RRC/MAC CE in a similar manner to that as described in the embodiment 2-2, detailed explanation thereof will be omitted. Referring to FIG. 3H, three kinds of higher layer signaling are possible in consideration of non-precoded CSI-RS, beamformed CSI-RS, and hybrid CSI-RS. In this example, it is possible to trigger the aperiodic CSI-RS using one-bit or two-bit L1 signaling in a similar manner to that of the aperiodic CSI-Rs configuration method 2a. This embodiment is different from the aperiodic CSI-RS configuration method 2a on the point that it is possible to reconfigure the "number of CSI-RS ports" among detailed configuration information for the aperiodic CSI-RS, and for this, the existing L1 signaling, such as the CSI request field as in Table 3f-a or 3f-b, may be reused, or a new L1 signaling for this as in Table 3f-c or 3f-d may be introduced.

Table 3f-a is a table representing an analysis method of the terminal for a CSI request field when the aperiodic CSI-RS is triggered by one-bit L1 signaling. In a similar manner to that of the aperiodic CSI-RS configuration method 2a, the terminal may assume that the aperiodic CSI-RS is transmitted on a CSI-RS resource for non-precoded CSI-RS, the aperiodic CSI-RS is transmitted on the CSI-RS resource corresponding to a recently reported CRI among CSI-RS resources for beamformed CSI-RS, or the aperiodic CSI-RS is transmitted on the CSI-RS resource for UE-specific beamformed CSI-RS (in this case, one CSI-Rs resource is configured to the terminal). The terminal may identify the CSI-RS configuration from respective CSI-RS resource configurations in accordance with the above-described condition. Thereafter, the terminal can know how many CSI-RS ports are transmitted to the corresponding CSI-RS resource in accordance with the CSI request field value configured by the base station. For example, the number of CSI-RS ports may be analyzed in a manner that if the CSI request field is 00, 01, 10, and 11, the number of CSI-RS ports is 1, 2, 4, and 8, respectively. Thereafter, the terminal can analyze an RE location from which the aperiodic CSI-Rs is transmitted through aggregation of the CSI-RS configuration and the number of CSI-RS ports. The above-described CSI request field analysis method is exemplary, and it is also possible to perform signaling of various numerals. As an example, if the CSI request field is 00, the number of RRC-signaled CSI-RS ports included in the existing CSI-RS resource configuration can be reused, and if the CSI request field is 01, 10, and 11, the number of CSI-RS ports can be analyzed as 1, 2, and 4, respectively.

TABLE 3f-a

CSI request field analysis method by one-bit L1 signaling aperiodic CSI-RS triggering in aperiodic CSI-RS configuration method 2c

| Value of CSI request field | Description |
|---|---|
| 00 | Aperiodic CSI-RS and aperiodic CSI report are triggered with a $1^{st}$ candidate of the number of CSI-RS ports (configured by highler layers) |
| 01 | Aperiodic CSI-RS and aperiodic CSI report are triggered with a $2^{nd}$ candidate of the number of CSI-RS ports (configured by highler layers) |
| 10 | Aperiodic CSI-RS and aperiodic CSI report are triggered with a $3^{rd}$ candidate of the number of CSI-RS ports (configured by highler layers) |
| 11 | Aperiodic CSI-RS and aperiodic CSI report are triggered with a $4^{th}$ candidate of the number of CSI-RS ports (configured by highler layers) |

Table 3f-b is a table representing an analysis method of the terminal for a CSI request field when a CSI request field is configured to be used for the purpose of aperiodic CSI-RS triggering through one-bit RRC signaling. In a similar manner to that of the aperiodic CSI-RS configuration method 2a, the terminal may assume that the aperiodic CSI-RS is transmitted on a CSI-RS resource for non-precoded CSI-RS, the aperiodic CSI-RS is transmitted on the CSI-RS resource corresponding to a recently reported CRI among CSI-RS resources for beamformed CSI-RS, or the aperiodic CSI-RS is transmitted on the CSI-RS resource for UE-specific beamformed CSI-RS (in this case, one CSI-Rs resource is configured to the terminal). The terminal may identify the CSI-RS configuration from respective CSI-RS resource configurations in accordance with the above-described condition. Thereafter, the terminal can know whether the aperiodic CSI-RS is transmitted on the corresponding CSI-RS resource, and if so, how many CSI-RS ports are transmitted to the corresponding CSI-RS resource in accordance with the CSI request field value configured by the base station. For example, if the CSI request field is 00, this means that the aperiodic CSI-RS is not transmitted. Further, if the CSI request field is 01, 10, and 11, the number of CSI-RS ports may be analyzed to be 1, 2, and 4, respectively. Thereafter, the terminal can analyze an RE location from which the aperiodic CSI-Rs is transmitted through aggregation of the CSI-RS configuration and the number of CSI-RS ports. The above-described CSI request field analysis method is exemplary, and it is also possible to define specific numerals in a table or to perform RRC signaling of various numerals. As an example, if the CSI request field is 00, this means that the aperiodic CSI-RS is not transmitted, and if the CSI request field is 01, the number of RRC-signaled CSI-RS ports included in the existing CSI-RS resource configuration can be reused. Further, if the CSI request field is 10 and 11, the number of CSI-RS ports can be analyzed as 1 and 2, respectively.

TABLE 3f-b

CSI request field analysis method by one-bit higher layer signaling aperiodic CSI-RS triggering in aperiodic CSI-RS configuration method 2c

| Value of CSI request field | Description |
|---|---|
| 00 | No aperiodic CSI-RS and aperiodic CSI reporting are triggered |
| 01 | Aperiodic CSI-RS and aperiodic CSI report are triggered with a $1^{st}$ candidate of the number of CSI-RS ports (configured by highler layers) |
| 10 | Aperiodic CSI-RS and aperiodic CSI report are triggered with a $2^{nd}$ candidate of the number of CSI-RS ports (configured by highler layers) |
| 11 | Aperiodic CSI-RS and aperiodic CSI report are triggered with a $3^{rd}$ candidate of the number of CSI-RS ports (configured by highler layers) |

As another method, it is possible to notify the number of CSI-RS ports included in the aperiodic CSI-RS resource through additional L1 signaling. Tables 3f-c and 3f-d are tables representing examples of configuring the number of aperiodic CSI-Rs ports through 2-bit L1 signaling. In a similar manner to that of the aperiodic CSI-RS configuration method 2a, the terminal may assume that the aperiodic CSI-RS is transmitted on a CSI-RS resource for non-precoded CSI-RS, the aperiodic CSI-RS is transmitted on the CSI-RS resource corresponding to a recently reported CRI among CSI-RS resources for beamformed CSI-RS, or the aperiodic CSI-RS is transmitted on the CSI-RS resource for UE-specific beamformed CSI-RS (in this case, one CSI-Rs resource is configured to the terminal). The terminal may identify the CSI-RS configuration from respective CSI-RS resource configurations in accordance with the above-described condition. Thereafter, if the aperiodic CSI-RS is triggered, the terminal can know how many CSI-RS ports are transmitted to the corresponding CSI-RS resource in accordance with CSI request field values as presented in Table 3f-c or 3f-d. In accordance with an example of Table 3f-c, the number of CSI-RS ports according to the aperiodic CSI-RS field value can be predetermined in the aperiodic CSI-RS field table. For example, the number of CSI-RS ports may be analyzed in a manner that if the CSI request field is 00, 01, 10, and 11, the number of CSI-RS ports is 1, 2, 4, and 8, respectively. Thereafter, the terminal can analyze an RE location from which the aperiodic CSI-Rs is transmitted through aggregation of the CSI-RS configuration and the number of CSI-RS ports. The above-described CSI request field analysis method is exemplary, and it is also possible to define specific numerals in the table or to perform RRC signaling of various numerals as in Table 3f-d. As an example, if the CSI request field is 00, the number of RRC-signaled CSI-RS ports included in the existing CSI-RS resource configuration can be reused, and if the CSI request field is 01, 10, and 11, the number of CSI-RS ports can be analyzed as 1, 2, and 4, respectively.

In a similar manner to the examples of Tables 3f-c and 3f-d, Table 3f-e can be used in consideration of coexistence of the periodic CSI-RS and the aperiodic CSI-RS. Through Table 3f-e, it is possible to individually turn on/off the aperiodic CSI reporting based on the periodic CSI-RS and the aperiodic CSI reporting based on the aperiodic CSI-RS.

TABLE 3f-c

A periodic CSI-RS field analysis method by 2-bit aperiodic CSI-RS triggering

| Value of aperiodic CSI-RS field | Description |
|---|---|
| 00 | Aperiodic CSI-RS resource contains 1 port CSI-RS |
| 01 | Aperiodic CSI-RS resource contains 2 port CSI-RS |
| 10 | Aperiodic CSI-RS resource contains 4 port CSI-RS |
| 11 | Aperiodic CSI-RS resource contains 8 port CSI-RS |

TABLE 3f-d

A periodic CSI-RS field analysis method by 2-bit aperiodic CSI-RS triggering

| Value of aperiodic CSI-RS field | Description |
|---|---|
| 00 | Aperiodic CSI-RS resource contains A port CSI-RS and A is configured by higher layers |
| 01 | Aperiodic CSI-RS resource contains B port CSI-RS and B is configured by higher layers |
| 10 | Aperiodic CSI-RS resource contains C port CSI-RS and C is configured by higher layers |
| 11 | Aperiodic CSI-RS resource contains D port CSI-RS and D is configured by higher layers |

TABLE 3f-e

A periodic CSI-RS field analysis method by 2-bit aperiodic CSI-RS triggering

| Value of aperiodic CSI-RS field | Description |
|---|---|
| 00 | No aperiodic CSI-RS resource is triggered |
| 01 | Aperiodic CSI-RS resource contains A port CSI-RS and A is configured by higher layers |
| 10 | Aperiodic CSI-RS resource contains B port CSI-RS and B is configured by higher layers |
| 11 | Aperiodic CSI-RS resource contains C port CSI-RS and C is configured by higher layers |

(2-4)-Th Embodiment: Rate Matching Method in Accordance with Aperiodic CSI-RS Transmission In an LTE-A/LTE-A Pro system, the terminal can perform rate matching by identifying PDSCH RE mapping through identification of non-zero power (NZP) CSI-RS configuration information and zero power (ZP) CSI-RS configuration information. In the periodic CSI-RS transmission in the related art, CSI-RS transmission information is semi-statically configured, and thus additional signaling for the rate matching is not necessary. In contrast, in case of introducing aperiodic CSI-RS transmission proposed in the present disclosure, CSI-RS transmission/non-transmission and partial CSI-RS configuration information can be dynamically changed, and thus there is a need for a method for efficient rate matching. In this embodiment, as rate matching methods considering the aperiodic CSI-RS, three examples as follows are provided.

Rate Matching Method 1 for Aperiodic CSI-RS:

The first method is a method for performing rate matching based on CSI-RS resource configuration by RRC signaling and ZP CSI-RS configuration. As described above in the above-described embodiments, as one aperiodic CSI-RS transmission method, CSI-RS subframes in the related art designated by CSI-RS resource configuration are considered as an aperiodic CSI-RS resource pool, and subframes on which aperiodic CSI-RS is to be actually transmitted are notified to the terminal through L1 signaling, such as UL grant. The first method is a method for performing the rate matching in consideration of the fact that CSI-RS subframes excluding the CSI-RS subframe allocated to the terminal itself are to be allocated to other terminals. In case of using the first method, the rate matching mechanism is simplified, but if the number of terminals is small, data transmission efficiency may be lowered more than it needs.

Rate Matching Method 2 for Aperiodic CSI-RS:

The second method is a method for performing rate matching based on CSI-RS resource configuration by RRC signaling, ZP CSI-RS configuration, aperiodic CSI-RS triggering by L1 signaling, and CSI request field. It is assumed that aperiodic CSI-RS triggering is determined by one-bit L1 signaling. If the aperiodic CSI-RS is triggered, as described above, it is possible for the terminal to analyze the aperiodic CSI-RS configuration information in accordance with Tables 3b to 3f-e.

On the other hand, even if the aperiodic CSI-RS is not triggered, the terminal can analyze the aperiodic CSI-RS configuration information in accordance with Tables 3b to 3f-e, and recognize the corresponding CSI-RS resource as the aperiodic ZP CSI-RS or aperiodic interference measurement resource (IMR). This is to aperiodically perform the rate matching in accordance with aperiodic CSI-RS transmission/non-transmission, and through this method, it is possible to notify whether the aperiodic CSI-RS for another terminal exists if there is not aperiodic CSI-RS for the corresponding terminal at present, and if it exists, what RE it exists in. According to this example, when the aperiodic CSI-RS is triggered or not, it is not necessary that the CSI request field analysis method and the aperiodic CSI field analysis method are the same. For example, when the periodic CSI-RS is triggered, Table 3b or 3f-a may be followed, and if the aperiodic CSI-RS is triggered, it is not necessary to notify of the nonexistence of the aperiodic CSI-RS, whereas if the aperiodic CSI-RS is not triggered, it may be necessary to notify other terminals in addition to the corresponding terminal of the nonexistence of the aperiodic CSI-RS.

Rate Matching Method 3 for Aperiodic CSI-RS:

The third method is a method for performing rate matching based on CSI-RS resource configuration by RRC signaling, ZP CSI-RS configuration, aperiodic CSI-RS triggering by RRC signaling, and CSI request field. It is assumed that use/non-use of a CSI request field for aperiodic CSI-RS triggering or use/non-use of an aperiodic CSI-RS field is determined by one-bit RRC signaling. Further, for convenience in explanation, it is assumed that both the CSI request field and the aperiodic CSI-RS field are signaled to the terminal. In this case, the aperiodic CSI-RS field is as described in Table 3f-e. In this case, if the CSI request field has a value that is not 00, that is, if the aperiodic CSI is triggered, the aperiodic CSI-RS field may be analyzed as aperiodic NZP CSI-RS resource information. In contrast, if the CSI request field is 00, that is, if the aperiodic CSI is not triggered, it is possible to engage that the aperiodic CSI-Rs field is analyzed as the aperiodic ZP CSI-RS resource or aperiodic IMR information. In other words, by synthetically analyzing the CSI request field and the aperiodic CSI-RS field, it becomes possible to support dynamic rate matching with respect to not only the NZP CSI-RS but also the ZP CSI-RS.

It is to be noted that the meanings of the examples in Tables 3f-a to 3f-e may be changed in accordance with the definition of an "higher layer". For example, if the higher layer means only the RRC signaling, the above-described tables mean a list of CSI-RSs by RRC signaling, whereas if the higher layer means the MAC CE signaling together, it may be engaged that the above-described tables mean CSI-RS resources activated by the MAC CE. In a similar manner, it is apparent that the meanings of the CSI-RS resources indicated by the L1 signaling may be changed. For example, if the higher layer means only the RRC signaling, the CSI-RS resources called by the L1 signaling mean the list of CSI-RSs by RRC signaling, whereas if the higher layer means the MAC CE signaling together, it may be engaged that the CSI-RS resources called by the L1 signaling mean the CSI-RS resources activated by the MAC CE.

Figure 3J:
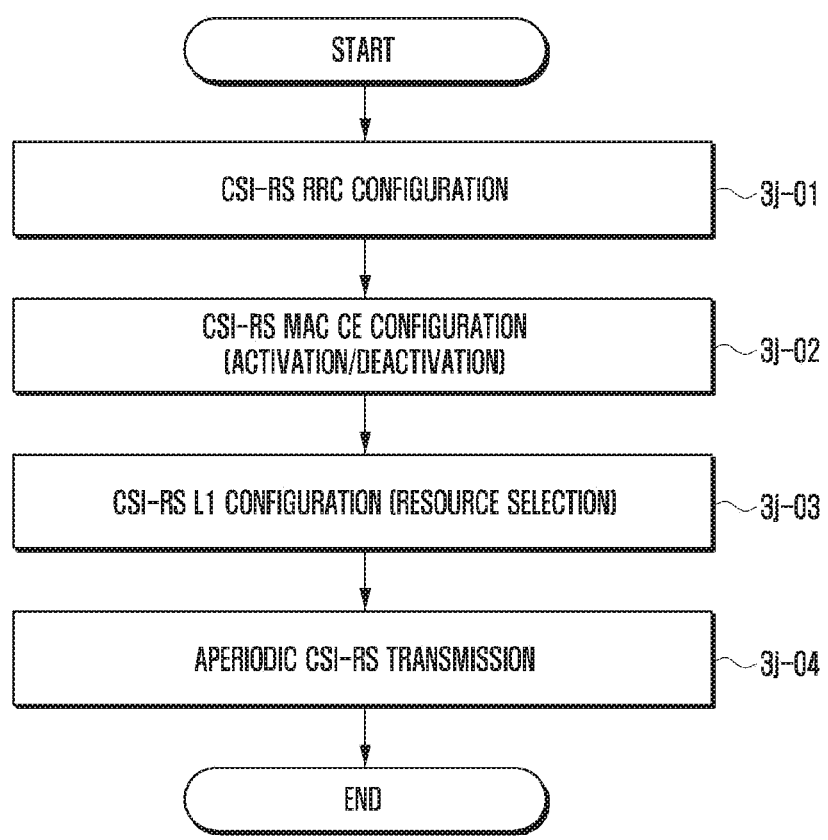
FIG. 3J is a diagram illustrating an operation of a base station in case of transmitting an aperiodic CSI-RS.

In case of transmitting the aperiodic CSI-RS according to an embodiment of the present disclosure, the operation of the base station has been described with reference to FIG. 3J. FIG. 3J is a diagram illustrating the operation of a base station in case of transmitting the aperiodic CSI-RS. Referring to FIG. 3J, the base station, at operation 3$j$-01, configures at least one aperiodic CSI-RS through RRC signaling. Thereafter, if necessary in accordance with alternatives, the base station, at operation 3$j$-02, configures resources to be activated/deactivated among RRC-configured CSI-RSs through higher layer (MAC CE) signaling. Further, at operation 3$j$-03, the base station may trigger the aperiodic CSI-RS through L1 signaling. Thereafter, at operation 3$j$-04, the base station transmits the aperiodic CSI-RS on the aperiodic CSI-RS resource notified through operations 3$j$-01, 3$j$-02, and 3$j$-03.

Figure 3K:
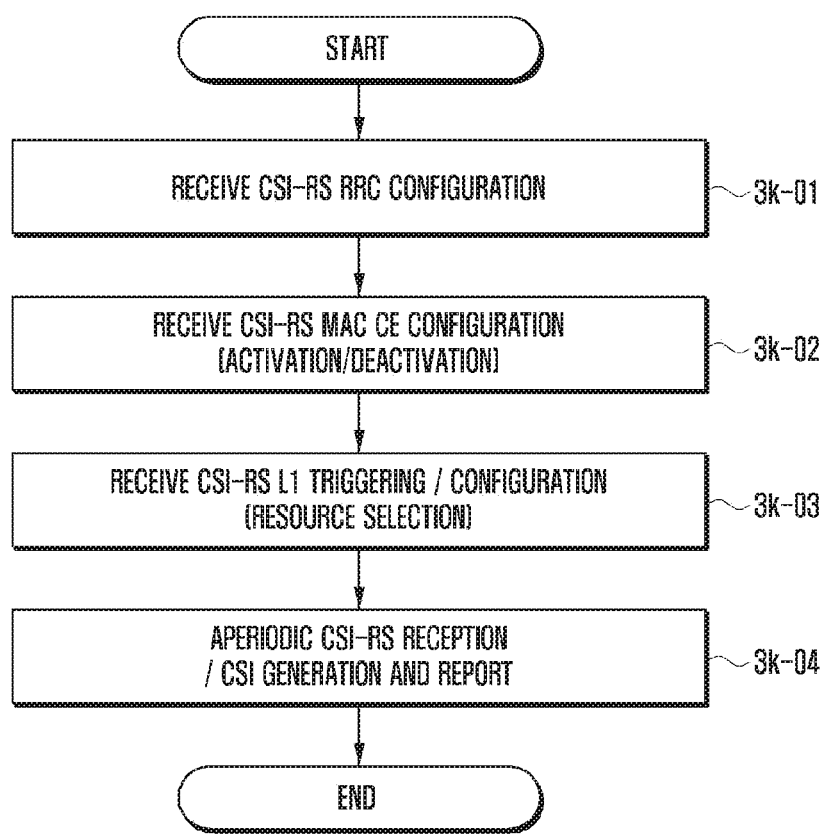
FIG. 3K is a diagram illustrating an operation of a terminal based on an aperiodic CSI-RS.

Further, the operation of the terminal based on the aperiodic CSI-RS according to an embodiment of the present disclosure is as described above with reference to FIG. 3K. FIG. 3K is a diagram illustrating the operation of a terminal based on the aperiodic CSI-RS. Referring to FIG. 3K, the terminal, at operation 3$k$-01, receives semi-static configuration information related to the aperiodic CSI-RS through higher layer (RRC) signaling. Thereafter, if necessary in accordance with alternatives, the terminal, at operation 3$k$-02, receives configuration information of resources to be activated/deactivated among RRC-configured CSI-RSs through higher layer (MAC CE) signaling. Further, at operation 3$k$-03, the terminal may receive the aperiodic CSI-RS on the corresponding CSI-RS resource based on the aperiodic CSI-RS configuration information received at operations 3$k$-01, 3$k$-02, and 3$k$-03. Thereafter, the terminal generates CSI information based on the aperiodic CSI-RS received at operation 3$k$-04, and reports this to the base station in the determined timing.

Figure 3L:
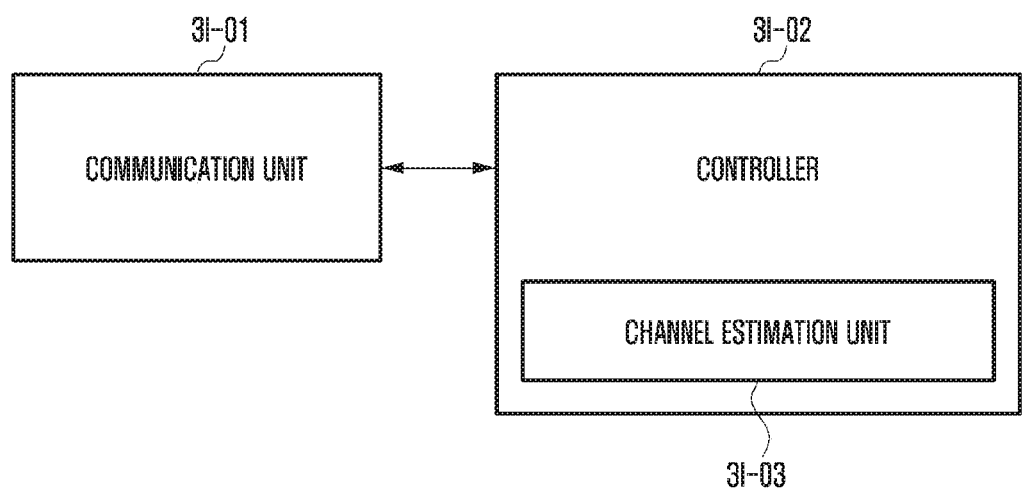
FIG. 3L is a block diagram illustrating the internal structure of a terminal according to an embodiment of the present disclosure.

FIG. 3L is a block diagram illustrating the internal structure of a terminal according to an embodiment of the present disclosure.

Referring to FIG. 3L, the terminal includes a communication unit 3$l$-01 and a controller 3$l$-02. The communication unit 3$l$-01 transmits/receives data to/from an outside (e.g., base station). Here, the communication unit 3$l$-01 may transmit feedback information to the base station under the control of the controller 3$l$-02.

The controller 3*l*-02 controls the states and operations of all constituent elements configuring the terminal.

Specifically, the controller 3*l*-02 generates the feedback information in accordance with information allocated from the base station. Further, the controller 3*l*-02 controls the communication unit 3*l*-01 to perform feedback of the generated channel information to the base station in accordance with timing information allocated from the base station. For this, the controller 3*l*-02 may include a channel estimation unit 3*l*-03.

The channel estimation unit 3*l*-03 determines necessary feedback information through CSI-RS and feedback allocation information received from the base station, and estimates a channel using the received CSI-RS based on the feedback information.

Although FIG. 3L shows an example in which the terminal is composed of the communication unit 3*l*-01 and the controller 3*l*-02, the terminal according to the present disclosure is not limited thereto, but may be further provided with various configurations in accordance with the functions performed by the terminal. For example, the terminal may further include a display unit displaying the current state of the terminal, an input unit receiving an input of a signal for function performing from a user, and a storage unit storing data generated by the terminal.

Further, it is illustrated that the channel estimation unit 3*l*-03 is included in the controller 3*l*-02, but is not limited thereto. The controller 3*l*-02 may control the communication unit 3*l*-01 to receive from the base station configuration information of at least one reference signal. Further, the controller 3*l*-02 may measure the at least one reference signal, and may control the communication unit 3*l*-01 to receive from the base station the feedback configuration information for generating the feedback information in accordance with the result of the measurement.

Further, the controller 3*l*-02 may measure at least one reference signal received through the communication unit 3*l*-01, and may generate the feedback information in accordance with the feedback configuration information. Further, the controller 3*l*-02 may control the communication unit 3*l*-01 to transmit the generated feedback information to the base station in the feedback timing in accordance with the feedback configuration information.

Further, the controller 3*l*-02 may receive a CSI-RS that is periodically or aperiodically transmitted from the base station, generate the feedback information based on the received CSI-RS, and transmit the generated feedback information to the base station. In this case, the controller 3*l*-02 may select precoding matrices with reference to the relationship between antenna port groups of the base station.

Further, the controller 3*l*-02 may receive the CSI-RS that is periodically or aperiodically transmitted from the base station, generate the feedback information based on the received CSI-RS, and transmit the generated feedback information to the base station. In this case, the controller 3*l*-02 may select one precoding matrix with reference to all antenna port groups of the base station.

Further, the controller 3*l*-02 may receive the feedback configuration information from the base station, receive the CSI-RS that is periodically or aperiodically transmitted from the base station, generate the feedback information based on the received feedback configuration information and CSI-RS, and transmit the generated feedback information to the base station.

Figure 3M:
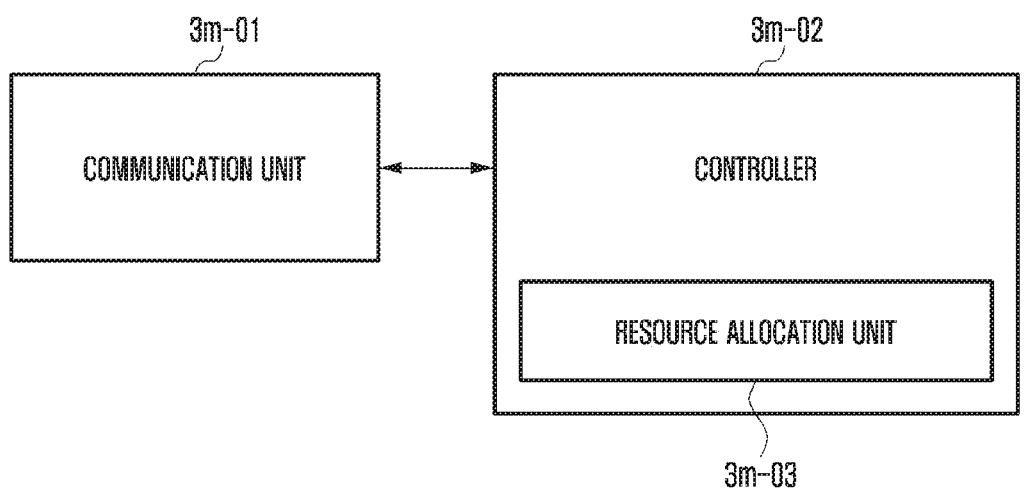
FIG. 3M is a block diagram illustrating the internal structure of a base station according to an embodiment of the present disclosure.

FIG. 3M is a block diagram illustrating the internal structure of a base station according to an embodiment of the present disclosure.

Referring to FIG. 3M, the base station includes a controller 3*m*-02 and a communication unit 3*m*-01.

The controller 3*m*-02 controls the states and operations of all configurations constituting the base station. Specifically, the controller 3*m*-02 allocates a CSI-RS resource for channel estimation of a terminal to the terminal, and allocates a feedback resource and feedback timing to the terminal For this, the controller 3*m*-02 may further include a resource allocation unit 3*m*-03. Further, the controller allocates feedback configuration and feedback timing to prevent feedbacks from several terminals from colliding, and receives and analyzes the feedback information configured in the corresponding feedback timing.

The communication unit 3*m*-01 transmits/receives data, a reference signal, and feedback information to/from the terminal. Here, the communication unit 3*m*-01 transmits the CSI-RS to the terminal through the allocated resource under the control of the controller 3*m*-02, and receive the feedback for the channel information from the terminal.

As described above, it is illustrated that the resource allocation unit 3*m*-03 is included in the controller 3*m*-02, but is not limited thereto.

The controller 3*m*-02 may control the communication unit 3*m*-01 to transmit to the terminal configuration information of at least one reference signal, or generate the at least one reference signal. Further, the controller 3*m*-02 may control the communication unit 3*m*-01 to transmit to the terminal the feedback configuration information for generating the feedback information in accordance with the result of the measurement.

Further, the controller 3*m*-02 may control the communication unit 3*m*-01 to transmit the at least one reference signal to the terminal, and to receive the feedback information transmitted from the terminal in the feedback timing in accordance with the feedback configuration information.

Further, the controller 3*m*-02 may transmit the feedback configuration information to the terminal, transmit the periodic or aperiodic CSI-RS to the terminal, and receive from the terminal the feedback information generated based on the feedback configuration information and the CSI-RS. In this case, the controller 3*m*-02 may transmit the feedback configuration information corresponding to the respective antenna port groups of the base station and additional feedback configuration information based on the relationship between the antenna port groups. Further, the controller 3*m*-02 may periodically or aperiodically transmit the CSI-RS beamformed based on the feedback information to the terminal, and may receive the feedback information generated based on the CSI-RS from the terminal.

Third Embodiment

A wireless communication system was initially developed for the purpose of providing a voice-oriented service, but has been developed to a broadband wireless communication system that provides a high-speed and high-quality packet data service like communication standards, for example, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e.

In an LTE system that is a representative example of the broadband wireless communication systems, a downlink (DL) adopts an orthogonal frequency division multiplexing (OFDM) scheme, and an uplink (UL) adopts a single carrier frequency division multiple access (SC-FDMA) scheme.

The uplink means a radio link in which a terminal (or user equipment (UE)) or a mobile station (MS) transmits data or a control signal to a base station (BS) (or eNode B), and the downlink means a radio link in which the base station transmits data or a control signal to the terminal.

According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARQ) scheme in which a physical layer retransmits the corresponding data if decoding failure occurs during initial transmission. According to the HARQ scheme, a receiver may transmit information (negative acknowledgement (NACK)) for notifying a transmitter of the decoding failure if the receiver is unable to accurately decode the data, and the transmitter may make the physical layer retransmit the corresponding data.

The receiver may aggregate the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

Figure 4A:
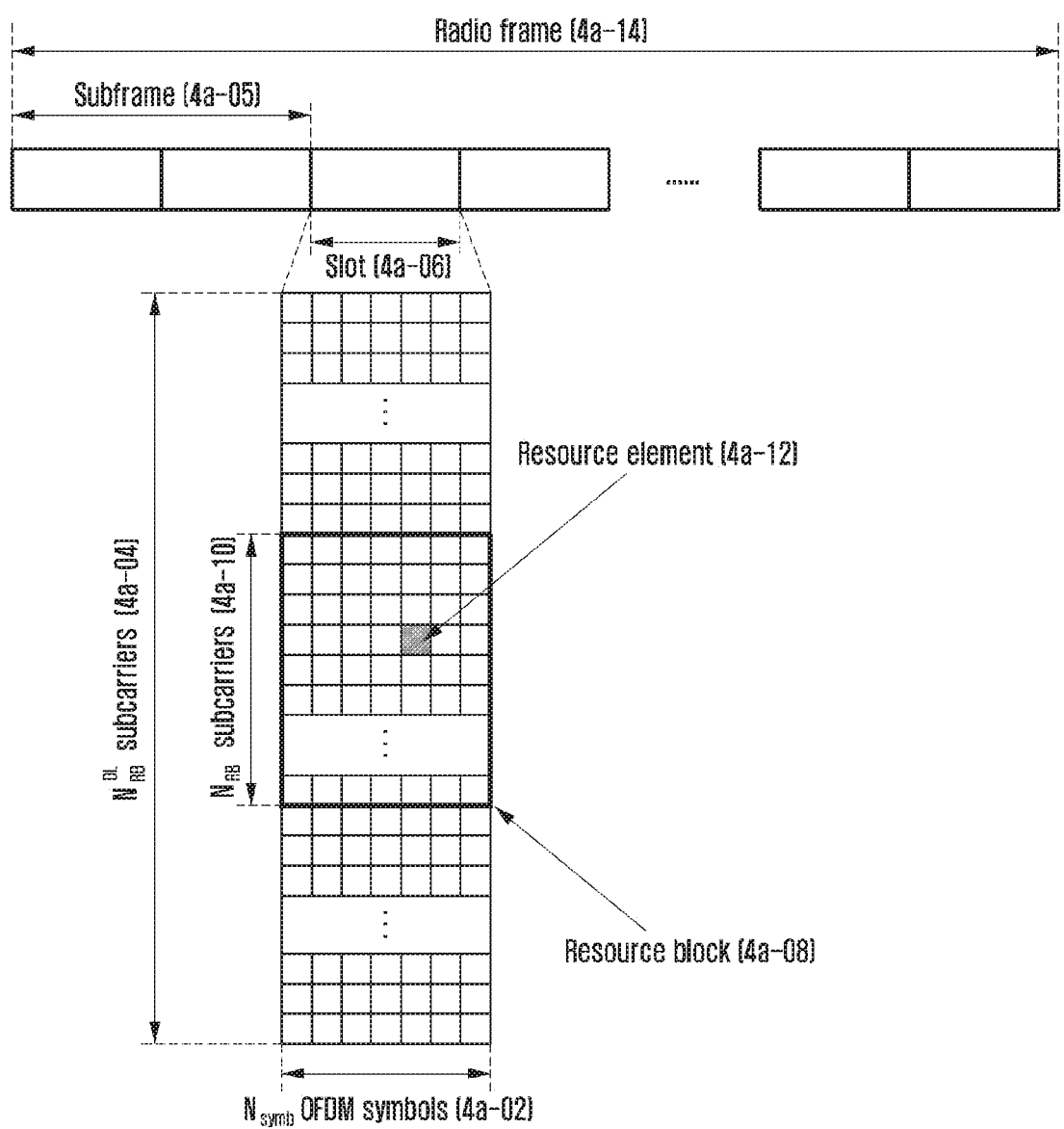
FIG. 4A is a diagram illustrating a basic structure of time-frequency domain that is a radio resource region in which data or a control channel is transmitted on a downlink in an LTE system.

FIG. 4A is a diagram illustrating the basic structure of a time-frequency domain that is a radio resource region on which a downlink transmits the data or control channel in an LTE system.

Referring to FIG. 4A, a horizontal axis represents a time domain, and a vertical axis represents a frequency domain. In the time domain, the minimum transmission unit is an OFDM symbol, and $N_{symb}$ OFDM symbols 4a-02 constitute one slot 4a-06, and two slots constitute one subframe 4a-05. The length of the slot is 0.5 ms, and the length of the subframe is 1.0 ms. Further, a radio frame 4a-14 is a time domain region that is composed of 10 subframes. In the frequency domain, the minimum transmission unit is a subcarrier, and the transmission bandwidth of the whole system is composed of $N_{BW}$ subcarriers 4a-04 in total.

In the time-frequency domain, the basic unit of resources is a resource element (RE) 4a-12 that may be expressed by an OFDM symbol index and a subcarrier index. A resource block (RB) (or physical resource block (PRB)) 4a-08 may be defined by $N_{symb}$ successive OFDM symbols 4a-02 in the time domain and $N_{RB}$ successive subcarriers 4a-10 in the frequency domain.

Accordingly, one RB 4a-08 is composed of $N_{symb} \times N_{RB}$ REs 4a-12. In general, the minimum transmission unit of data is the RB unit. In the LTE system, it is general that $N_{symb}$ is 7 and $N_{RB}$ is 12, and $N_{BW}$ and $N_{RB}$ are in proportion to the bandwidth of the system transmission band. Further, the data rate is increased in proportion to the number of RBs scheduled to the terminal.

The LTE system defines and operates 6 transmission bandwidths. In case of an FDD system that operates to discriminate a downlink and an uplink by means of frequency, the downlink transmission bandwidth and the uplink transmission bandwidth may differ from each other.

The channel bandwidth represents an RF bandwidth corresponding to the system transmission bandwidth. Table 4a below represents the corresponding relationship between the system transmission bandwidth defined in the LTE system and the channel bandwidth. For example, the LTE system having the channel bandwidth of 100 MHz may have the transmission bandwidth composed of 50 RBs.

TABLE 4a

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of the control information to be transmitted to the current subframe, the N value is varied for each subframe. The control information includes a control channel transmission interval indicator indicating how many OFDM symbols the control information is transmitted through, scheduling information on downlink data or uplink data, and HARQ ACK/NACK signals.

In the LTE system, the scheduling information on the downlink data or the uplink data is transferred from the base station to the terminal through downlink control information (DCI). The DCI defines various formats. That is, the DCI operates by applying the DCI format determined depending on whether the DCI is scheduling information on the uplink data (UL grant) or scheduling information on the downlink data (DL grant), whether the DCI is a compact DCI having a small size of the control information, whether spatial multiplexing using multiple antennas is applied, and whether the DCI is a DCI for power control.

For example, DCI format 1 that is the scheduling control information on the downlink data (DL grant) is configured to include at least the following control information.

Resource allocation type 0/1 flag: This notifies whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This notifies of an RB allocated for data transmission. An expressed resource is determined in accordance with the system bandwidth and the resource allocation scheme.

Modulation and coding scheme (MCS): This notifies of a modulation scheme used for data transmission and the size of a transport block that is data to be transmitted.

HARQ process number: This notifies of a process number of HARQ.

New data indicator: This notifies of HARQ initial transmission or retransmission.

Redundancy version: This notifies of a redundancy version of HARQ.

Transmission power control (TPC) command for a physical uplink control channel (PUCCH): This notifies of a transmission power control command for PUCCH that is an uplink control channel.

The DCI passes through a channel coding and modulation process, and is transmitted on a physical downlink control channel (PUCCH) that is a downlink physical control channel (or control information, hereinafter, it will be mixedly used) or on an enhanced PDCCH (EPDCCH) (or enhanced control information, hereinafter, it will be mixedly used).

In general, the DCI is scrambled with a specific radio network temporary identifier (RNTI) (or terminal identifier), independently with respect to each terminal, is added with a cyclic redundancy check (CRC), is channel-coded, and then is configured as an independent PDCCH to be transmitted. In the time domain, the PDCCH is mapped and transmitted during the control channel transmission interval. The frequency domain mapping location of the PDCCH is determined by an Identifier (ID) of each terminal, and is spread to the whole system transmission band.

The downlink data is transmitted on a physical downlink shared channel (PDSCH) that is a physical channel for downlink data transmission. The PDSCH is transmitted after the control channel transmission interval, and scheduling information, such as a detailed mapping location in the frequency domain and the modulation scheme, is notified by the DCI transmitted through the PDCCH.

Through an MCS composed of 5 bits among the control information that constitutes the DCI, the base station reports to the terminal the modulation scheme applied to the PDSCH to be transmitted and the transport block size (TBS) of the data to be transmitted. The TBS corresponds to the size before channel coding for error correction is applied to the data (transport block (TB)) intended to be transmitted by the base station.

The modulation scheme supported by the LTE system may be quadrature phase shift keying (QPSK), 16 quadrature amplitude modulation (16QAM), and 64QAM, and respective modulation orders (Qm) respectively correspond to 2, 4, and 6. That is, in case of QPSK modulation, 2 bits per symbol may be transmitted, and in case of 16QAM, 4 bits per symbol may be transmitted. Further, in case of 64QAM, 6 bits per symbol may be transmitted.

Figure 4B:
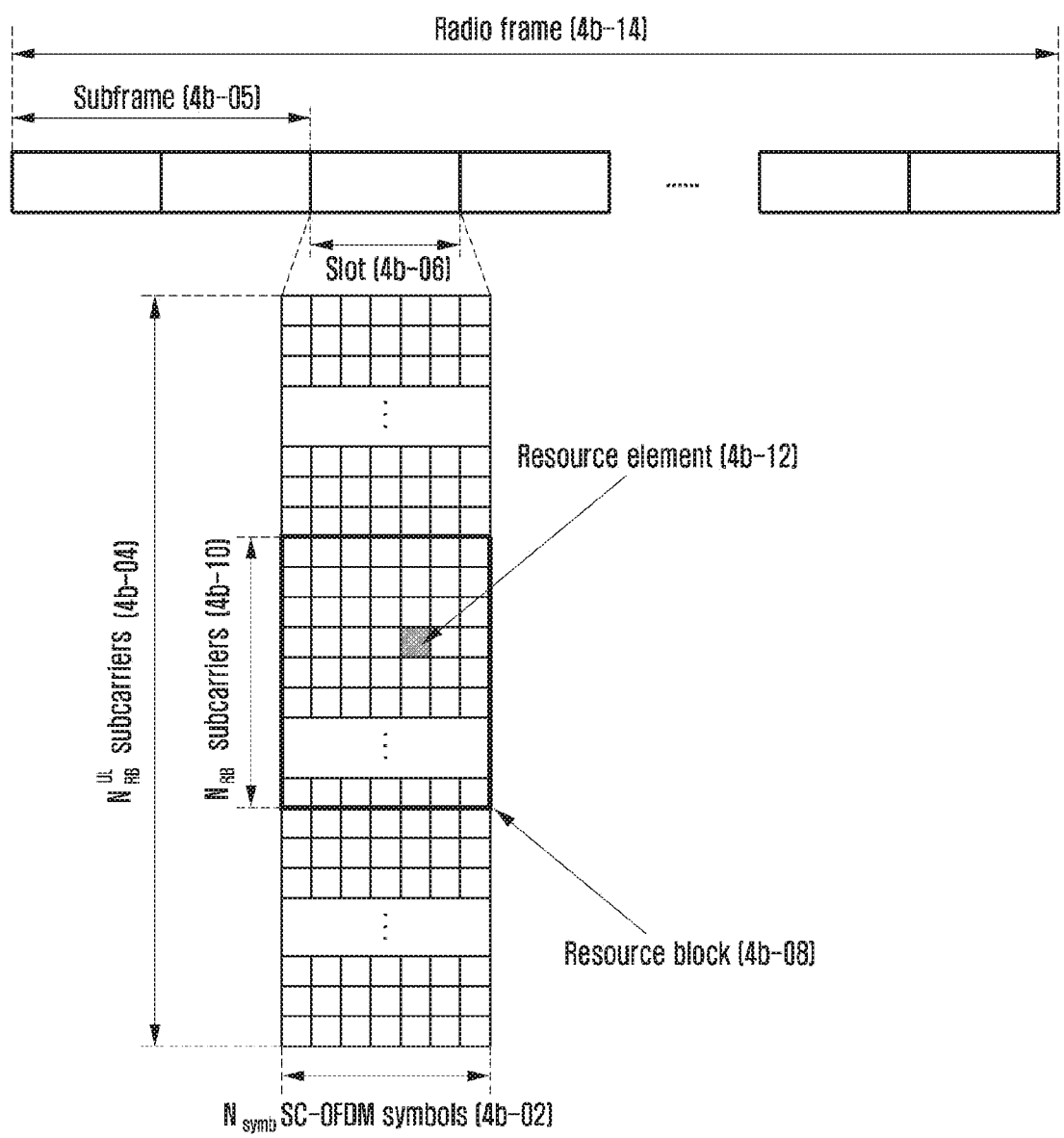
FIG. 4B is a diagram illustrating a basic structure of time-frequency domain that is a radio resource region in which data or a control channel is transmitted on an uplink in an LTE-A system in the related art.

FIG. 4B is a diagram illustrating the basic structure of a time-frequency domain that is a radio resource region in which an uplink transmits data or a control channel in an LTE-A system.

Referring to FIG. 4B, a horizontal axis represents a time domain, and a vertical axis represents a frequency domain. In the time domain, the minimum transmission unit is an SC-FDMA symbol 4b-02, and NsymbUL-numbered SC-FDMA symbols constitute one slot 4b-06. Further, two slots constitute one subframe 4b-05. In the frequency domain, the minimum transmission unit is a subcarrier, and the transmission bandwidth 4b-04 of the whole system is composed of NBW subcarriers in total. NBW may have a value that is in proportion to the system transmission bandwidth.

In the time-frequency domain, the basic unit of resources is a resource element (RE) 4b-12 that may be defined as an SC-FDMA symbol index and a subcarrier index. A resource block pair (RB pair) 4b-08 is defined as NsymbUL-numbered successive SC-FDMA symbols in the time domain and NscRB-numbered successive subcarriers in the frequency domain. Accordingly, one RB is composed of (NsymbUL× NscRB)-numbered REs. In general, the minimum transmission unit of data or control information is an RB unit. The PUCCH is mapped to the frequency domain corresponding to 1 RB, and is transmitted for one subframe.

In the LTE system, the timing relationship is defined between PDSCH that is a physical channel for downlink data transmission and PUCCH or PUSCH that is an uplink physical channel in which HARQ ACK/NACK corresponding to PDCCH/EPDDCH that includes a semi-persistent scheduling release (SPS release) is transmitted. As an example, in the LTE system that operates as a frequency division duplex (FDD), the PDSCH transmitted in the (n−4)-th subframe or the HARQ ACK/NACK corresponding to the PDCCH/EPDCCH that includes the SPS release is transmitted to the PUCCH or PUSCH in the n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data transmitted by the base station, the base station freely determines the transmission time of the retransmission data through a scheduling operation. The terminal performs buffering of data that is determined as an error as the result of decoding the received data for the HARQ operation, and then performs combining of the error data with next retransmission data.

In the LTE system, unlike the downlink HARQ, the uplink HARQ adopts a synchronous HARQ scheme in which the data transmission time is fixed. That is, the uplink/downlink timing relationship between a physical uplink shared channel (PUSCH) that is a physical channel for uplink data transmission, a PDCCH that is a preceding downlink control channel, and a physical hybrid indicator channel (PHICH) that is a physical channel in which a downlink HARQ ACK/NACK corresponding to the PUSCH is transmitted is fixed by the following rule.

If the terminal receives a PDCCH including uplink scheduling control information transmitted from the base station in subframe n or a PHICH in which the downlink HARQ ACK/NACK is transmitted, the terminal transmits uplink data corresponding to the control information through the PUSCH in subframe n+k. In this case, "k" is differently defined in accordance with the FDD or time division duplex (TDD) of the LTE system and the configuration thereof. As an example, in case of an FDD LTE system, "k" is fixed to 4.

Further, if the terminal receives a PHICH that carries downlink HARQ ACK/NACK from the base station in subframe i, the PHICH corresponds to the PUSCH that is transmitted by the terminal in subframe i-k. In this case, "k" is differently defined in accordance with the FDD or time division duplex (TDD) of the LTE system and the configuration thereof. As an example, in case of an FDD LTE system, "k" is fixed to "4".

One of important performance bases of a wireless cellular communication system is packet data latency. For this, in the LTE system, signal transmission/reception is performed in the unit of a subframe having a transmission time interval (TTI) of 1 ms. The LTE system operating as described above may support a terminal (shortened-TTI/shorter-TTI UE) having a transmission time interval (TTI) that is shorter than 1 ms. It is expected that the shortened-TTI UE is suitable to a voice over LTE (VoLTE) service in which the latency is important or a service such as remote control. Further, the shortened-TTI UE is expected as means for realizing cellular-based mission-critical Internet of things (IoT).

In the current LTE/LTE-A system, the base station and the terminal are designed to perform transmission/reception in the unit of a subframe having the transmission time interval of 1 ms. In an environment in which the base station and the terminal operating at the transmission time interval of 1 ms exist, it is necessary to define transmission/reception operations that are discriminated from those of a general LTE/LTE-A terminal in order to support the shortened-TTI terminal operating at the transmission time interval that is shorter than 1 ms. Accordingly, the present disclosure proposes a detailed method for operating a general LTE/LTE-A terminal and a shortened-TTI terminal together in the same system.

Downlink resource allocation types for an LTE/LTE-A terminal in the related art include type 0, type 1, and type 2. Type 0 is a method for defining a resource block group (RBG) and transferring a bitmap for indicating the RBG allocated to the terminal. The RBG is a set of successive virtual resource blocks (VRBs), and the VRB at type 0 is defined in a localized manner and may be used as the same meaning as a physical resource block (PRB).

The size of the RBG used at type 0 corresponds to the number of RBs included in one RBG, and is defined as in Table 4b below.

TABLE 4b

| System Bandwidth | RBG Size (P) |
|---|---|
| ≤10 | 1 |
| 11-26 | 2 |
| 27-63 | 3 |
| 64-110 | 4 |

The downlink resource allocation type 1 defines P RBG subsets, notifies the terminal of one of the RBG subsets, and notifies the VRB allocated to the terminal in one RBG subset through a bitmap. The one RBG is composed of P successive VRBs. If p value is given as $0 \leq p < P$, the p-th RBG subset includes every P-th RBG from the p-th RBG. At type 1, the VRB is defined in a localized manner, and this may be used as the same meaning as the PRB.

Further, another 1 bit is used for the purpose of notifying of bitmap-shifting resource allocation so that the bit map can indicates the last VRB in the RBG subset. In order to notify the terminal of the RBG subset, $\lceil \log_2(P) \rceil$ bits are used, and one bit is used to indicate the shift. Further, the number of bits for the bitmap is defined as $N_{RB}^{TYPE\ 1} = \lceil N_{RB}^{DL}/P \rceil - \lceil \log_2(P) \rceil - 1$.

The downlink resource allocation type 2 notifies of a start location $RB_{start}$ of the allocated VRB in allocating the successive VRBs and a resource indication value (RIV) indicating information of the number $L_{CRBs}$ of VRBs. In case of $(L_{CRBs}-1) \leq \lfloor N_{RB}^{DL}/2 \rfloor$, the RIV value is defined as $RIV = N_{RB}^{DL}(L_{CRBs}-1) + RB_{start}$, and in other cases, the RIV value is defined as $RIV = N_{RB}^{DL}(N_{RB}^{DL} - L_{CRBs} + 1) + (N_{RB}^{DL} - 1 - RB_{start})$.

Uplink resource allocation types for LTE/LTE-A terminal in the related art include type 0 and type 1. The uplink resource allocation type 0 notifies of a start location $RB_{start}$ of the allocated VRB in allocating the successive VRBs and a resource indication value (RIV) indicating information of the number $L_{CRBs}$ of allocated VRBs. In case of $(L_{CRBs}-1) \leq \lfloor N_{RB}^{UL}/2 \rfloor$, the RIV value is defined as $RIV = N_{RB}^{UL}(L_{CRBs}-1) + RB_{start}$, and in other cases, the RIV value is defined as $RIV = N_{RB}^{UL}(N_{RB}^{UL} - L_{CRBs} + 1) + (N_{RB}^{UL} - 1 - RB_{start})$.

The uplink resource allocation type 1 notifies the terminal of information on two sets of resource blocks, and each set is composed of one or more RBGs. Further, the size of the RBG is P, and P is defined as in Table 4b. The number of bits used for resource allocation is determined as $$\left\lceil \log_2\left(\binom{\lceil N_{RB}^{UL}/P \rceil + 1}{4}\right) \right\rceil$$

bits. Here, information r transferred for the resource allocation is determined as $$r = \sum_{i=0}^{M-1} \binom{N - s_i}{M - i},$$

and M and N are respectively defined as M=4 and $N = \lceil N_{RB}^{UL}/P \rceil + 1$. The terms $s_0$ and $s_1-1$ are start and last RBG indexes of the first resource block allocated to the terminal, and $s_2$ and $s_3-1$ are start and last RBG indexes of the first resource block allocated to the terminal.

Hereinafter, exemplary embodiments of the present disclosure will be described in detail with reference to the accompanying drawings. In describing the present disclosure, a detailed description of related functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined on the basis of the contents of the whole description of the present disclosure. Hereinafter, the base station is the subject that performs resource allocation to the terminal, and may be at least one of an eNode B, Node B, base station (BS), radio connection unit, base station controller, and node on a network. The terminal may include user equipment (UE), mobile station (MS), cellular phone, smart phone, computer, or a multimedia system that can perform a communication function.

In the present disclosure, a downlink (DL) is a radio transmission path of a signal that is transmitted from the base station to the terminal, and an uplink (UL) means a radio transmission path of a signal that is transmitted from the terminal to the base station. Hereinafter, although an embodiment of the present disclosure is described in a state where an LTE or LTE-A system is exemplified, it is also possible to apply the embodiment of the present disclosure even to other communication systems having similar technical backgrounds or channel types.

For example, the 5th generation mobile communication technology (5G) that are developed after LTE-A may be included therein. Further, the embodiment of the present disclosure may also be applied to other communication systems through partial modifications thereof in a range that does not greatly deviate from the scope of the present disclosure through the judgment of those skilled in the art.

Hereinafter, a shortened-TTI terminal may be called a first type terminal, and a normal-TTI terminal may be called a second type terminal. The first type terminal may include a terminal that can transmit control information, data, or control information and data at a transmission time interval of 1 ms or shorter than 1 ms, and the second type terminal may include a terminal that can transmit control information, data, or control information and data at a transmission time interval of 1 ms.

Hereinafter, the shortened-TTI terminal and the first type terminal are mixedly used, and the normal-TTI terminal and the second type terminal are mixedly used. Further, in the present disclosure, shortened-TTI, shorter-TTI, shortened TTI, shorter TTI, short TTI, and sTTI have the same meaning, and are mixedly used. Further, in the present disclosure, normal-TTI, normal TTI, subframe TTI, and legacy TTI have the same meaning, and are mixedly used.

Hereinafter, a shortened-TTI transmission may be called a first type transmission, and a normal-TTI transmission may be called a second type transmission. The first type transmission is a type in which a control signal, a data signal, or control and data signals are transmitted at an interval that is shorter than 1 ms, and the second type transmission is a type in which a control signal, a data signal, or control and data signals are transmitted at an interval that is shorter than 1 ms.

On the other hand, hereinafter, the shortened-TTI transmission and the first type transmission are mixedly used, and the normal-TTI transmission and the second type transmission are mixedly used. The first type terminal may support the first type transmission and the second type transmission in all, or may support only the first type transmission. The second type terminal supports the second type transmission, but is unable to perform the first type transmission. However, for convenience in the present disclosure, "for the first type terminal" may be analyzed for the first type transmission.

In the present disclosure, the transmission time interval in the downlink means a unit in which the control signal and the data signal are transmitted, or a unit in which the data signal is transmitted. For example, the transmission time interval in the downlink of the existing LTE system becomes a subframe that is a time unit of 1 ms.

On the other hand, the transmission time interval in the uplink means a unit in which the control signal or the data signal is sent, or a unit in which the data signal is transmitted. The transmission time interval in the uplink of the existing LTE system becomes a subframe that is the same time unit of 1 ms as that in the downlink.

Further, in the present disclosure, a shortened-TTI mode corresponds to a case where the terminal or the base station transmits or receives the control signal or the data signal in the unit of a shortened TTI, and a normal-TTI mode corresponds to a case where the terminal or the base station transmits or receives the control signal or the data signal in the unit of a subframe. In the present disclosure, the length of the shortened TTI may be smaller than 1 ms. For example, the shortened TTI length may be 2 OFDM symbols or 7 OFDM symbols.

Further, in the present disclosure, shortened-TTI data means data that is transmitted or received on the PDSCH or PUSCH in the unit of a shortened TTI, and normal-TTI data means data that is transmitted or received on the PDSCH or PUSCH in the unit of a subframe. In the present disclosure, a shortened-TTI control signal means a control signal for a shortened-TTI mode operation, and is called sPDCCH. A normal-TTI control signal means a control signal for a normal-TTI mode operation. As an example, the normal-TTI control signal may be PCFICH, PHICH, EPDCCH, or PUCCH in the existing LTE system.

In the present disclosure, the terms "physical channel" and "signal" in the LTE or LTE-A system in the related art may be mixedly used with data or a control signal. For example, although PDSCH is a physical channel on which the normal-TTI data is transmitted, it may be normal-TTI data in the present disclosure. Further, although the sPDSCH is a physical channel on which the shortened-TTI data is transmitted, it may be shortened-TTI data in the present disclosure. Similarly, in the present disclosure, the shortened-TTI data transmitted in the downlink and the uplink may be called sPDSCH and sPUSCH.

According to the present disclosure as described above, the shortened-TTI terminal and base station transmission/reception operations are defined, and a detailed method for operating the existing terminal and the shortened-TTI terminal together in the same system is proposed.

In the present disclosure, a normal-TTI terminal indicates a terminal that transmits and receives control information and data information in the unit of 1 ms or a subframe. The control information for the normal-TTI terminal is transmitted to be carried on PDCCH mapped to maximally 3 OFDM symbols in one subframe, or is transmitted to be carried on PDCCH mapped to a specific resource block on the whole subframe.

The shortened-TTI terminal indicates a terminal that may transmit and receive control information and data information in the unit of a subframe in the same manner as the normal-TTI terminal or in the unit smaller than a subframe. Further, the shortened-TTI terminal may be a terminal supporting only transmission and reception in the unit smaller than the subframe.

In the present disclosure, a downlink control signal for shortened-TTI may be called sPDCCH, and may be mixedly used with PDCCH for shortened-TTI. In the present disclosure, the downlink data signal for shortened-TTI may be called sPDSCH, and may be mixedly used with PDSCH for shortened-TTI.

Further, in the present disclosure, an uplink data signal for shortened-TTI may be called sPUSCH, and may be mixedly used with PUSCH for shortened-TTI. Further, in the present disclosure, an uplink control signal for shortened-TTI may be called sPUCCH, and may be mixedly used with PUCCH for shortened-TTI. Although a transmission/reception method for a system using a shortened TTI according to the present disclosure has been described, it will be apparent to those having a normal wireless communication knowledge that the present disclosure can also be applied to a transmission/reception method for performing uplink transmission or downlink HARQ feedback transmission in a shorter time than the time of the LTE in the related art.

(3-1)-Th Embodiment

The (3-1)-th embodiment provides a method for configuring downlink resource allocation information in downlink resource allocation type 0 for a first type terminal, and will be described with reference to FIG. 4C. In this embodiment, operations of a base station and a terminal using the method for configuring resource allocation information can be provided in the (3-4)-th embodiment.

The resource allocation type 0 for the first type terminal defines a resource block group (RBG), and transfers a bitmap for indicating the RBG allocated to the terminal. The RBG is a set of successive virtual resource blocks (VRBs), and the VRB in type 0 may be defined in a localized manner, and may be used as the same meaning as a physical resource block (PRB). The size of RBG used in the resource allocation type 0 for the first type terminal corresponds to the number of RBs included in one RBG, and may be defined as in Table 4c.

TABLE 4c

| System Bandwidth | RBG Size (P) |
|---|---|
| ≤10 | 2 |
| 11-26 | 4 |

TABLE 4c-continued

| System Bandwidth | RBG Size (P) |
| --- | --- |
| 27-63 | 6 |
| 64-110 | 8 |

Using P defined in Table 4c as above, VRBs are tied in the unit of P, and P VRBs constitute each RBG, and RBG numbers are given in order from a low frequency region. The total number of RBGs is $N_{RBG}=\lceil N_{RB}^{DL}/P \rceil$, and thus $N_{RBG}=\lceil N_{RB}^{DL}/P \rceil$ bits indicate whether RBGs have been allocated to a specific first type terminal in the form of a bitmap. In this case, allocation/non-allocation of RBG 0 to $N_{RBG}-1$ are mapped to the most significant bit (MSB) to the least significant bit (LSB) of the bitmap in order. If a specific bit of the bitmap is 1, it may be analyzed that the corresponding RBG is allocated to the first type terminal.

The RBG size P may be determined by a changed value in accordance with the TTI length. For example, if 7 OFDM symbol unit is TTI, resource allocation type 0 may be configured using P defined in Table 4c, and if 1, 2, or 3/4 OFDM symbol unit is TTI, resource allocation type 0 may be configured using P defined in Table 4d.

TABLE 4d

| System Bandwidth | RBG Size (P) for 1-symbol TTI | RBG Size (P) for 2-symbol TTI | RBG Size (P) for 3/4-symbol TTI |
| --- | --- | --- | --- |
| ≤10 | 6 | 6 | 3 |
| 11-26 | 6 | 6 | 6 |
| 27-63 | 12 | 12 | 9 |
| 64-110 | 12 | 12 | 12 |

The P value defined in Table 4d may be defined and used as in Table 4e or as another value, and it is significant that the P value is larger than the P defined in Table 4b in the LTE/LTE-A system in the related art.

TABLE 4e

| System Bandwidth | RBG Size (P) for 1-symbol TTI | RBG Size (P) for 2-symbol TTI | RBG Size (P) for 3/4-symbol TTI |
| --- | --- | --- | --- |
| ≤10 | 5 | 4 | 2 |
| 11-26 | 8 | 8 | 4 |
| 27-63 | 12 | 12 | 6 |
| 64-110 | 24 | 16 | 8 |

The resource allocation type 0 of the shortened TTI transmission using Tables 4c, 4d, and 4e as described above can reduce the number of bits for resource allocation as compared with the method in the related art.

Figure 4C:
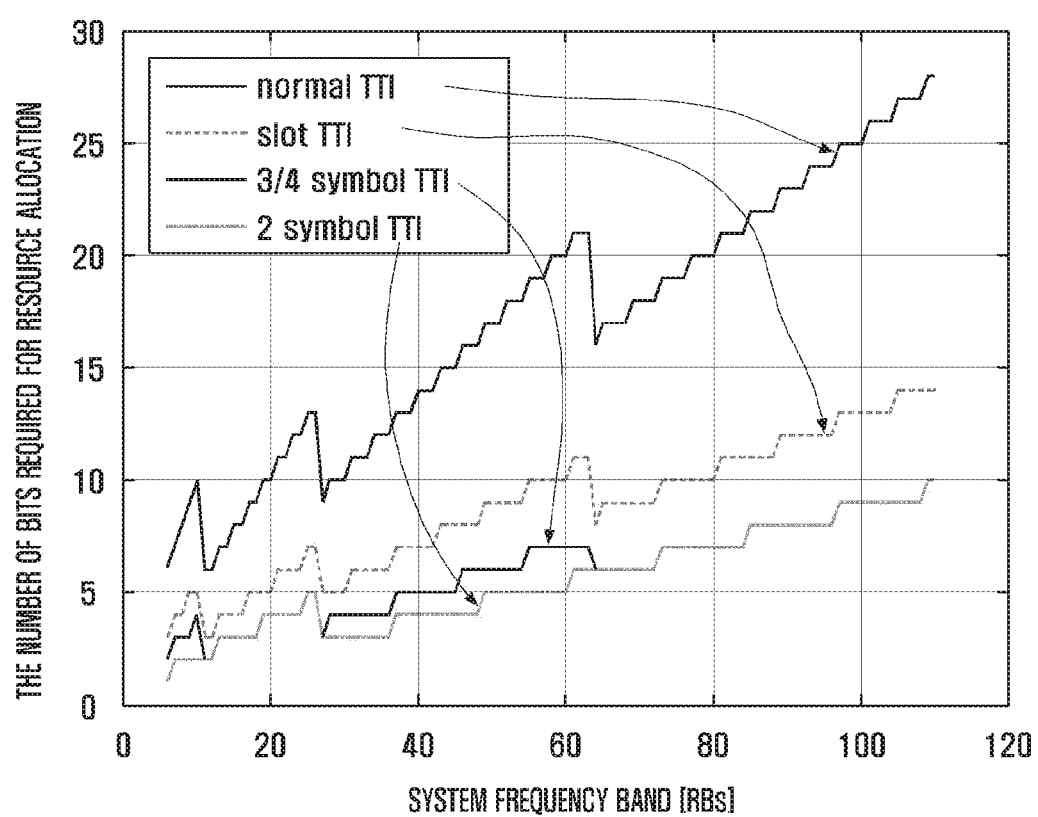
FIG. 4C is a diagram explaining a method in which downlink resource allocation information is configured at downlink resource allocation type 0 for a first type terminal.

FIG. 4C is a diagram illustrating the number of bits required for resource allocation in accordance with the system frequency band at a normal TTI using Table 4b, a slot TTI (7-symbol TTI) using Table 4c, 3/4-symbol TTI using Table 4d, and 2-symbol TTI. As shown in FIG. 4C, if the frequency band corresponds to 100 RBs, it can be seen that the number of bits required for resource allocation at the slot TTI using Table 4c is smaller than that at the normal TTI using Table 4b.

The number of bits required for resource allocation type 0 according to this embodiment become equal to the number of bits required for resource allocation type 1 in the (3-2)-th embodiment. Accordingly, the base station should include one bit for notifying the terminal whether the resource allocation type is 0 or 1 in the downlink control information. In view of the corresponding bit in the downlink control information, the terminal can determine that resource allocation type 0 has been used if the corresponding bit is 0, whereas it can determine that resource allocation type 1 has been used if the corresponding bit is 1.

(3-2)-Th Embodiment

The (3-2)-th embodiment provides a method for configuring downlink resource allocation information in downlink resource allocation type 1 for a first type terminal. In this embodiment, operations of a base station and a terminal using the method for configuring resource allocation information can be provided in the (3-4)-th embodiment.

The downlink resource allocation type 1 for the first type terminal defines P RBG subsets, notifies the terminal of one of the RBG subsets, and notifies a VRB allocated to the terminal in one RBG subset through a bitmap. The one RBG is composed of P successive VRBs. If p value is given as 0≤p<P, the p-th RBG subset includes every P-th RBG from the p-th RBG. At type 1, the VRB is defined in a localized manner, and this may be used as the same meaning as the PRB.

Further, another 1 bit is used for the purpose of notifying of bitmap-shifting resource allocation so that the bit map can indicates the last VRB in the RBG subset. In order to notify the terminal of the RBG subset, $\lceil \log_2(P) \rceil$ bits are used, and one bit is used to indicate the shift. Further, the number of bits for the bitmap is defined as $N_{RB}^{TYPE1}=\lceil N_{RB}^{DL}/P' \rceil - \lceil \log_2(P) \rceil - 1$. The P value may be given as the P value defined in Table 4b, and the P' value may be given as the P value defined in Table 4c, 4d, or 4e.

The number of bits required for resource allocation type 1 according to this embodiment become equal to the number of bits required for resource allocation type 0 as in the (3-1)-th embodiment. For this, the base station should include one bit for notifying the terminal whether the resource allocation type is 0 or 1 in the downlink control information. In view of the corresponding bit in the downlink control information, the terminal can determine that resource allocation type 0 has been used if the corresponding bit is 0, whereas it can determine that resource allocation type 1 has been used if the corresponding bit is 1.

(3-3)-Th Embodiment

The (3-3)-th embodiment provides a method for configuring downlink resource allocation information in downlink resource allocation type 2 for a first type terminal. In this embodiment, operations of a base station and a terminal using the method for configuring resource allocation information can be provided in the (3-4)-th embodiment.

The downlink resource allocation type 2 notifies of the start location RB'$_{start}$ of $N_{RB}^{step,sTTI}$-numbered VRB groups through tying of successive allocated VRBs in the unit of $N_{RB}^{step,sTTI}$, and a resource indication value (RIV) indicating information of the number L'$_{CRBs}$ of allocated VRB groups. If N'$_{VRB}^{DL}$ is defined as $N'_{VRB}^{DL}=\lfloor N_{VRB}^{DL}/N_{RB}^{step,sTTI} \rfloor$, the RIV value is calculated as RIV=N'$_{VRB}^{DL}$(L'$_{CRBs}$−1)+RB'$_{start}$ in case of (L'$_{CRBs}$−1)≤⌊N'$_{VRB}^{DL}$/2⌋, and in other cases, the RIV value is calculated as RIV=N'$_{VRB}^{DL}$(N'$_{VRB}^{DL}$−L'$_{CRBs}$+1)+(N'$_{VRB}^{DL}$−1−RB'$_{start}$). The VRBs may be mapped to PRBs in a localized or distributed manner. The $N_{RB}^{step,sTTI}$ value in accordance with the system frequency band is defined as in Table 4f below.

TABLE 4f

| System BW ($N_{RB}^{DL}$) | $N_{RB}^{step, sTTI}$ |
|---|---|
| 6-49 | 2 |
| 50-110 | 4 |

When configuring downlink resource allocation information using resource allocation type 2 for the first type terminal, the base station calculates the RIV value in the above-described method, and puts the calculated RIV value as the resource allocation bit value of DCI.

If blind decoding of the downlink control information has succeeded, and the corresponding DCI format uses the resource allocation type 2, the first type terminal discovers the RIV value using the resource allocation bits of the DCI, and if the RIV value is discovered, it can discover the start point and the length of the allocated VRB group allocated through a reverse operation using the above-described equation. The first type terminal can receive downlink data from the allocated VRB using the discovered downlink resource allocation information.

The method for configuring the resource allocation information provided in the (3-1)-th, (3-2)-th, and (3-3)-th embodiments can be provided for the first type terminal, and the downlink control information (DCI) including the resource allocation information can be transmitted from the PDCCH region of the L system in the related art, or can be transmitted from the remaining subframe part that is not the PDCCH region.

(3-4)-Th Embodiment

The (3-4)-th embodiment provides a method in which a base station generates downlink resource allocation information for a first type terminal, and the first type terminal receives the downlink resource allocation information, which will be described with reference to FIG. 4D.

Figure 4D:
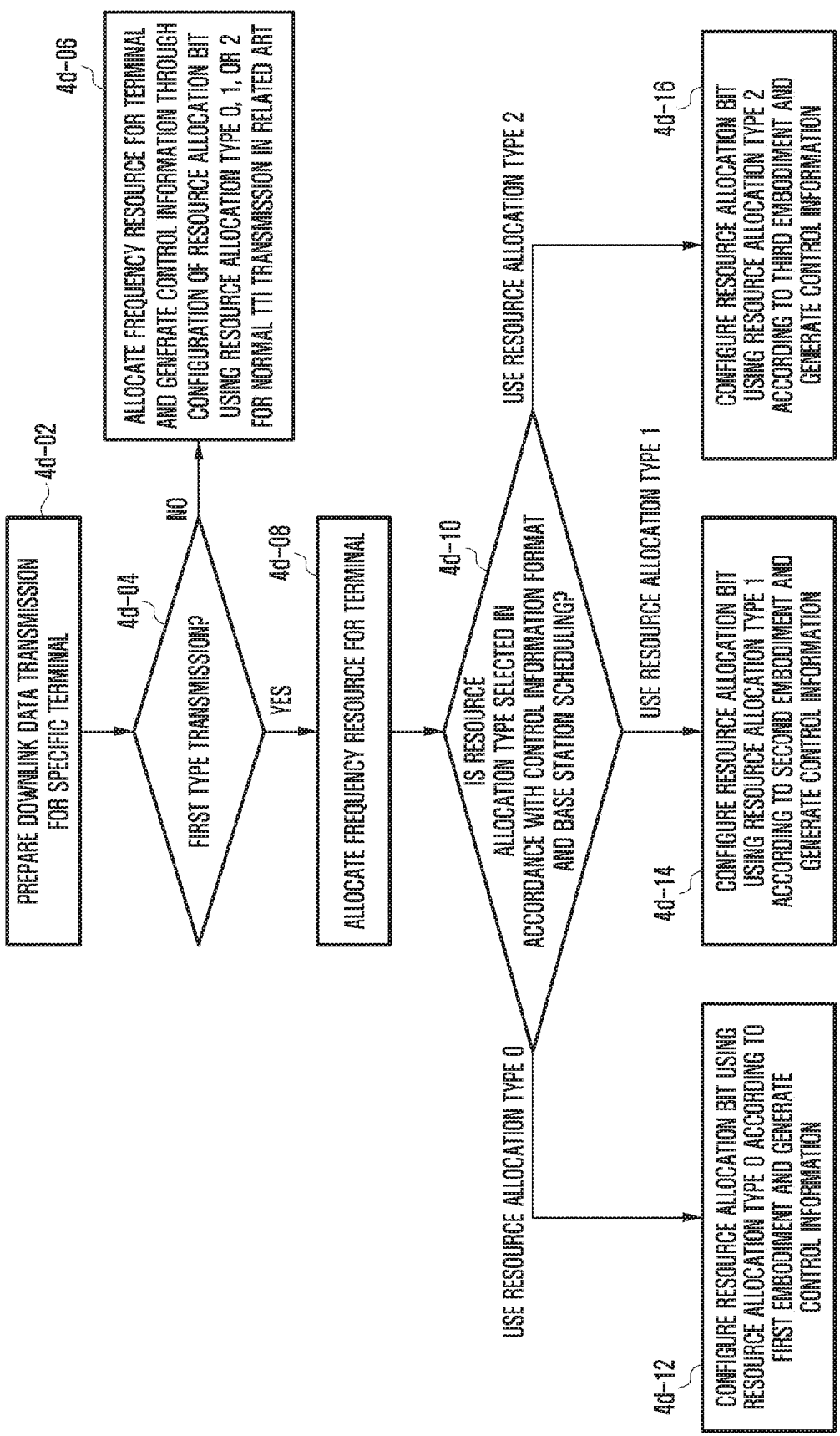
FIG. 4D is a flowchart illustrating a process in which a base station transfers resource allocation information to a terminal using resource allocation type 0, 1, or 2 for a first type terminal provided in (3-1)-th, (3-2)-th, and (3-3)-th embodiments.

FIG. 4D is a flowchart illustrating a process in which a base station transfers resource allocation information to a terminal using resource allocation type 0, 1, or 2 for a first type terminal provided in the (3-1)-th, (3-2)-th, and (3-3)-th embodiments.

The base station prepares downlink data to be transmitted to a specific terminal (4d-02). If the corresponding terminal is the first type terminal, the base station determines whether to perform first type transmission of data to be scheduled (4d-04). The determination of whether to perform the first type transmission may be performed by a request from the terminal, by signaling in a higher layer network through the base station, or by optional determination of the base station.

If it is determined not to perform the first type transmission through the determination (4d-04), the base station allocates a frequency resource, and generates control information using resource allocation type 0, 1, or 2 for normal TTI transmission in the related art (4d-06).

If it is determined to perform the first type transmission through the determination (4d-04), the base station first allocates a frequency resource for the first type transmission (4d-08). Thereafter, the base station selects the resource allocation type to notify the allocated frequency resource from the downlink control information (4d-10).

Selection of the resource allocation type is performed in a manner that the base station first determines candidates of the resource allocation type in accordance with the control information format, and finally, and optionally selects one resource allocation type among the candidates (4d-10).

As an example, downlink control information (DCI) format 1, 2, 2A, 2B, 2C, or 2D for the second type terminal in the related art uses resource allocation type 0 or 1 in the related art, the base station optionally select one of the two types, and includes one bit for notifying the terminal of the resource allocation type in the DCI to be transmitted. If the one bit for notifying whether the resource allocation type is 0 or 1 is 0, the corresponding bit may become 0, whereas if the one bit is 1, the corresponding bit may become 1. Further, the base station and the terminal may predetermine the corresponding bit in a reverse manner. In contrast, the DCI format 1A, 1B, 1C, or 1D in the related art uses the resource allocation type 2 in the related art.

In a similar manner, the DCI format 1, 2, 2A, 2B, 2C, or 2D for the first type terminal may use resource allocation type 0 or 1 for the first type terminal, whereas the DCI format 1A, 1B, 1C, or 1D for the first type terminal may use resource allocation type 2 for the first type terminal. If it is determined to use resource allocation type 0 at operation 4d-10 of selecting the resource allocation type in accordance with the control information format and the base station scheduling, the base station configures the resource allocation bit using resource allocation type 0 using the method provided in the (3-1)-th embodiment, and generates and transfers DCI to the terminal (4d-12). If it is determined to use resource allocation type 1 at operation 4d-10 of selecting the resource allocation type in accordance with the control information format and the base station scheduling, the base station configures the resource allocation bit using resource allocation type 1 using the method provided in the (3-2)-th embodiment, and generates and transfers the DCI to the terminal (4d-14). If it is determined to use resource allocation type 2 at operation 4d-10 of selecting the resource allocation type in accordance with the control information format and the base station scheduling, the base station configures the resource allocation bit using resource allocation type 2 using the method provided in the (3-3)-th embodiment, and generates and transfers the DCI to the terminal (4d-16). The process of the base station and FIG. 4D would be possible even if the processing order of the base station is changed.

Figure 4E:
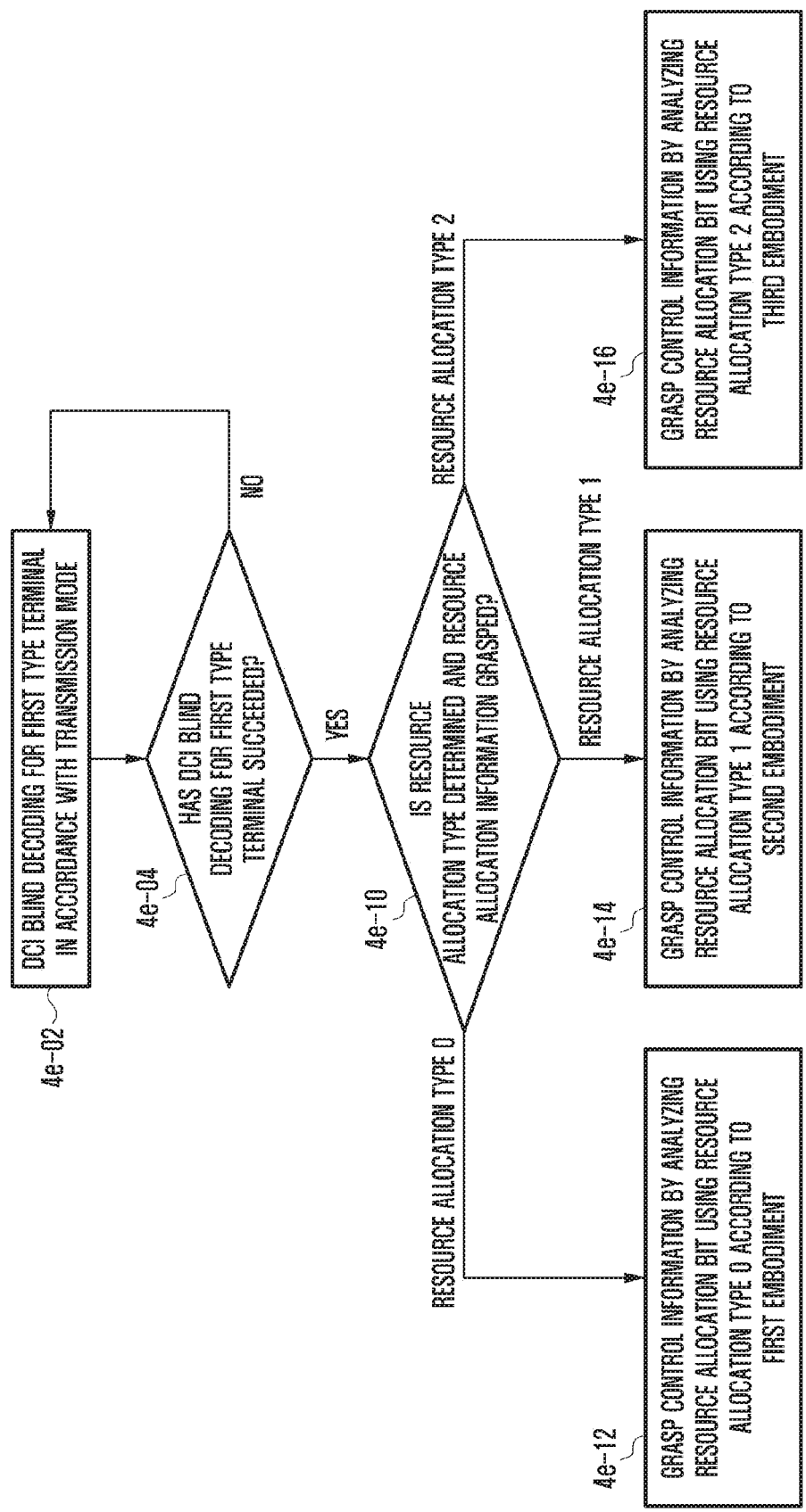
FIG. 4E is a flowchart illustrating a method in which a first type terminal receives downlink control information and discovers a resource on which data is actually transmitted through discrimination of a resource allocation type in accordance with a DCI format.

FIG. 4E is a flowchart illustrating a method in which a first type terminal receives downlink control information and discovers a resource on which data is actually transmitted through discrimination of a resource allocation type in accordance with a DCI format.

The terminal performs DCI blind decoding for the first type terminal in accordance with a transmission mode in a determined control information search region (4e-02). The control information search region may be upper-layer signaled to RRC.

It is determined whether the DCI blind decoding for the first type terminal has succeeded, and such determination is performed in a manner that if CRC decoding has succeeded in a decoding process, it is determined that the DCI decoding has succeeded (4e-04). If the blind decoding has not succeeded in a specific search region, the DCI blind decoding is performed again through movement to another search region.

If the blind decoding has succeeded, the resource allocation type is determined in accordance with the DCI related to downlink transmission, and the resource allocation information is grasped through the corresponding DCI (4e-10). If it is determined that the corresponding DCI format uses resource allocation type 0 (4e-10), the control information is grasped through analysis of the resource allocation bit in accordance with the (3-1)-th embodiment of the present disclosure (4e-12). If it is determined that the corresponding DCI format uses resource allocation type 1 (4e-10), the control information is grasped through analysis of the resource allocation bit in accordance with the (3-2)-th embodiment of the present disclosure (4e-14). If it is determined that the corresponding DCI format uses resource allocation type 2 (4e-10), the control information is grasped through analysis of the resource allocation bit in accordance with the (3-3)-th embodiment of the present disclosure (4e-16).

Figure 4F:
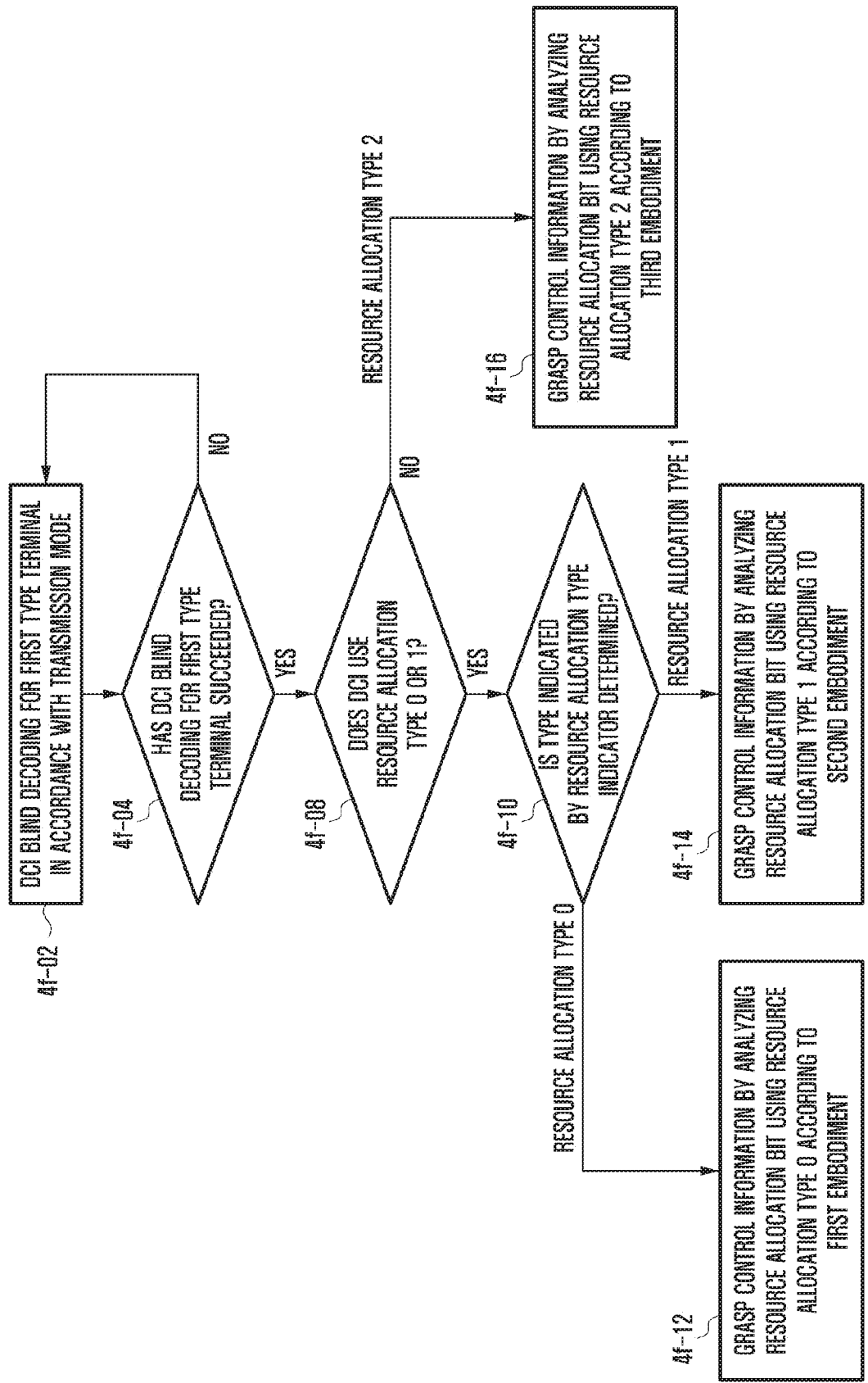
FIG. 4F is a flowchart illustrating a method in which a first type terminal receives downlink control information and discovers a resource on which data is actually transmitted through discrimination of a resource allocation type in accordance with a DCI format.

As a method for the first type terminal to receive the downlink control information and discover a resource on which data is actually transmitted through discrimination of the resource allocation type, the operation illustrated in the flowchart of FIG. 4F may be performed. FIG. 4F is a flowchart illustrating a method in which a first type terminal receives downlink control information and discovers a resource on which data is actually transmitted through discrimination of a resource allocation type in accordance with a DCI format.

The terminal performs DCI blind decoding for the first type terminal in accordance with a transmission mode in a determined control information search region (4f-02). The control information search region may be upper-layer signaled to RRC.

It is determined whether the DCI blind decoding for the first type terminal has succeeded, and such determination is performed in a manner that if CRC decoding has succeeded in a decoding process, it is determined that the DCI decoding has succeeded (4f-04). If the blind decoding has not succeeded in a specific search region, the DCI blind decoding is performed again through movement to another search region.

If the blind decoding has succeeded, it is determined whether the DCI having succeeded in decoding corresponds to a format using resource allocation 0 or 1 (4f-08). If the corresponding DCI format does not use resource allocation type 0 or 1, but uses resource allocation type 2, the control information is grasped through analysis of the resource allocation bit in accordance with the (3-3)-th embodiment of the present disclosure (4f-16).

If the corresponding DCI format uses resource allocation type 0 or 1, it is determined what resource allocation type is used by identifying whether the indicator bit indicating the resource allocation type in the corresponding DCI is 0 or 1 (4f-10). If the indicator bit indicating the resource allocation type is 0, it means that the corresponding DCI uses resource allocation type 0, whereas if the indicator bit is 1, it may be analyzed that the corresponding DCI uses resource allocation type 1 (4f-10).

If it is determined that the DCI uses resource allocation type 0, the control information is grasped through analysis of the resource allocation bit in accordance with the (3-1)-th embodiment of the present disclosure (4f-12). If it is determined that the DCI uses resource allocation type 1, the control information is grasped through analysis of the resource allocation bit in accordance with the (3-2)-th embodiment of the present disclosure (4f-14). The process of grasping the downlink control information of the terminal illustrated in FIGS. 4E and 4F could be performed even in a reverse processing order.

(3-5)-Th Embodiment

The (3-5)-th embodiment provides a method for configuring uplink resource allocation information in DCI format including scheduling information for uplink transmission as uplink resource allocation type 0 for the first type terminal. In this embodiment, operations of a base station and a terminal using the method for configuring resource allocation information can be provided in the (3-7)-th embodiment.

The uplink resource allocation type 0 notifies of the start location $RB'_{start}$ of $N_{RB}^{step,sTTI}$-numbered VRB groups through tying of successive VRBs in the unit of $N_{RB}^{step,sTTI}$, and a resource indication value (RIV) indicating information of the number $L'_{CRBs}$ of allocated VRB groups. If $N'_{VRB}^{UL}$ is defined as $N'_{VRB}^{UL} = \lfloor N_{VRB}^{UL}/N_{RB}^{step,sTTI} \rfloor$, the RIV value is calculated as $RIV = N'_{VRB}^{UL}(L'_{CRBs}-1) + RB'_{start}$ in case of $(L'_{CRBs}-1) \leq \lfloor N'_{VRB}^{UL}/2 \rfloor$, and in other cases, the RIV value is calculated as $RIV = N'_{VRB}^{UL}(N'_{VRB}^{UL} - L'_{CRBs}+1) + (N'_{VRB}^{UL} - 1 - RB'_{start})$. The $N_{RB}^{step,sTTI}$ value in accordance with the system frequency band is defined as in Table 4g below.

TABLE 4f

| System BW ($N_{RB}^{UL}$) | $N_{RB}^{step,\ sTTI}$ |
|---|---|
| 6-49 | 2 |
| 50-110 | 4 |

The defined $N_{RB}^{step,sTTI}$ may differ in accordance with the TTI length, and may use a different value in accordance with the uplink system frequency band. Further, the RIV may be calculated by configuring $N_{RB}^{step,sTTI}$ to a value that is always 1.

When configuring the uplink resource allocation information using uplink resource allocation type 0 for the first type terminal, the base station calculates the RIV value in the above-described method, and puts the calculated RIV value as the DCI resource allocation bit value.

If blind decoding of the uplink control information has succeeded, and the corresponding DCI format uses the resource allocation type 0, the first type terminal discovers the RIV using the resource allocation bits of the DCI, and if the RIV is discovered, it can discover the start point and the length of the allocated VRB group allocated through a reverse operation using the above-described equation. The terminal can perform uplink data transmission using the discovered uplink resource allocation information.

(3-6)-Th Embodiment

The (3-6)-th embodiment provides a method for configuring uplink resource allocation information in DCI format including scheduling information for uplink transmission as uplink resource allocation type 1 for the first type terminal. In this embodiment, operations of a base station and a terminal using the method for configuring resource allocation information can be provided in the (3-7)-th embodiment.

The uplink resource allocation type 1 notifies the terminal of information on two sets of resource blocks, and each set is composed of one or more RBGs. The size of the RBG is P, and the P may be defined as in Table 4b, 4c, 4d, or 4e.

The number of bits used for the resource allocation is determined as $$\left\lfloor \log_2\left(\binom{\lceil N_{RB}^{UL}/P + 1\rceil}{4}\right) \right\rfloor$$

Here, information r transferred for the resource allocation is determined as $$r = \sum_{i=0}^{M-1} \binom{N-s_i}{M-i},$$

and M and N are respectively defined as M=4 and N=[$N_{RB}^{UL}$/P]+1. The terms $s_0$ and $s_1-1$ are start and last RBG indexes of the first resource block allocated to the terminal, and $s_2$ and $s_3-1$ are start and last RBG indexes of the first resource block allocated to the terminal.

When configuring the uplink resource allocation information using uplink resource allocation type 1 for the first type terminal, the base station calculates the r value in the above-described method, and puts the calculated r value as the DCI resource allocation bit value.

If blind decoding of the uplink control information has succeeded, and the corresponding DCI format uses the resource allocation type 1, the first type terminal discovers the r value using the resource allocation bits of the DCI, and if the r value is discovered, it can discover the start and last RBG indexes of the resource blocks allocated through a reverse operation using the above-described equation. The terminal can perform uplink data transmission using the discovered uplink resource allocation information.

(3-7)-Th Embodiment

The (3-7)-th embodiment provides a method in which a base station generates uplink resource allocation information for a first type terminal, and the first type terminal receives the uplink resource allocation information, which will be described with reference to FIGS. 4G and 4H.

Figure 4G:
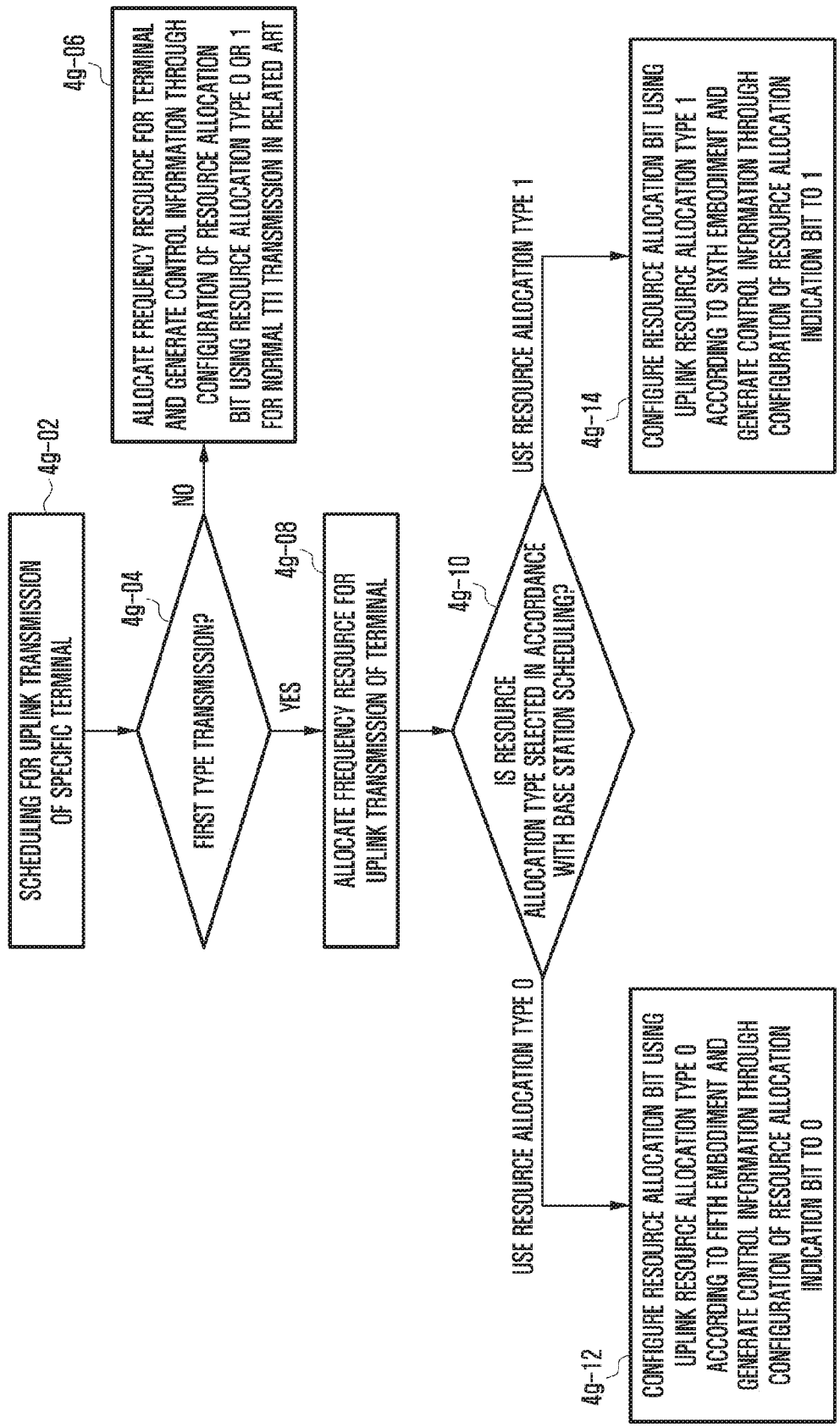
FIG. 4G is a flowchart illustrating a process in which a base station transfers uplink resource allocation information to a terminal using uplink resource allocation type 0 or 1 for a first type terminal provided in (3-5)-th and (3-6)-th embodiments.

FIG. 4G is a flowchart illustrating a process in which a base station transfers uplink resource allocation information to a terminal using resource allocation type 0 or 1 for a first type terminal provided in the (3-5)-th and (3-6)-th embodiments.

The base station performs scheduling for uplink transmission of a specific terminal (4g-02). If the corresponding terminal is the first type terminal, the base station determines whether to perform the scheduling as the first type transmission (4g-04). The determination of whether to perform the scheduling as the first type transmission may be performed by a request from the terminal, by signaling in a higher layer network through the base station, or by optional determination of the base station.

If it is determined not to perform the first type transmission through the determination (4g-04), the base station allocates a frequency resource, and generates control information using resource allocation type 0 or 1 for normal TTI transmission in the related art (4g-06).

If it is determined to perform the first type transmission through the determination (4g-04), the base station first allocates a frequency resource for the uplink transmission as the first type transmission (4g-08). The base station selects the resource allocation type to notify the allocated frequency resource from the uplink control information (4g-10). If the base station intends to configure the uplink resource allocation information bit as resource allocation type 0, it configures resource allocation bits using the uplink resource allocation type 0 in accordance with the (3-5)-th embodiment, and generates control information by configuring the resource allocation indication bit to 0 (4g-12).

The resource allocation indication bit notifying whether the resource allocation type is 0 or 1 is composed of one bit, and for example, in case of resource allocation type 0, the corresponding bit may become 0, whereas in case of resource allocation type 1, the corresponding bit may become 1. If the base station intends to configure the uplink resource allocation information bit as resource allocation type 1, it configures resource allocation bits using the uplink resource allocation type 1 in accordance with the (3-6)-th embodiment, and generates control information by configuring the resource allocation indication bit to 1 (4g-14). The process of the base station and FIG. 4D would be possible even if the processing order of the base station is changed.

Figure 4H:
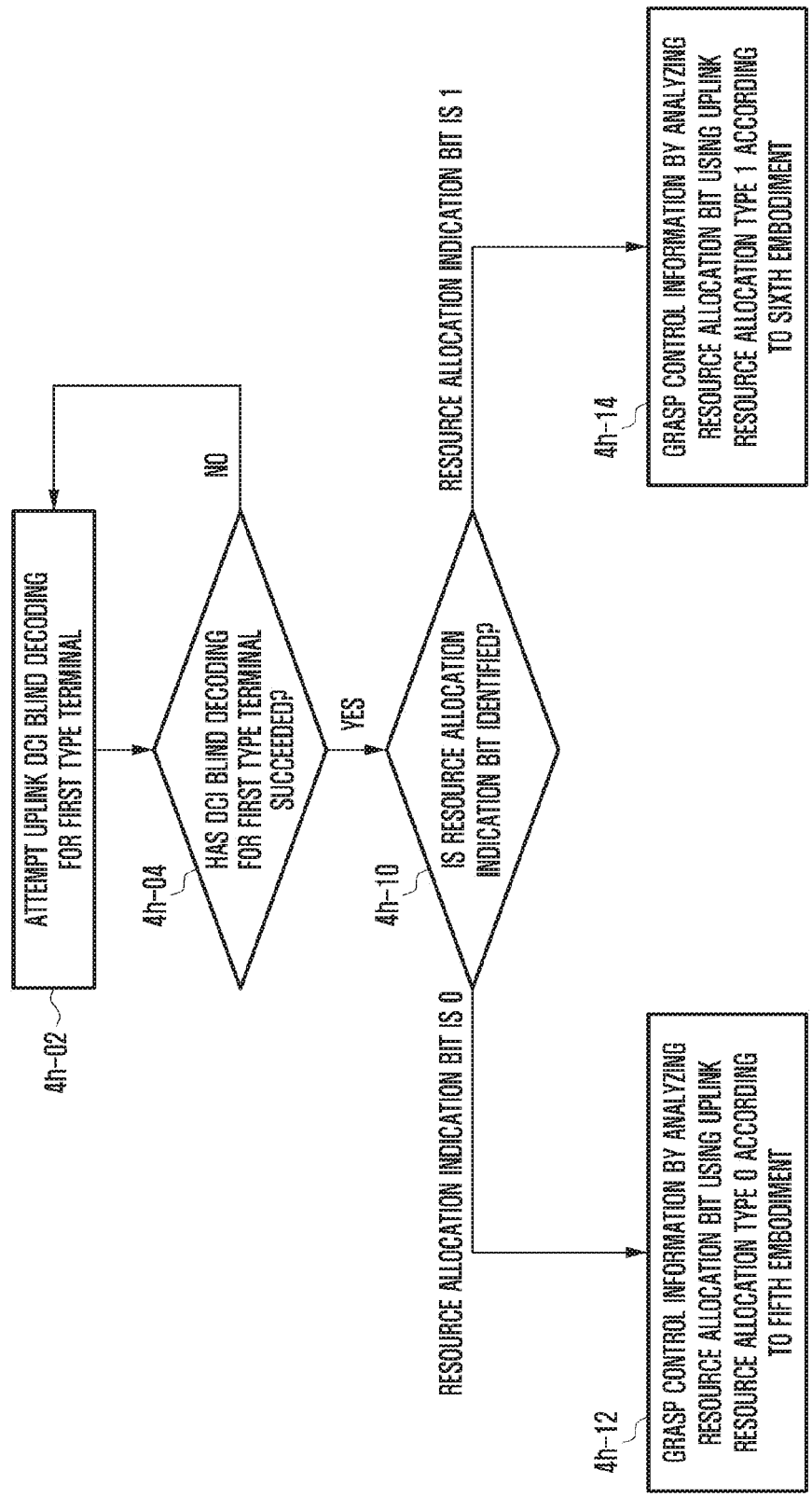
FIG. 4H is a flowchart illustrating a method in which a first type terminal receives uplink control information and discovers a resource on which data is actually transmitted through discrimination of a resource allocation type.

FIG. 4H is a flowchart illustrating a method in which a first type terminal receives uplink control information and discovers a resource on which data is actually transmitted through discrimination of a resource allocation type. The terminal performs DCI blind decoding for the first type terminal in accordance with a transmission mode in a determined control information search region (4h-02). The control information search region may be upper-layer signaled to RRC.

The terminal determines whether the DCI blind decoding for the first type terminal has succeeded, and such determination is performed in a manner that if CRC decoding has succeeded in a decoding process, the terminal determines that the DCI decoding has succeeded (4h-04). If the blind decoding has not succeeded in a specific search region, the terminal performs the DCI blind decoding again through movement to another search region.

If the blind decoding has succeeded, the terminal identifies resource allocation indication bit in the DCI related to the uplink transmission (4h-10). If the resource allocation indication bit is 0, the terminal determines that the corresponding DCI format uses resource allocation type 0, and grasps the control information by analyzing the resource allocation bit using uplink resource allocation type 0 in accordance with the (3-5)-th embodiment (4h-12). If the resource allocation indication bit is 1, the terminal determines that the corresponding DCI format uses resource allocation type 1, and grasps the control information through analysis of the resource allocation bit using uplink resource allocation type 1 in accordance with the (3-6)-th embodiment (4h-14). The process of grasping the uplink control information of the terminal as illustrated in FIG. 4H would be possible even if the processing order is changed.

(3-8)-Th Embodiment

The (3-8)-th embodiment provides a method for transmitting to a terminal downlink control information (DCI) containing downlink or uplink resource allocation information for a first type terminal in two divided operations. The two operations may include operations of notifying of information for dividing the whole downlink or uplink system frequency band into subbands of a smaller unit and notifying of information for selecting the subband.

The whole downlink or uplink system frequency band may be all the frequency band used by the system, or may be a frequency band to be used for the first type transmission notified through higher layer signaling. Information transferred from the downlink control information of the two operations may be respectively called slow DCI and fast DCI. The slow DCI may be transmitted once in one subframe, and the fast DCI may be transmitted once in each shortened-TTI.

In this embodiment, the first operation is an operation of notifying of information for dividing the whole downlink or uplink system frequency band into subbands of a smaller unit. At the operation, in order to notify of subband frequency allocation information, PRB indexes at a start and an end of a subband may be notified, or PRB indexes constituting the subband may be configured to a set of one or more bitmaps. N subbands may exist.

In this embodiment, the second operation is an operation of notifying of information for selecting the subband. The second operation transfers information for allocating to the terminal one or more subbands among N subbands of which frequency allocation information has been transferred at the first operation. The information for allocating the subband is transferred in a method, such as the bitmap, at a short transmission interval, and may be transferred together with other control information.

In this embodiment, the information at the first operation may be transferred to the terminal through higher layer signaling, or may be transferred to be included in a specific format in a PDCCH region of the LTE system in the related art. The PDCCH region of the LTE system in the related art may correspond to 1, 2, 3, or 4 OFDM symbols at the forefront of one subframe. Further, in this embodiment, the information at the first operation may be commonly transferred to all the first type terminals accessing the corresponding base station, or may be transferred only to the first type terminals.

(3-9)-Th Embodiment

The (3-9)-th embodiment provides a method for transmitting to a terminal DCI containing downlink or uplink resource allocation information for a first type terminal in two divided operations. The two operations may include operations of notifying the terminal of a frequency band to be used for the first type transmission among the whole downlink or uplink system frequency band and transferring information for selecting one of X subbands when the frequency band to be used for the first type transmission is divided into the X subbands.

The information transferred from the downlink control information at the two operations may be called slow DCI and fast DCI. The slow DCI may be transmitted once in one subframe, and the fast DCI may be transmitted once in each shortened-TTI. The numeral X may be an integer that is equal to or larger than 1, and it may be changed in accordance with the size of the frequency band to be used for the whole downlink or uplink system frequency band or the first type transmission, or may be predetermined as a fixed value, such as 1, 2, 4, 8, or 16. Further, in the rule predetermined to divide the frequency band to be used for the first type transmission into X subbands, the respective subbands may be determined as a successive frequency band or as a set of PRBs having a fixed distance. Further, the base station may perform in advance higher layer signaling of the respective subband values to the terminal.

In this embodiment, the first operation is an operation of notifying the terminal of the frequency band to be used for the first type transmission among the whole downlink or uplink system frequency band. In this embodiment, the information transferred to the terminal at the first operation may be transferred through higher layer signaling or may be included in a specific format to be transferred in the PDCCH region of the LTE system in the related art. The PDCCH region of the LTE system in the related art may correspond to 1, 2, 3, or 4 OFDM symbols in the forefront of one subframe. Further, in this embodiment, the information at the first operation may be commonly transferred to all the first type terminals accessing the corresponding base station, or may be transferred only to the first type terminals.

In this embodiment, the second operation is an operation of transferring information for selecting one of X subbands when the frequency band to be used for the first type transmission is divided into the X subbands in accordance with the predetermined rule.

According to the rule to divide the frequency band to be used for the first type transmission into X subbands, it is possible to divide the frequency band to be used for the first type transmission into the X subbands so that the same number of PRBs is included in each subband.

The method for making the same number of PRBs included in each subband can allocate PRBs to the subband so that the subband has the PRBs as many as the largest number among the integers the number of which is smaller than the value obtained by dividing the frequency band to be used for the first type transmission by X or the PRBs as many as the number that is larger by 1 than the largest value among the integers the number of which is smaller than the value obtained by dividing the frequency band to be used for the first type transmission by X.

Further, a method may be used to allocate the PRBs, starting from the PRB having the smallest PRB index or the largest PRB index in the frequency band to be used for the first type transmission, alternately from subband 0 to subband X−1. The dividing rule is merely exemplary, and the method for dividing the frequency band to be used for the first type transmission into X subbands may be applied with various modifications thereof.

(3-10)-Th Embodiment

The (3-10)-th embodiment provides an operation method in case where a first type terminal has one or more lengths of a transmission time interval used by the first type terminal in uplink and downlink.

The length of the first transmission time interval, the length of the second transmission time interval, and the length of the third transmission time interval, which are supported when the first type terminal performs transmission, will be described. The length of the first transmission time interval, the length of the second transmission time interval, and the length of the third transmission time interval correspond to a subframe, a slot, and two symbols, respectively. Hereinafter, although explanation will be made based on the fact that one subframe is composed of 14 symbols, and one slot is composed of 7 symbols, there may be slight changes, and this embodiment could be easily applied in accordance with such changes.

In case where the base station downloads downlink and uplink scheduling information using a short length of the transmission time interval to the terminal, a control signal may include information on what transmission time interval is to be used between the lengths of the second transmission time interval and the third transmission time interval. The information may be composed of one bit or two bits. Further, the information on what transmission time interval is to be used between the lengths of the second transmission time interval and the third transmission time interval of one bit or two bits may be transferred in advance to the terminal through higher layer signaling.

The terminal can grasp the information on what transmission time interval the downlink and uplink scheduling using the short length of the transmission time interval will use from the control signal or higher layer signaling information transferred from the base station, and thus the terminal can perform transmission or reception with the length of the second transmission time interval or the third transmission time interval using the determined frequency resource and time.

Figure 4I:
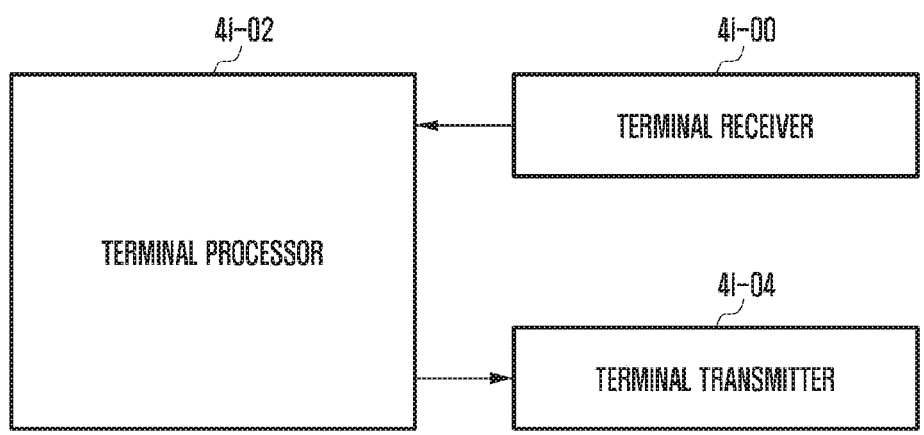
FIG. 4I is a block diagram illustrating the internal structure of a terminal according to an embodiment of the present disclosure.
Figure 4J:
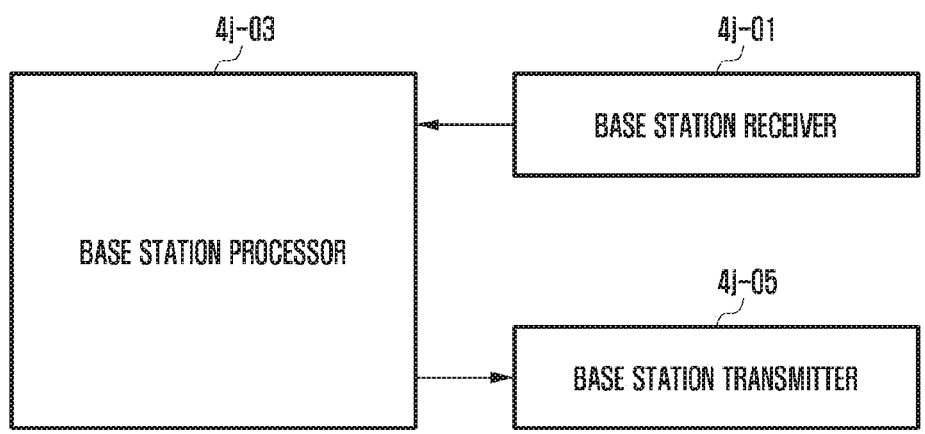
FIG. 4J is a block diagram illustrating the internal structure of a base station according to an embodiment of the present disclosure.

In order to perform the above-described embodiments of the present disclosure, a transmitter, a receiver, and a processor of a terminal and a base station are illustrated in FIGS. 4I and 4J. According to the (3-1)-th to (3-7)-th embodiments, transmission/reception methods by the base station and the terminal for transmitting the downlink and uplink resource allocation information for the shortened-TTI have been described, and to perform the methods, the receiver, the processor, and the transmitter of the base station and the terminal should operate in accordance with the respective embodiments.

Specifically, FIG. 4I is a block diagram illustrating the internal structure of a terminal according to an embodiment of the present disclosure. As illustrated in FIG. 4I, a terminal according to the present disclosure may include a terminal receiver 4$i$-00, a terminal transmitter 4$i$-04, and a terminal processor 4$i$-02.

In an embodiment of the present disclosure, the terminal receiver 4$i$-00 and the terminal transmitter 4$i$-04 may be commonly called a transceiver. The transceiver may transmit/receive a signal with a base station. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 4$i$-02. The transceiver may also transmit the signal that is output from the terminal processor 4$i$-02 through the radio channel. The terminal processor 4$i$-02 may control a series of processes for the terminal operation according to the above-described embodiment of the present disclosure.

FIG. 4J is a block diagram illustrating the internal structure of a base station according to an embodiment of the present disclosure. As illustrated in FIG. 4J, a base station according to an embodiment of the present disclosure may include a base station receiver 4$j$-01, a base station transmitter 4$j$-05, and a base station processor 4$j$-03.

In an embodiment of the present disclosure, the base station receiver 4$j$-01 and the base station transmitter 4$j$-05 may be commonly called a transceiver. The transceiver may transmit/receive a signal with a terminal. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 4$j$-03. The transceiver may also transmit the signal that is output from the base station processor 4$j$-03 through the radio channel. The base station processor 4$j$-03 may control a series of processes for the base station operation according to the above-described embodiment.

For example, the base station processor 4$j$-03 may control to determine whether the terminal to be scheduled is the first type terminal or the second type terminal, and to generate control information based on control information for the first type terminal in case of the first type terminal. In this case, the length of the transmission time interval for the first type terminal is configured to be shorter than the length of the transmission time interval for the second type terminal. The length of the transmission time interval for the first type terminal may be 1 ms, and in this case, the first type terminal may operate in the same manner as the second type terminal according to the present disclosure.

Further, according to an embodiment of the present disclosure, the base station processor 4$j$-03 may control to generate downlink control information (DCI) including resource allocation information for the first type terminal. In this case, the DCI may indicate the control information for the first type terminal. Further, according to an embodiment of the present disclosure, the base station processor 4$j$-03 may control to generate downlink control information (DCI) for the first type terminal based on the terminal identifier for the first type terminal. Further, according to an embodiment of the present disclosure, the base station processor 4$j$-03 may control to determine the downlink control information (DCI) for the first type terminal using the resource allocation type for downlink or uplink data transmission for the first type terminal. Further, according to an embodiment of the present disclosure, the base station processor 4$j$-03 may control to generate the downlink control information (DCI) including resource allocation information of a data channel for the first type terminal. Further, according to an embodiment of the present disclosure, the base station processor 4$j$-03 may control to map improved control information for the first type terminal to a resource block to which the improved control information for the first type terminal can be mapped.

Further, according to an embodiment of the present disclosure, the base station processor 4$j$-03 may control to configure and transmit the number of resource blocks that can be used by an uplink control information format for the first type terminal, allocate and transmit the resource for the first type terminal to the respective terminals, and transmit control information and data corresponding to the control information in accordance with the resources allocated to the respective terminals.

Although preferred embodiments of the present disclosure have been described in the specification and drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible on the basis of the technical concept of the present disclosure. Further, according to circumstances, the respective embodiments may be operated in aggregation. For example, parts of the embodiments 3-1, 3-2, and 3-3 of the present disclosure may be aggregated with each other to operate as a base station and a terminal.

The invention claimed is:

1. A method by a base station in a wireless communication system, the method comprising:
   identifying a transmission time interval (TTI) length for transmitting data to a terminal, the TTI length being a first TTI length or a second TTI length;
   identifying a resource allocation type for notifying of a frequency resource allocated to transmit the data, the resource allocation type being associated with a resource block group (RBG) bitmap indicating a resource block assignment; and
   transmitting, to the terminal, control information including resource block assignment information based on the resource allocation type and the TTI length; and transmitting, to the terminal, the data according to the resource block assignment information, wherein the resource block assignment information is associated with a resource block group (RBG) size being a number of resource blocks (RBs) included in one RBG, wherein the RBG size is identified based on one of a first table for the first TTI length or a second table for the second TTI length, according to the identified TTI length, the first TTI length being smaller than the second TTI length, wherein the first table is defined based on a plurality of system bandwidths and corresponding RBG sizes for the first TTI length, and the second table is defined based on the plurality of system bandwidths and corresponding RBG sizes for the second TTI length, and wherein the first table for the first TTI length is defined based on RBG sizes smaller than 4 for first system bandwidths and RBG sizes greater than 4 for second system bandwidths.

2. The method of claim 1, wherein the resource allocation type is determined among candidates of the resource allocation type determined corresponding to a control information format.

3. The method of claim 1, wherein an RBG size corresponding to at least one system bandwidth of the first table for the first TTI length is larger than an RBG size corresponding to the at least on system bandwidth of the second table for the second TTI length.

4. The method of claim 1, wherein the resource block assignment information includes a bitmap indicating RBGs.

5. A method by a terminal in a wireless communication system, the method comprising:

identifying a transmission time interval (TTI) length for receiving data from the base station, the TTI length being a first TTI length or a second TTI length;

receiving, from a base station, control information including resource block assignment information;

identifying a resource allocation type for a frequency resource allocated to receive the data, the resource allocation type being associated with a resource block group (RBG) bitmap indicating a resource block assignment; and receiving, from the base station, the data based on the resource block assignment information, wherein the resource block assignment information is associated with a resource block group (RBG) size being a number of resource blocks (RBs) included in one RBG, wherein the RBG size is identified based on one of a first table for the first TTI length or a second table for the second TTI length, according to the identified TTI length, the first TTI length being smaller than the second TTI length, wherein the first table is defined based on a plurality of system bandwidths and corresponding RBG sizes for the first TTI length, and the second table is defined based on the plurality of system bandwidths and corresponding RBG sizes for the second TTI length, and wherein the first table for the first TTI length is defined based on RBG sizes smaller than 4 for first system bandwidths and RBG sizes greater than 4 for second system bandwidths.

6. The method of claim 5, wherein the resource allocation type is determined among candidates of the resource allocation type determined corresponding to a control information format.

7. The method of claim 5, wherein an RBG size corresponding to at least one system bandwidth of the first table for the first TTI length is larger than an RBG size corresponding to the at least on system bandwidth of the second table for the second TTI length.

8. The method of claim 5, wherein the resource block assignment information includes a bitmap indicating RBGs.

9. A base station in a wireless communication system, the base station comprising:

a transceiver configured to transmit/receive data to/from a terminal; and a controller configured to:
identify a transmission time interval (TTI) length for transmitting data to the terminal, the TTI length being a first TTI length or a second TTI length;
identify a resource allocation type for notifying of a frequency resource allocated to transmit the data, the resource allocation type being associated with a resource block group (RBG) bitmap indicating a resource block assignment;
transmit, to the terminal, control information including resource block assignment information based on the resource allocation type and the TTI length, and
transmit, to the terminal, the data according to the resource block assignment information, wherein the resource block assignment information is associated with a resource block group (RBG) size being a number of resource blocks (RBs) included in one RBG, wherein the RBG size is identified based on one of a first table for the first TTI length or a second table for the second TTI length, according to the identified TTI length, the first TTI length being smaller than the second TTI length, wherein the first table is defined based on a plurality of system bandwidths and corresponding RBG sizes for the first TTI length, and the second table is defined based on the plurality of system bandwidths and corresponding RBG sizes for the second TTI length, and wherein the first table for the first TTI length is defined based on RBG sizes smaller than 4 for first system bandwidths and RBG sizes greater than 4 for second system bandwidths.

10. The base station of claim 9, wherein the resource allocation type is determined among candidates of the resource allocation type determined corresponding to a control information format.

11. The base station of claim 9, wherein an RBG size corresponding to at least one system bandwidth of the first table for the first TTI length is larger than an RBG size corresponding to the at least on system bandwidth of the second table for the second TTI length.

12. The base station of claim 9, wherein the resource block assignment information includes a bitmap indicating RBGs.

13. A terminal in a wireless communication system, the terminal comprising:

a transceiver configured to receive control information or data from a base station; and a controller configured to:
identify a transmission time interval (TTI) length for receiving data from the base station, the TTI length being a first TTI length or a second TTI length;
receive, from the base station, control information including resource block assignment information;
identify a resource allocation type for a frequency resource allocated to receive the data, the resource allocation type being associated with RBG bitmap indicating a resource block assignment; and to receive, from the base station, the data based on the resource block assignment information, wherein the resource block assignment information is associated with a resource block group (RBG) size being a number of resource blocks (RBs) included in one RBG, wherein the RBG size is identified based on one of a first table for the first TTI length or a second table for the second TTI length, according to the identified TTI length, the first TTI length is smaller than the second TTI length, wherein the first table is defined based on a plurality of system bandwidths and corresponding RBG sizes for the first TTI length, and the second table is defined based on the plurality of system bandwidths and corresponding RBG sizes for the second TTI length, and wherein the first table for the first TTI length is defined based on RBG sizes smaller than 4 for first system bandwidths and RBG sizes greater than 4 for second system bandwidths.

14. The terminal of claim 13, wherein the resource allocation type is determined among candidates of the resource allocation type determined corresponding to a control information format.

15. The terminal of claim 13, wherein an RBG size corresponding to at least one system bandwidth of the first table for the first TTI length is larger than an RBG size corresponding to the at least on system bandwidth of the second table for the second TTI length.

* * * * *